US008793504B2

(12) United States Patent  
Billau et al.

(10) Patent No.: US 8,793,504 B2
(45) Date of Patent: Jul. 29, 2014

(54) VALIDATING A SYSTEM WITH MULTIPLE SUBSYSTEMS USING TRUSTED PLATFORM MODULES AND VIRTUAL PLATFORM MODULES

(75) Inventors: Ronald L. Billau, Rochester, MN (US); Vincenzo V. Di Luoffo, Sandy Hook, CT (US); Terence K. Hennessy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/402,109

(22) Filed: Feb. 22, 2012

(65) Prior Publication Data

US 2013/0218915 A1 Aug. 22, 2013

(51) Int. Cl.
*G06F 11/30* (2006.01)
*H04K 1/00* (2006.01)
*G06F 9/00* (2006.01)
*H04M 1/66* (2006.01)

(52) U.S. Cl.
USPC ............. 713/189; 709/224; 380/270; 713/2; 713/194; 455/411

(58) Field of Classification Search
None
See application file for complete search history.

(56) References Cited

U.S. PATENT DOCUMENTS

| 5,287,506 | A | 2/1994 | Whiteside |
| 5,390,324 | A | 2/1995 | Burckhartt et al. |
| 5,708,776 | A | 1/1998 | Kikinis |
| 7,380,119 | B2 | 5/2008 | Bade et al. |
| 7,724,707 | B2 | 5/2010 | Foster et al. |
| 7,852,838 | B2 | 12/2010 | Miller et al. |
| 7,916,649 | B2 | 3/2011 | Buvaneswari et al. |
| 7,979,733 | B2 | 7/2011 | Erdtmann et al. |
| 8,023,491 | B2 | 9/2011 | Gruber |
| 8,254,294 | B2 | 8/2012 | Vesterinen |

(Continued)

FOREIGN PATENT DOCUMENTS

| WO | 03041279 A2 | 5/2003 |
| WO | 2011021875 A2 | 2/2011 |

(Continued)

OTHER PUBLICATIONS

International Search Report and Written Opinion of the ISA dated Mar. 19, 2013—International Application No. PCT/EP2012/071490.

(Continued)

*Primary Examiner* — Cordelia Zecher
*Assistant Examiner* — Trang Doan
(74) *Attorney, Agent, or Firm* — Martin & Associates, LLC; Bret J. Petersen

(57) ABSTRACT

Software validation is provided for a breakout system having multiple subsystems at the edge of a mobile data network. The software validation utilizes one or more trusted platform modules (TPM) to secure multiple subsystems including virtual machines in the breakout system. Hash values for the software in the various subsystems are placed in Platform Configuration Registers (PCRs) of the TPM. The TPM cryptographically signs quotes, which are a collection of hash values from the PCRs. The breakout system produces an extensible markup language (XML) file with the signed quotes related to the subsystems and sends them to a network management system for verification. The network management system validates the software configured on the breakout system using a public key to access the quotes and compares the values to known good values stored in an inventory record associated with the specific breakout system being validated.

6 Claims, 37 Drawing Sheets

(56) References Cited

U.S. PATENT DOCUMENTS

| | | |
|---|---|---|
| 8,363,665 B2 | 1/2013 | Lim et al. |
| 8,432,871 B1 | 4/2013 | Sarnaik et al. |
| 8,457,636 B2 | 6/2013 | Liu et al. |
| 8,462,696 B2 | 6/2013 | Vesterinen et al. |
| 8,462,770 B2 | 6/2013 | Kant et al. |
| 8,477,785 B2 | 7/2013 | Kant et al. |
| 8,503,393 B2 | 8/2013 | Vesterinen |
| 8,520,615 B2 | 8/2013 | Mehta et al. |
| 8,538,433 B2 | 9/2013 | Kekki et al. |
| 2002/0162059 A1 | 10/2002 | McNeely et al. |
| 2005/0246521 A1 | 11/2005 | Bade et al. |
| 2006/0155988 A1* | 7/2006 | Hunter et al. ............ 713/164 |
| 2007/0079120 A1 | 4/2007 | Bade et al. |
| 2008/0267128 A1 | 10/2008 | Bennett et al. |
| 2008/0270603 A1* | 10/2008 | Berger et al. ............ 709/224 |
| 2009/0205028 A1* | 8/2009 | Smeets et al. ............ 726/6 |
| 2009/0232015 A1 | 9/2009 | Domschitz et al. |
| 2009/0249053 A1* | 10/2009 | Zimmer et al. ............ 713/2 |
| 2009/0307487 A1* | 12/2009 | Movva et al. ............ 713/156 |
| 2010/0082984 A1* | 4/2010 | Ellison et al. ............ 713/170 |
| 2010/0130170 A1 | 5/2010 | Liu et al. |
| 2011/0070906 A1 | 3/2011 | Chami et al. |
| 2011/0075675 A1 | 3/2011 | Koodli et al. |
| 2011/0103310 A1 | 5/2011 | Stojanovski et al. |
| 2011/0176531 A1 | 7/2011 | Rune et al. |
| 2011/0213953 A1* | 9/2011 | Challener et al. ............ 713/2 |
| 2011/0235595 A1* | 9/2011 | Mehta et al. ............ 370/329 |
| 2012/0188895 A1 | 7/2012 | Punz et al. |
| 2012/0243432 A1 | 9/2012 | Liebsch et al. |

FOREIGN PATENT DOCUMENTS

| | | |
|---|---|---|
| WO | WO2011018235 A1 | 2/2011 |
| WO | 2011091861 A1 | 8/2011 |
| WO | 2011101131 A1 | 8/2011 |

OTHER PUBLICATIONS

International Search Report and Written Opinion of the ISA dated Feb. 22, 2013—International Application No. PCT/EP2012/071486.

Kundalkar et al., "LIPA: Local IP Access via Home Node B", Nov. 13, 2009.

Pending U.S. Patent Application entitled "Mobile Network Services in a Mobile Data Network", U.S. Appl. No. 13/233,812, filed Sep. 15, 2011 by Bruce O. Anthony, Jr. et al.

Opengear Quad-Band GSM/UMTS/HSPA Cellular Appliance Gains PTCRB Certification, Oct. 20, 2010.

PSE 3G VAS Genie, www.mirial.com, Sep. 21, 2011.

UMTS/HSDPA connection with UTM-1 Edge Appliance an T-D1 SIM, http://cpshared.com/forums/showthread.php?t=153, Sep. 21, 2011.

Pending U.S. Patent Application entitled "Data Breakout At the Edge of a Mobile Data Network", U.S. Appl. No. 13/297,770, filed Nov. 16, 2011 by Bruce O. Anthony, Jr. et al.

Pending U.S. Patent Application entitled "Data Breakout Appliance At the Edge of a Mobile Data Network", U.S. Appl. No. 13/297,807, filed Nov. 16, 2011 by William F. Berg et al.

\* cited by examiner

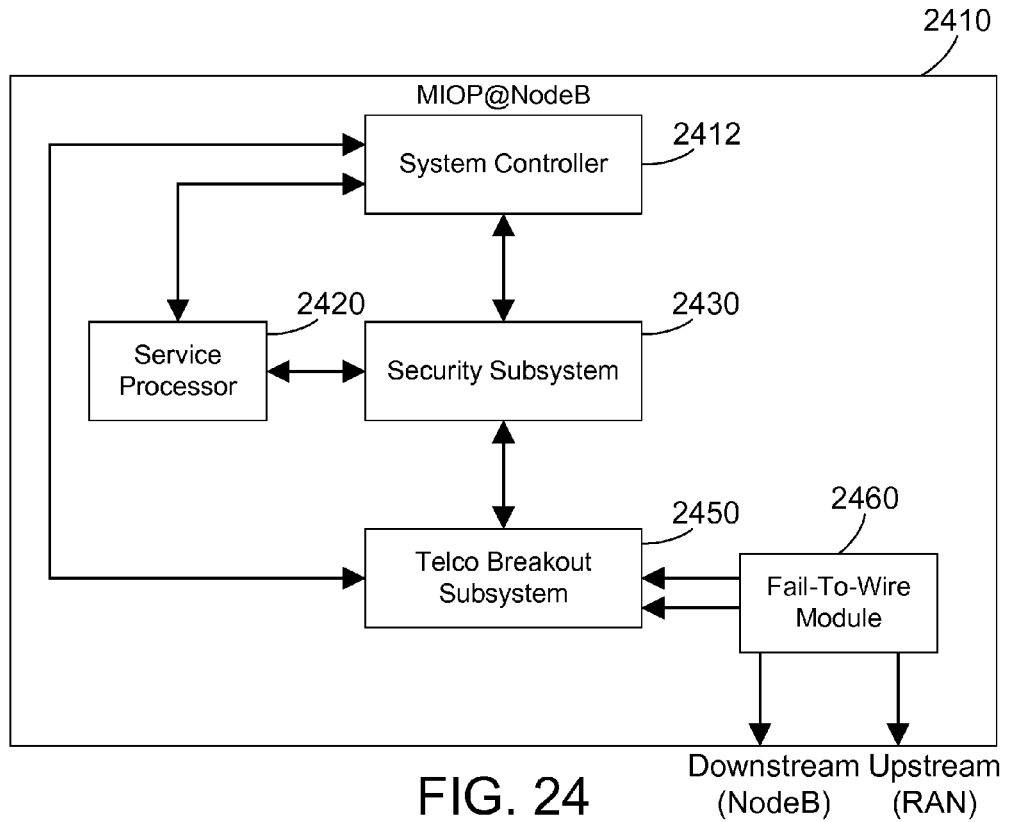
FIG. 24
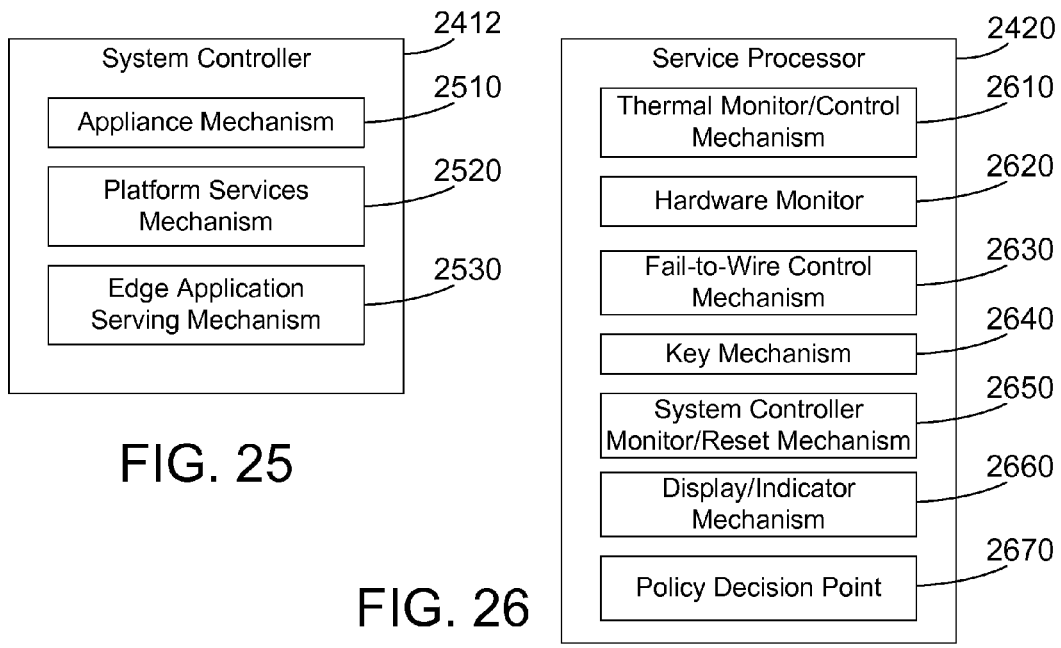
FIG. 25
FIG. 26

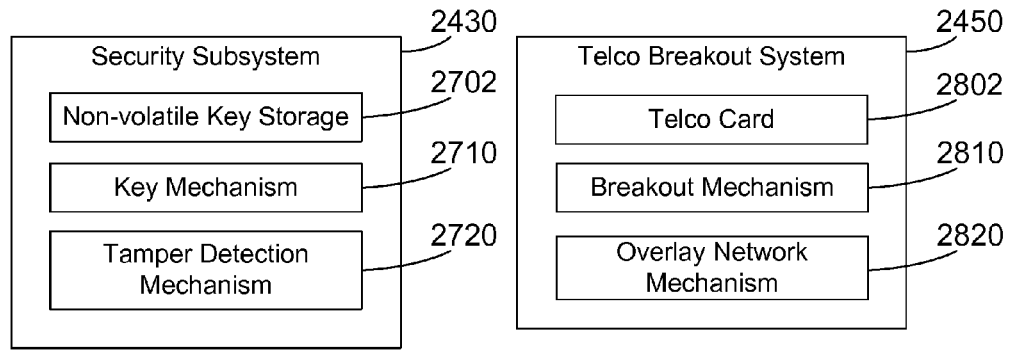
FIG. 27
FIG. 28
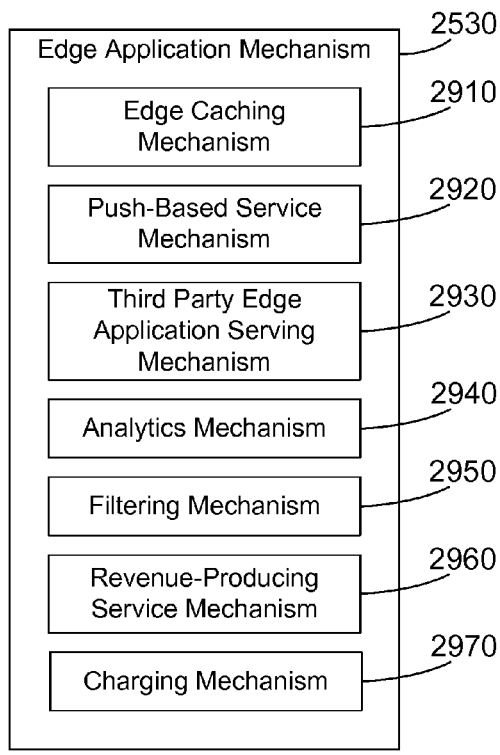
FIG. 29

| Commands | Interface |
| --- | --- |
| Configuration Management | CLI for all commands except file transfer commands<br>SCP for file transfer commands |
| Performance Management | CLI for all commands except file transfer commands<br>SCP for file transfer commands |
| Fault/Diagnostic Management | CLI for all commands except alarm traps and file transfer commands<br>SNMP for alarm traps<br>SCP for file transfer commands |
| Security Management | CLI for all commands except file transfer commands<br>SCP for file transfer commands |
| Network Management | CLI for all commands |
| Breakout Management | CLI for all commands |
| Appliance Platform Management | CLI for all commands except file transfer commands<br>SCP for file transfer commands |
| Edge Application Management | CLI for all commands except file transfer commands<br>SCP for file transfer commands |
| Alarm Management | SNMP for all commands |
| File Transfer Management | SCP for all commands |

FIG. 42

XML File

5210 — Endpoint ID For Breakout system     5140
5215
5220 — Public Key for Service Processor
       — Service Processor PCR values
5225
5230 — Public Key for System Controller
       — System Controller PCR values
5235
5240 — Public Key for Virtual Machine
       — Virtual Machine PCR values

FIG. 52

Inventory Record With Verification Data (From Inventory Management Data) 5310

| | Endpoint ID | | | | | | |
|---|---|---|---|---|---|---|---|
| 5315 | Endpoint ID | | | | | | |
| 5316 | Service Processor | Hardware | Software | Public Key | PCR1 | PCR2 | PCRn |
| 5317 | System Controller | Hardware | Software | Public Key | PCR1 | PCR2 | PCRn |
| 5318 | Telco Breakout | Hardware | Software | Public Key | PCR1 | PCR2 | PCRn |
| 5319 | VM1 | Hardware | Software | Public Key | PCR1 | PCR2 | PCRn |
| 5320 | VMn | Hardware | Software | Public Key | PCR1 | PCR2 | PCRn |

VALIDATING A SYSTEM WITH MULTIPLE SUBSYSTEMS USING TRUSTED PLATFORM MODULES AND VIRTUAL PLATFORM MODULES

BACKGROUND

1. Technical Field

This disclosure generally relates to a system such as a mobile data network with multiple subsystems, and more specifically to a method and apparatus for validating the system with trusted platform modules and virtual platform modules.

2. Background Art

Mobile phones and other devices are increasingly demanding large amounts of data to be sent over mobile data networks. Mobile data networks have evolved as well to provide the data services that new mobile devices require. Mobile data networks include very expensive hardware and software, so upgrading the capability of existing networks is not an easy thing to do. It is not economically feasible for a mobile network provider to simply replace all older equipment with new equipment due to the expense of replacing the equipment. For example, the next generation wireless network in the United States is the 4G network. Many mobile data network providers are still struggling to get their entire system upgraded to provide 3G data services. Immediately upgrading to 4G equipment is not an economically viable option for most mobile data network providers. In many locations, portions of the mobile data network are connected together by point to point microwave links. These microwave links have limited bandwidth. To significantly boost the throughput of this links requires the microwave links to be replaced with fiber optic cable but this option is very costly.

To facilitate additional capacity on mobile networks, a new "edge server" or "breakout system" is being developed by International Business Machines Corporation (IBM). The breakout system or edge server is part of as a Mobile Internet Optimization Platform (MIOP). The MIOP component corresponding to each basestation is referred to as a MIOP@ NodeB. The MIOP@ NodeB offloads data streams such as internet data streams for at the edge processing while passing through the voice streams to the backend of the network. As used herein, the term "breakout system" in general means a system that connects between two computer systems on a data network and passes on some of the data on the data network between the two systems while breaking out for local processing other data streams normally flowing between the two computer systems on the data network. A breakout system could broadly be construed as a network processing device or mechanism capable of routing all or part of the network traffic on a network data path between two other nodes through itself.

The breakout system comprises multiple subsystems. Further, the breakout system may be deployed as an appliance. Just like in other complex systems, it is important to be able to validate the software loaded in the various subsystems of the breakout system to insure the integrity of the entire mobile data network.

BRIEF SUMMARY

Software validation is provided for a breakout system having multiple subsystems at the edge of a mobile data network. The software validation utilizes one or more trusted platform modules (TPM) to secure multiple subsystems including virtual machines in the breakout system. Hash values for the software in the various subsystems are placed in Platform Configuration Registers (PCRs) of the TPM. The TPM cryptographically signs quotes, which are a collection of hash values from the PCRs. The breakout system produces an extensible markup language (XML) file with the signed quotes related to the subsystems and sends them to a network management system for verification. The network management system validates the software configured on the breakout system using a public key that correlates to it's TPM (including virtual TPMs) by comparing the quote values to known good values stored in an inventory record associated with the specific breakout system being validated.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 24 is a block diagram of one specific hardware architecture for MIOP@ NodeB;

FIG. 25 is a block diagram of the system controller shown in FIG. 24;

FIG. 26 is a block diagram of the service processor shown in FIG. 24;

FIG. 27 is a block diagram of the security subsystem shown in FIG. 24;

FIG. 28 is a block diagram of the telco breakout system shown in FIG. 24;

FIG. 29 is a block diagram of the edge application mechanism 2530 shown in FIG. 25 that performs multiple services at the edge of a mobile data network based on data broken-out at the edge of the mobile data network;

FIG. 42 is a table showing which commands are defined for the appliance interfaces;

FIG. 30 is a block diagram that illustrates the data paths of the fail-to-wire module when connected to a breakout system between a downstream computer and an upstream computer;

FIG. 52 is a simplified example of information stored in an XML file to communicate validation quotes to the management system of the mobile data network;

FIG. 53 is a block diagram that illustrates an inventory record with verification data for a breakout appliance;

DETAILED DESCRIPTION

Software validation is provided for a breakout system having multiple subsystems at the edge of a mobile data network. The software validation utilizes one or more trusted platform modules (TPM) to secure multiple subsystems including virtual machines in the breakout system. Hash values for the software in the various subsystems are placed in Platform Configuration Registers (PCRs) of the TPM. The TPM cryptographically signs quotes, which are a collection of hash values from the PCRs. The breakout system produces an extensible markup language (XML) file with the signed quotes related to the subsystems and sends them to a network management system for verification. The network management system validates the software configured on the breakout system using a public key to access the quotes and compares the values to known good values stored in an inventory record associated with the specific breakout system being validated.

Mobile network services are performed in an appliance in a mobile data network in a way that is transparent to most of the existing equipment in the mobile data network. The mobile data network includes a radio access network and a core network. The appliance in the radio access network breaks out data coming from a basestation, and performs one or more mobile network services at the edge of the mobile data network based on the broken out data. The appliance has defined interfaces and defined commands on each interface that allow performing all needed functions on the appliance without revealing details regarding the hardware and software used to implement the appliance. This appliance architecture allows performing new mobile network services at the edge of a mobile data network within the infrastructure of an existing mobile data network.

Figure 1:
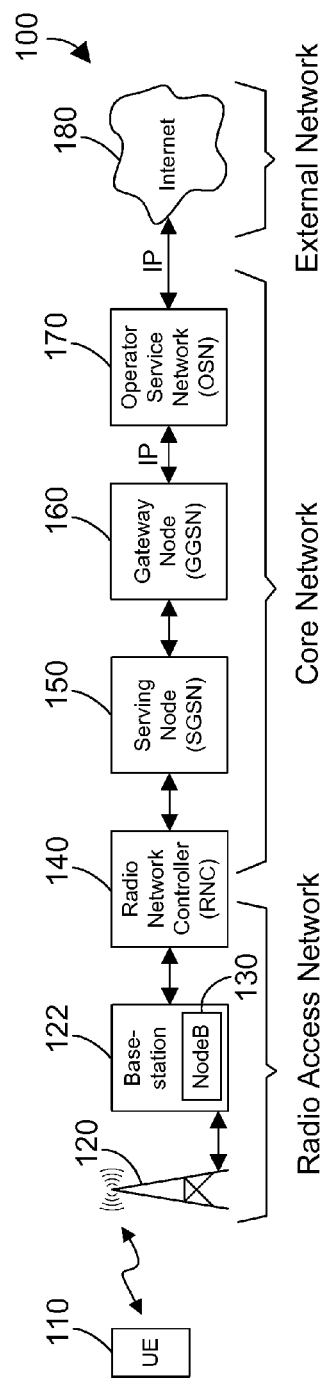
FIG. 1 is a block diagram of a prior art mobile data network.

Referring to FIG. 1, a prior art mobile data network 100 is shown. Mobile data network 100 is representative of known 3G networks. The mobile data network 100 preferably includes a radio access network (RAN), a core network, and an external network, as shown in FIG. 1. The radio access network includes the tower 120, basestation 122 with its corresponding NodeB 130, and a radio interface on a radio network controller (RNC) 140. The core network includes a network interface on the radio network controller 140, the serving node 150, gateway node 160 and operator service network 170 (as part of the mobile data network). The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110 to the appropriate external network. As anchor point the gateway node 160 supports the mobility of the user equipment 110. In essence, the gateway node 160 maintains routing necessary to tunnel the network packets to the serving node 150 that services a particular user equipment 110.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some efforts have been made to offload internet traffic to reduce the backhaul on the mobile data network. For example, some mobile data networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Figure 2:
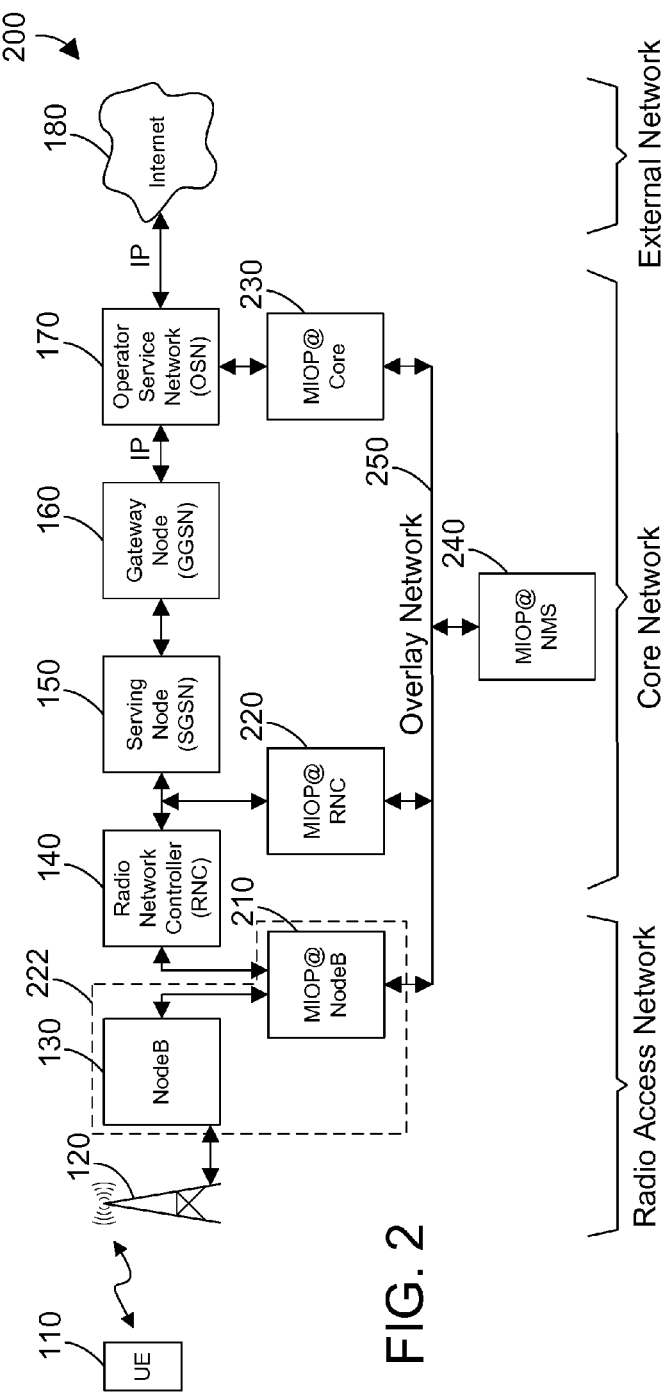
FIG. 2 is a block diagram of a mobile data network that includes first, second and third service mechanisms that all communicate via an overlay network.

Referring to FIG. 2, a mobile data network 200 includes mechanisms that provide various services for the mobile data network in a way that is transparent to most of the existing equipment in the mobile data network. FIG. 2 shows user equipment 110, tower 120, NodeB 130, radio network controller 140, serving node 150, gateway node 160, operator service node 170, and internet 180, the same as shown in FIG. 1. The additions to the mobile data network 200 when compared with the prior art mobile data network 100 in FIG. 1 include the addition of three components that may provide mobile network services in the mobile data network, along with a network management mechanism to manage the three components. The mobile network services are performed by what is called herein a Mobile Internet Optimization Platform (MIOP), and the mobile network services performed by the Mobile Internet Optimization Platform are referred to herein as MIOP services. The three MIOP components that provide these mobile network services are shown in FIG. 2 as MIOP@ NodeB 210, MIOP@ RNC 220 and MIOP@ Core 230. A network management system shown as MIOP@ NMS 240 manages the overall solution by: 1) managing the function of the three MIOP components 210, 220 and 230; 2) determining which MIOP@ NodeBs in the system aggregate to which MIOP@ RNCs via the overlay network for performance, fault and configuration management; and 3) monitoring performance of the MIOP@ NodeBs to dynamically change and configure the mobile network services. The MIOP@ NodeB 210, MIOP@ RNC 220, MIOP@ Core 230, MIOP@ NMS 240, and the overlay network 250, and any subset of these, and are referred to herein as MIOP components.

The mobile network services provided by MIOP@ NodeB 210, MIOP@ RNC 220, and MIOP@ Core 230 include any suitable services on the mobile data network, such as data optimizations, RAN-aware services, subscriber-aware services, edge-based application serving, edge-based analytics, etc. All mobile network services performed by all of MIOP@ NodeB 210, MIOP@ RNC 220, and MIOP@ Core 230 are included in the term MIOP services as used herein. In addition to the services being offer in the MIOP components MIOP@ NodeB 210, MIOP@ RNC 220, and MIOP@ Core 230, the various MIOP services could also be provided in a cloud based manner.

MIOP@ NodeB 210 includes a first service mechanism and is referred to as the "edge" based portion of the MIOP solution. MIOP@ NodeB 210 resides in the radio access network and has the ability to intercept all traffic to and from the NodeB 130. MIOP@ NodeB 210 preferably resides in the base station 222 shown by the dotted box in FIG. 2. Thus, all data to and from the NodeB 130 to and from the radio network controller 140 is routed through MIOP@ NodeB 210. MIOP@ NodeB performs what is referred to herein as breakout of data on the intercepted data stream. MIOP @ NodeB monitors the signaling traffic between NodeB and RNC and on connection setup intercepts in particular the setup of the transport layer (allocation of the UDP Port, IP address or AAL2 channel). For registered sessions the breakout mechanism 410 will be configured in a way that all traffic belonging to this UDP Port, IP address to AAL2 channel will be forwarded to an data offload function. MIOP@ NodeB 210 thus performs breakout of data by defining a previously-existing path in the radio access network for non-broken out data, by defining a new second data path that did not previously exist in the radio access network for broken out data, identifying data received from a corresponding NodeB as data to be broken out, sending the data to be broken out on the second data path, and forwarding other data that is not broken out on the first data path. The signaling received by MIOP@ NodeB 210 from NodeB 130 is forwarded to RNC 140 on the existing network connection to RNC 140, even though the data traffic is broken out. Thus, RNC 140 sees the signaling traffic and knows the subscriber session is active, but does not see the user data that is broken out by MIOP@ NodeB 210. MIOP@ NodeB thus performs two distinct functions depending on the monitored data packets: 1) forward the data packets to RNC 140 for signaling traffic and user data that is not broken out (including voice calls); and 2) re-route the data packets for user data that is broken out.

Once MIOP@ NodeB 210 breaks out user data it can perform any suitable service based on the traffic type of the broken out data. Because the services performed by MIOP@ NodeB 210 are performed in the radio access network (e.g., at the basestation 222), the MIOP@ NodeB 210 can service the user equipment 110 much more quickly than can the radio network controller 140. In addition, by having a MIOP@ NodeB 210 that is dedicated to a particular NodeB 130, one MIOP@ NodeB only needs to service those subscribers that are currently connected via a single NodeB. The radio network controller, in contrast, which typically services dozens or even hundreds of basestations, must service all the subscribers accessing all basestations it controls from a remote location. As a result, MIOP@ NodeB is in a much better position to provide services that will improve the quality of service and experience for subscribers than is the radio network controller.

Breaking out data in the radio access network by MIOP@ NodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@ RNC 220 includes a second service mechanism in mobile data network 200. MIOP@ RNC 220 monitors all communication between the radio network controller 140 and serving node 150. The monitored communications are all communications to and from the radio network controller and the rest of the core network. MIOP@ RNC 220 may provide one or more services for the mobile data network. MIOP@ RNC 220 preferably makes the decision of whether or not to allow breakout of data. If MIOP@ RNC 220 decides to breakout data for a given subscriber session, it may send a message to MIOP@ NodeB 210 authorizing breakout by MIOP@ NodeB 210, or may decide to breakout the data at MIOP@ RNC 220, depending on the configured breakout decision criteria and selected radio channel. Because messages to and from the core network establishing the PDP context for a given subscriber session are monitored by MIOP@ RNC 220, the decision of whether or not to breakout data resides in the MIOP@ RNC 220.

MIOP@ Core 230 includes a third service mechanism in the mobile data network 200. MIOP@ Core 230 may include all the same services as MIOP@ RNC 220, or any suitable subset of those services. If the decision is made not to provide services at MIOP@ NodeB 210 or MIOP@ RNC 220, these same services plus more sophisticated services can be performed at MIOP@ Core 230. Thus, mobile data network 200 provides flexibility by allowing a decision to be made of where to perform which services. Because MIOP@ NodeB 210, MIOP@ RNC 220 and MIOP@ Core 230 preferably include some of the same services, the services between components may interact (e.g., MIOP@ NodeB and MIOP@ Core may interact to optimize TCP traffic between them), or the services may be distributed across the mobile data network (e.g., MIOP@ NodeB performs breakout and provides services for high-speed traffic, MIOP@ RNC performs breakout and provides services for low-speed traffic, and MIOP@ Core provides services for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@ NMS 240 is a network management system that monitors and controls the functions of MIOP@ NodeB 210, MIOP@ RNC 220, and MIOP@ Core 230. MIOP @ NMS 240 preferably includes MIOP internal real-time or near real-time performance data monitoring to determine if historical or additional regional dynamic changes are needed to improve services on the mobile data network 200. MIOP@ NMS 240 provides a user interface that allows a system administrator to operate and to configure how the MIOP components 210, 220 and 230 function.

The overlay network 250 allows MIOP@ NodeB 210, MIOP@ RNC 220, MIOP@ Core 230, and MIOP@ NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

Figure 3:
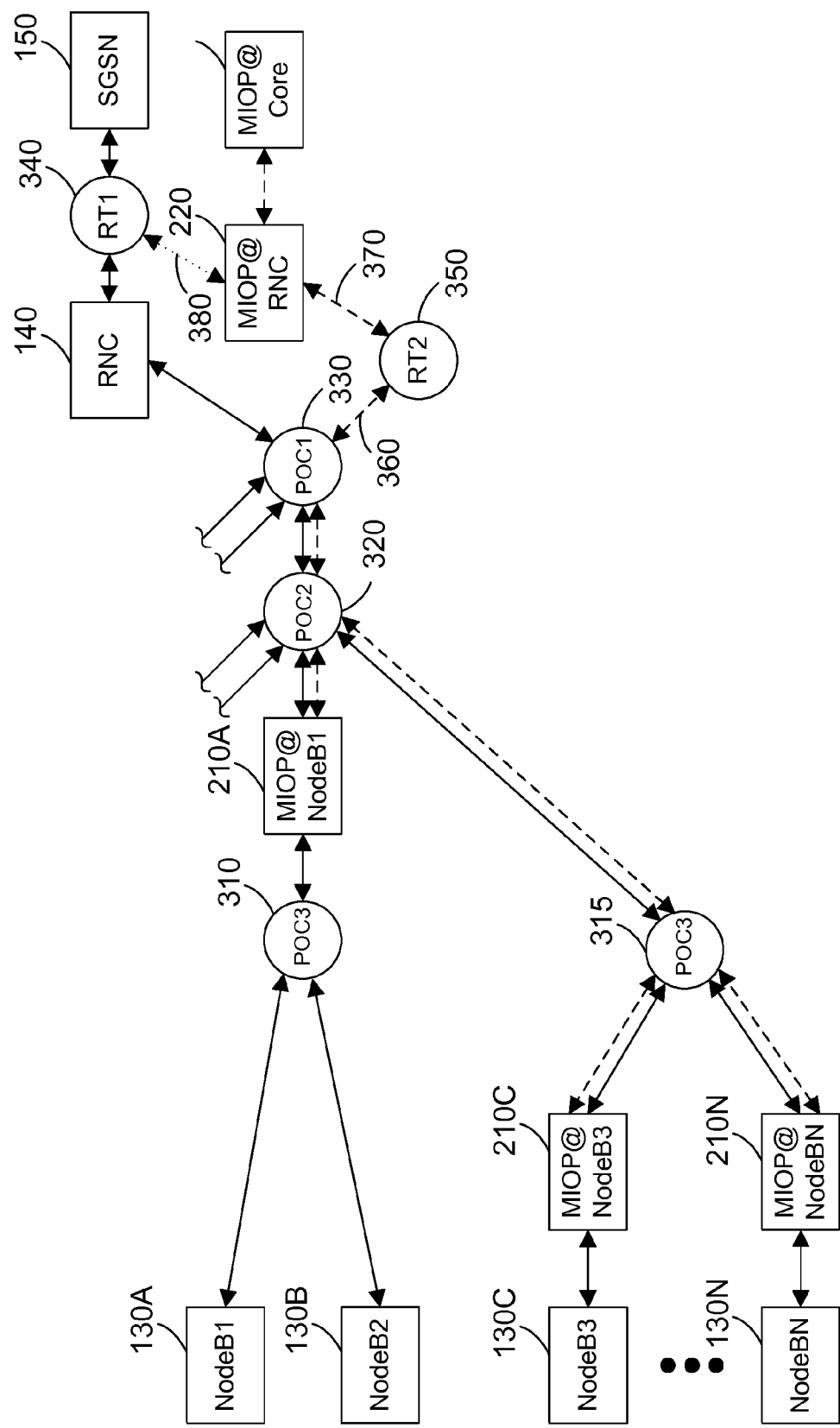
FIG. 3 is a block diagram of one possible implementation for parts of the mobile data network shown in FIG. 2 to illustrate the overlay network.

FIG. 3 shows one suitable implementation of a physical network and the overlay network in a sample mobile data system. The existing physical network in the mobile data network before the addition of the MIOP@ NodeB 210, MIOP@ RNC 220, and MIOP@ Core 230 is shown by the solid lines with arrows. This specific example in FIG. 3 includes many NodeBs, shown in FIG. 1 as 130A, 130B, 130C, . . . , 130N. Some of the NodeBs have a corresponding MIOP@ NodeB. FIG. 3 illustrates that MIOP@ NodeBs (such as 210A and 210N) can be placed in a basestation with its corresponding NodeB, or can be placed upstream in the network after a point of concentration (such as 210A after POC3 310). FIG. 3 also illustrates that a single MIOP@ NodeB such as MIOP@ NodeB1 210A can service two different NodeBs, such as NodeB1 130A and NodeB2 130B. Part of the overlay network is shown by the dotted lines between MIOP@ NodeB1 210A and second point of concentration POC2 320, between MIOP@ NodeB3 210C and POC3 315, between MIOP@ NodeBN 210N and POC3 315, and between POC3 315 and POC2 320. Note the overlay network in the radio access network portion is a virtual private network that is implemented on the existing physical network connections. The overlay network allows the MIOP@ NodeBs 210A, 210C and 210N to communicate with each other directly, which makes some services possible in the mobile data network 200 that were previously impossible. FIG. 3 shows MIOP@ NodeB1 210A connected to a second point of concentration POC2 320. The broken arrows coming in from above at POC2 320 represent connections to other NodeBs, and could also include connections to other MIOP@ NodeBs. Similarly, POC2 320 is connected to a third point of concentration POC1 330, with possibly other NodeBs or MIOP@ NodeBs connected to POC1. The RNC 140 is shown connected to POC1 330, and to a first router RT1 340 in the core network. The router RT1 340 is also connected to the SGSN 150. While not shown in FIG. 3 for the sake of simplicity, it is understood that SGSN in FIG. 3 is also connected to the upstream core components shown in FIG. 2, including GGSN 160, OSN 170 and internet 180.

As shown in FIG. 3, the overlay network from the NodeBs to POC1 330 is a virtual private network implemented on existing physical network connections. However, the overlay network requires a second router RT2 350, which is connected via a physical network connection 360 to POC1 330, and is connected via physical network connection 370 to MIOP@ RNC 220. This second router RT2 350 may be a separate router, or may be a router implemented within MIOP@ RNC 220. MIOP@ RNC 220 is also connected to router RT1 340 via a physical network connection 380, and is also connected to MIOP@ Core 230. Physical connection 380 in FIG. 3 is shown in a line with short dots because it is not part of the pre-existing physical network before adding the MIOP components (arrows with solid lines) and is not part of the overlay network (arrows with long dots). Note the connection from MIOP@ RNC 220 to MIOP@ Core 230 is via existing physical networks in the core network.

We can see from the configuration of the physical network and overlay network in FIG. 3 that minimal changes are needed to the existing mobile data network to install the MIOP components. The most that must be added is one new router 350 and three new physical network connections 360, 370 and 380. Once the new router 350 and new physical network connections 360, 370 and 380 are installed, the router 350 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the NodeBs to POC1. From POC1 the overlay network is on connection 360 to RT2 350, and on connection 370 to MIOP@ RNC 220. Thus, when MIOP@ NodeB 210 in FIG. 2 needs to send a message to MIOP@ RNC 220, the message is sent by sending packets via a virtual private network on the physical network connections to POC1, then to RT2 350, then to MIOP@ RNC 220. Virtual private networks are well-known in the art, so they are not discussed in more detail here.

Figure 4:
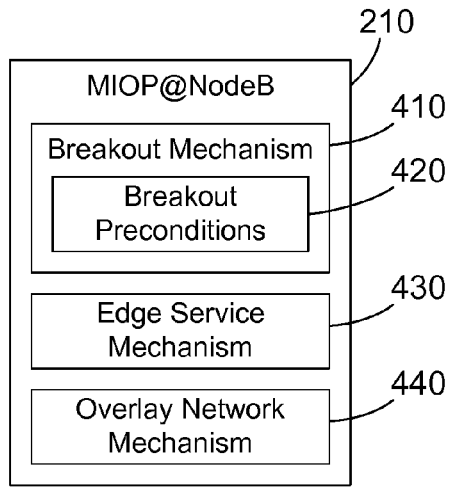
FIG. 4 is a block diagram of the MIOP@ NodeB shown in FIG. 2, which includes a first service mechanism.

Referring to FIG. 4, MIOP@ NodeB 210 preferably includes a breakout mechanism 410, an edge service mechanism 430, and an overlay network mechanism 440. The breakout mechanism 410 determines breakout preconditions 420 that, when satisfied, allow breakout to occur at this edge location. Breakout mechanism 410 in MIOP@ NodeB 210 communicates with the breakout mechanism 510 in MIOP@ RNC 220 shown in FIG. 5 to reach a breakout decision. The breakout mechanism 410, after receiving a message from MIOP@ RNC 220 authorizing breakout on connection setup intercepts in particular the setup of the transport layer (allocation of the UDP Port, IP address or AAL2 channel). For authorized sessions the breakout mechanism 410 will be configured in a way that all traffic belonging to this UDP Port, IP address to AAL2 channel will be forwarded to a data offload function. For traffic that should not be broken out, the breakout mechanism 410 sends the data on the original data path in the radio access network. In essence, MIOP@ NodeB 210 intercepts all communications to and from the basestation 130, and can perform services "at the edge", meaning at the edge of the radio access network that is close to the user equipment 110. By performing services at the edge, the services to subscribers may be increased or optimizes without requiring hardware changes to existing equipment in the mobile data network.

The breakout mechanism 410 preferably includes breakout preconditions 420 that specify one or more criterion that must be satisfied before breakout of data is allowed. One suitable example of breakout preconditions is the speed of the channel. In one possible implementation, only high-speed channels will be broken out at MIOP@ NodeB 210. Thus, breakout preconditions 420 could specify that subscribers on high-speed channels may be broken out, while subscribers on low-speed channels are not broken out at MIOP@ NodeB 210. When the breakout preconditions 420 are satisfied, the MIOP@ NodeB 210 registers the subscriber session with MIOP@ RNC 220. This is shown in method 800 in FIG. 8. MIOP@ NodeB 210 intercepts and monitors network traffic to and from NodeB (basestation) (step 810). When the traffic does not satisfy the breakout preconditions (step 820=NO), method 800 returns to step 810. When the traffic satisfies the breakout conditions (step 820=YES), MIOP@ NodeB 210 sends a message to MIOP@ RNC 220 on the overlay network 250 to register the subscriber session for breakout (step 830). With the subscriber session registered with MIOP@ RNC 220, the MIOP@ RNC 220 will determine whether or not to breakout data for the subscriber session, and where the breakout is done, as explained in more detail below.

Referring back to FIG. 4, MIOP@ NodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG. 4, the first service mechanism could include both breakout mechanism 410 and edge service mechanism 430.

MIOP@ NodeB 210 also includes an overlay network mechanism 440. The overlay network mechanism 440 provides a connection to the overlay network 250 in FIG. 2, thereby allowing MIOP@ NodeB 210 to communicate with MIOP@ RNC 220, MIOP@ Core 230, and MIOP@ NMS 240. As stated above, the overlay network 250 is preferably a virtual private network primarily on an existing physical network in the mobile data network 200.

Figure 5:
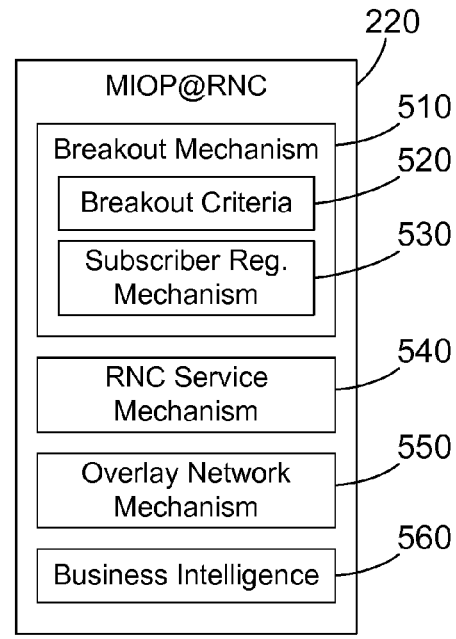
FIG. 5 is a block diagram of the MIOP@ RNC shown in FIG. 2, which includes a second service mechanism.
Figure 8:
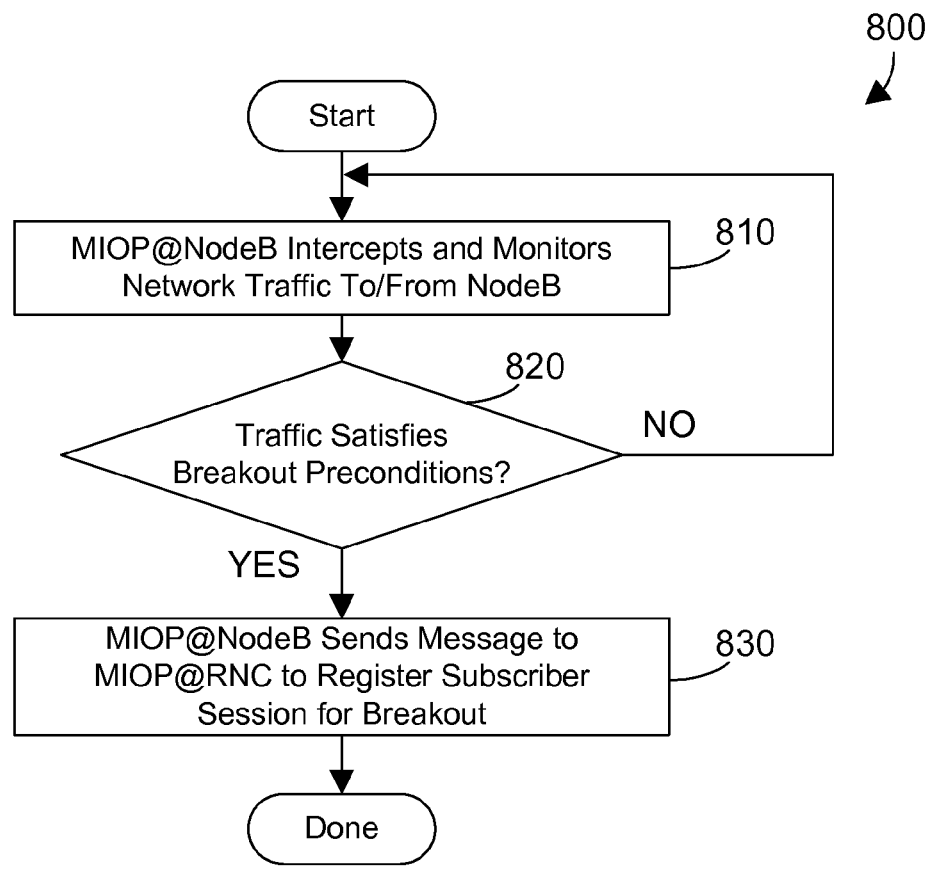
FIG. 8 is a flow diagram of a method performed by MIOP@ NodeB shown in FIGS. 2 and 4.

Referring to FIG. 5, MIOP@ RNC 220 preferably includes a breakout mechanism 510, an RNC service mechanism 540, an overlay network mechanism 550, and business intelligence 560. Breakout mechanism 510 includes breakout criteria 520 that specifies one or more criterion that, when satisfied, allows breakout of data. Subscriber registration mechanism 530 receives messages from MIOP@ NodeB 210, and registers subscriber sessions for which the breakout preconditions 420 in MIOP@ NodeB 210 are satisfied. When the breakout mechanism 510 determines the breakout criteria 520 is satisfied, the breakout mechanism 510 will then determine where the breakout should occur. When the breakout can occur at MIOP@ NodeB 210, the MIOP@ RNC 220 sends a message to MIOP@ NodeB 210 on the overlay network 250 authorizing breakout at MIOP@ NodeB 210. When the breakout should occur at MIOP@ RNC 220, the breakout mechanism 510 in MIOP@ RNC 220 performs the breakout as well for the traffic remaining then). This is shown in more detail in method 1000 in FIG. 10. MIOP@ RNC monitors network traffic between the radio network controller 140 and the serving node 150 (step 1010). When the traffic does not satisfy the breakout criteria (step 1020=NO), method 1000 loops back to step 1010. When the network traffic satisfies the breakout criteria (step 1020=YES), the breakout mechanism 510 determines whether the subscriber session is registered for breakout (step 1030). A subscriber session is registered for breakout when the MIOP@ NodeB 210 determined the traffic satisfied the breakout preconditions and registered the subscriber session for breakout, as shown in FIG. 8. Returning to FIG. 10, when the subscriber is registered for breakout (step 1030=YES), MIOP@ RNC 220 sends a message via the overlay network 250 to MIOP@ NodeB 210 authorizing breakout of traffic for the subscriber session (step 1040). MIOP@ NodeB 210 may then breakout traffic for the subscriber session (step 1050). When the subscriber is not registered for breakout (step 1030=NO), method 1000 checks to see if MIOP@ RNC is going to do breakout (step 1060). If not (step 1060=NO), method 1000 is done. When MIOP@ RNC is going to do breakout (step 1060=YES), the traffic is then broken out at MIOP@ RNC (step 1070).

Figure 10:
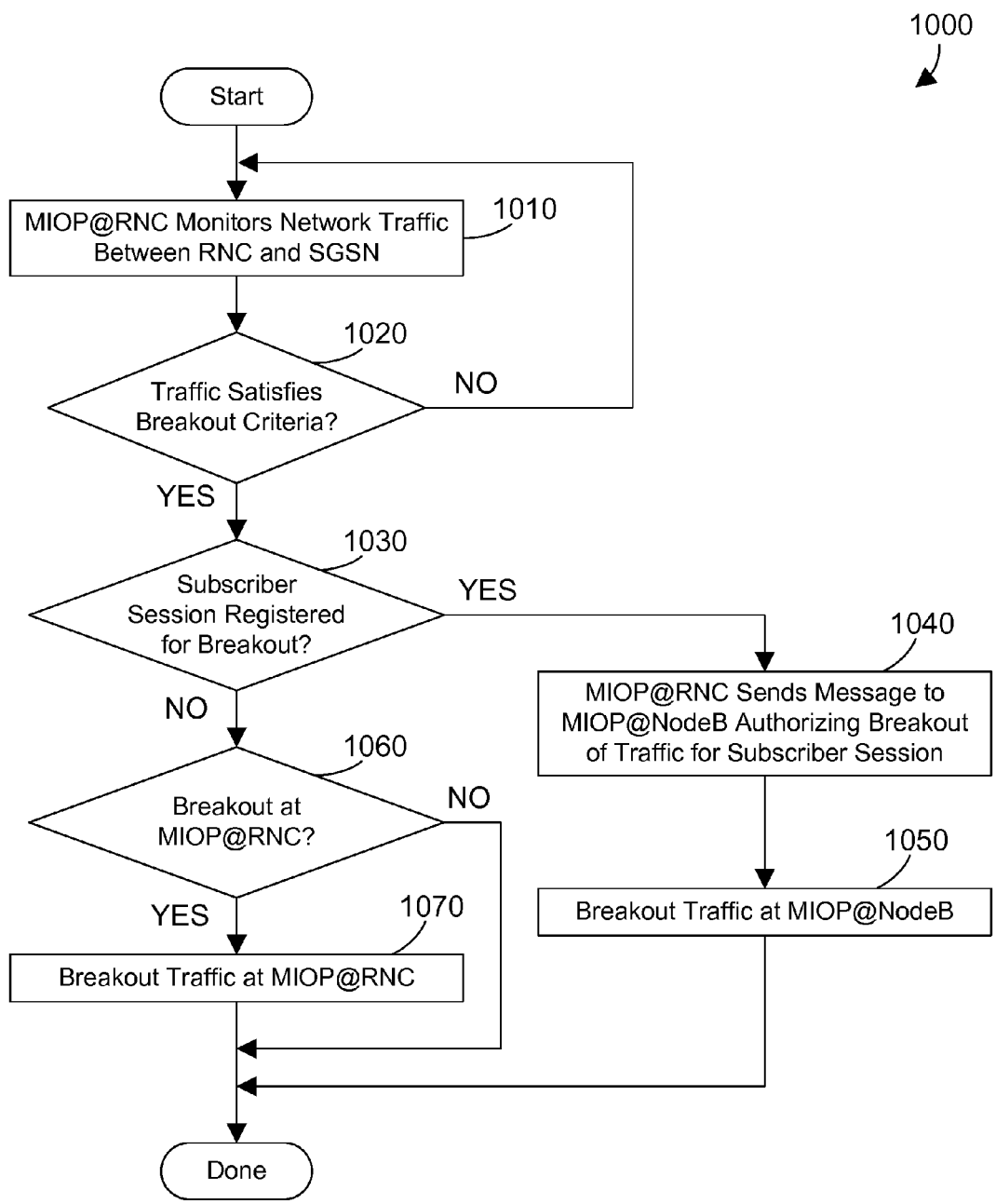
FIG. 10 is a flow diagram of a method for the MIOP@ NodeB and MIOP@ RNC to determine when to break out data.

In one specific example, the breakout preconditions specify only high-speed channels are broken out at MIOP@ NodeB 210, and when the breakout preconditions are satisfied, the subscriber session is registered for breakout, as shown in FIG. 8. FIG. 10 illustrates that even when the breakout preconditions are not satisfied, breakout can still be performed at MIOP@ RNC 220. Thus, even if the subscriber session is on a low-speed channel, if all the other breakout criteria are satisfied, breakout of the low-speed channel may be performed at MIOP@ RNC 220. The mobile data network 200 thus provides great flexibility in determining when to do breakout and where.

Referring back to FIG. 5, the RNC service mechanism 540 provides one or more services for the mobile data network. RNC service mechanism 540 is the second of three service mechanisms in the MIOP components. The RNC service mechanism 540 may include any suitable service for the mobile data network, including without limitation caching of data, data or video compression techniques, push-based services, charging, application serving, analytics, security, data filtering, new revenue-producing services, etc.

While the breakout mechanism 510 and RNC service mechanism 540 are shown as separate entities in FIG. 5, the second service mechanism could include both breakout mechanism 510 and RNC service mechanism 540. The overlay network mechanism 550 is similar to the overlay network mechanism 440 in FIG. 4, providing a logical network connection to the other MIOP components on the overlay network 250 in FIG. 2. MIOP@ RNC 220 also includes business intelligence 560, which includes:
  1) historical subscriber information received from the mobile data network over time, such as mobility and location, volumes, traffic types, equipment used, etc.
  2) network awareness, including NodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/ referral URLs for a given site, session tracking, etc.
  3) association of flow control procedures between NodeB and RNC to subscribers.

The business intelligence 560 may be instrumented by the RNC service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Figure 6:
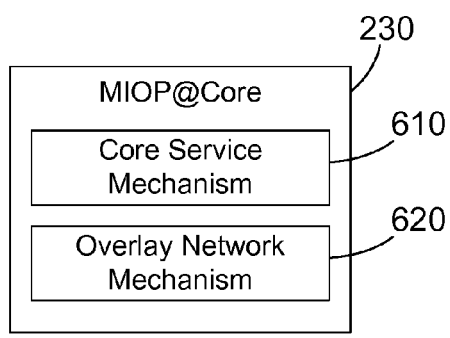
FIG. 6 is a block diagram of the MIOP@ Core shown in FIG. 2, which includes a third service mechanism.

Referring to FIG. 6, the MIOP@ Core 230 includes a core service mechanism 610 and an overlay network mechanism 620. Core service mechanism 610 provides one or more services for the mobile data network. Core service mechanism 610 is the third of three service mechanisms in the MIOP components. The core service mechanism 610 may include any suitable service for the mobile data network, including without limitation caching of data, data or video compression techniques, push-based services, charging, application serving, analytics, security, data filtering, new revenue-producing services, etc. In one specific implementation, the MIOP@ Core 230 is an optional component, because all needed services could be performed at MIOP@ NodeB 210 and MIOP@ RNC 220. In an alternative implementation, MIOP@ Core 230 performs some services, while MIOP@

RNC performs others or none. The overlay network mechanism 620 is similar to the overlay network mechanisms 440 in FIGS. 4 and 550 in FIG. 5, providing a logical network connection to the other MIOP components on the overlay network 250 in FIG. 2.

Figure 7:
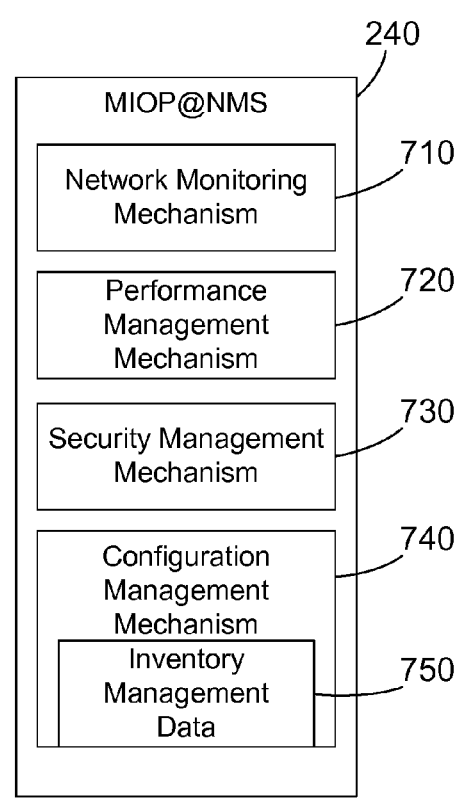
FIG. 7 is a block diagram of a management mechanism coupled to the overlay network that manages the functions of MIOP@ NodeB, MIOP@ RNC, and MIOP@ Core.

Referring to FIG. 7, the MIOP@ NMS 240 is a network management system that monitors and manages performance of the mobile data network 200, and controls the function of MIOP@ NodeB 210, MIOP@ RNC 220, and MIOP@ Core 230. MIOP@ NMS 240 preferably includes a network monitoring mechanism 710, a performance management mechanism 720, a security management mechanism 730, and a configuration management mechanism 740. The network monitoring mechanism 710 monitors network conditions, such as alarms, in the mobile data network 200. The performance management mechanism 720 can enable, disable or refine certain services by supporting the execution of services in real-time or near real-time, such as services that gather information to assess customer satisfaction. The security management mechanism 730 manages security issues in the mobile data network, such as intrusion detection or additional data privacy. The configuration management mechanism 740 controls and manages the configuration of MIOP@ NodeB 210, MIOP@ RNC 220, and MIOP@ Core 230 in a way that allows them to dynamically adapt to any suitable criteria, including data received from the network monitoring mechanism, time of day, information received from business intelligence 560, etc.

Figure 9:
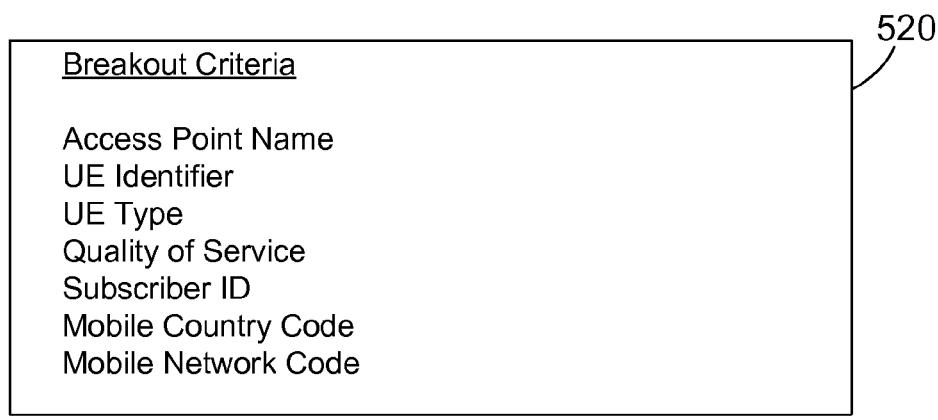
FIG. 9 is a block diagram showing breakout criteria MIOP@ RNC may use in making a decision of whether or not to break out data.
Figure 11:
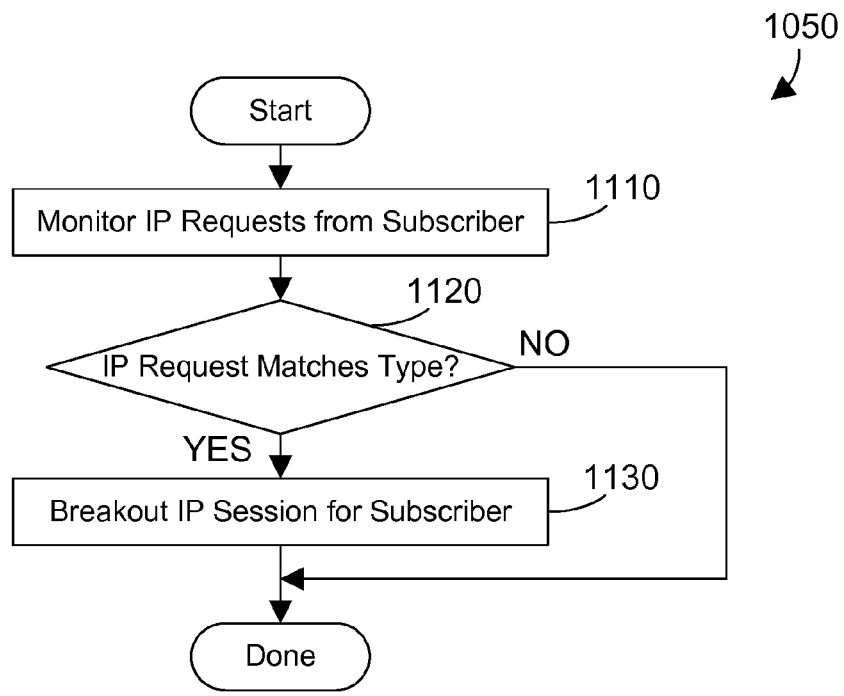
FIG. 11 is a flow diagram of a method for the first service mechanism in MIOP@ NodeB to selectively break out data when break out for a specified subscriber session has been authorized.

FIG. 9 shows sample breakout criteria 520 shown in FIG. 5 and used in step 1020 in FIG. 10. Suitable breakout criteria 520 includes access point name, user equipment identifier, user equipment type, quality of service, subscriber ID, mobile country code, and mobile network code. For example, breakout criteria 520 could specify to perform MIOP services for the operator's subscribers, and not to perform MIOP services for roamers. In another example, the breakout criteria 520 could specify to break out only video requests. A static breakout decision will be performed during PDP Context Activation. Based on IP flows (e.g. shallow packet inspection of the IP 5 tuple) only specific IP flows maybe identified and broken out dynamically within that PDP subscriber session (e.g., VOIP traffic), as discussed in more detail below with respect to FIG. 11. Breakout criteria 520 expressly extends to any suitable criteria for making the breakout decision.

Referring again to FIG. 10, when the traffic satisfies the breakout criteria (step 1020=YES), and the subscriber session is registered for breakout (step 1030=YES), MIOP@ RNC sends a message to MIOP@ NodeB authorizing breakout of traffic for this subscriber session (step 1040). In response, MIOP@ NodeB begins decrypting the bearer, examining the signaling and user IP traffic tunneled through it and may breakout the traffic for this subscriber session (step 1050). Note, however, MIOP@ NodeB may still decide not to breakout all traffic based on other criteria, such as type of IP request the destination of the traffic or the ISO Layer 7 Application of the decrypted user traffic. Determination of the Application may be performed simply by inspection of the IP 5-tuple or optionally via inspection at layer 7 using Deep Packet Inspection (DPI) techniques. This is shown in the specific example in FIG. 11. Method 1050 in FIG. 10 is one suitable implementation of step 1050 in FIG. 10. MIOP@ NodeB monitors IP requests from the subscriber (step 1110). When the user traffic IP request matches a specified type criteria (step 1120=YES), the IP session is broken out for the subscriber (step 1130). When the IP request does not match a specified criteria type (step 1120=NO), no breakout is performed. For example, let's assume that IP requests to access video over the RTP layer 7 Application Protocol are broken out so the video data may be cached in MIOP@ NodeB 210, but other requests, such as Google searches, are not. The MIOP@ NodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@ NodeB. This is one simple example to illustrate additional flexibility and intelligence within MIOP@ NodeB that may determine whether or not to perform breakout for a given subscriber session at the MIOP@ NodeB after being authorized by MIOP@ RNC to perform breakout for that subscriber session. Any suitable criteria could be used to determine what to breakout and when at MIOP@ NodeB once MIOP@ NodeB has been authorized for breakout in step 1040 in FIG. 10.

Figure 12:
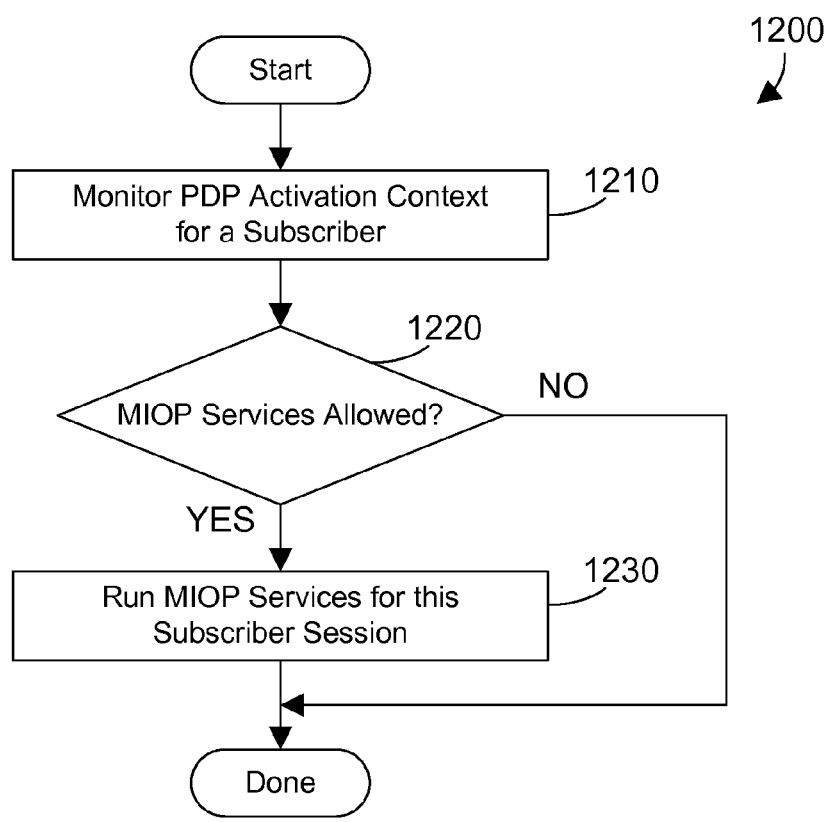
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
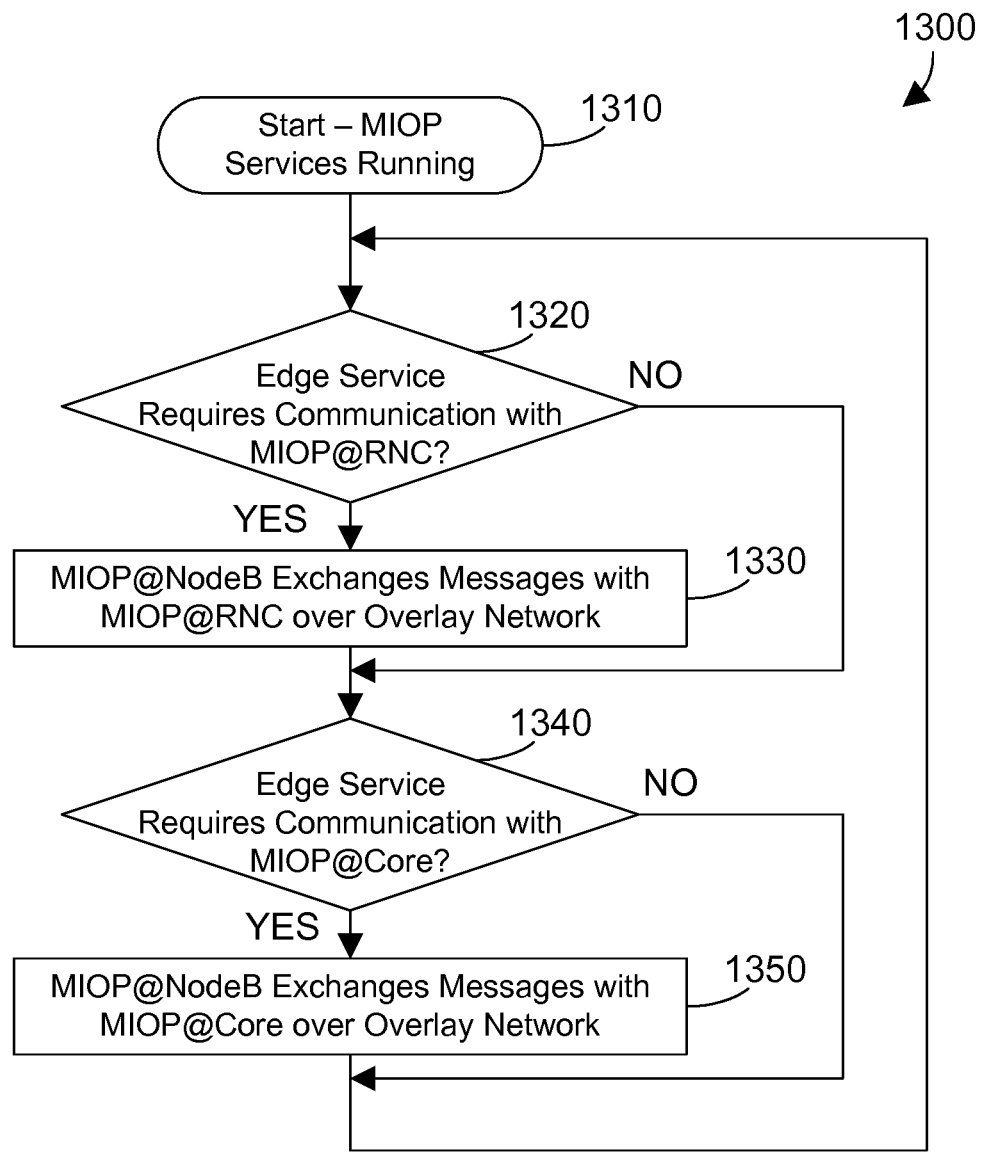
FIGS. 13-15 are flow diagrams that each show communications between MIOP components when MIOP services are running.

MIOP services may require communicating between MIOP components on the overlay network. Referring to FIG. 13, a method 1300 shows communications by MIOP@ NodeB when MIOP services are running (step 1310). When the edge service mechanism requires communication with MIOP@ RNC (step 1320=YES), MIOP@ NodeB exchanges messages with MIOP@ RNC over the overlay network (step 1330). When the edge service mechanism requires communication with MIOP@ Core (step 1340=YES), MIOP@ NodeB exchanges messages with MIOP@ Core over the overlay network (step 1350). The overlay network thus allows the various MIOP components to communicate with each other when MIOP services are running.

Figure 14:
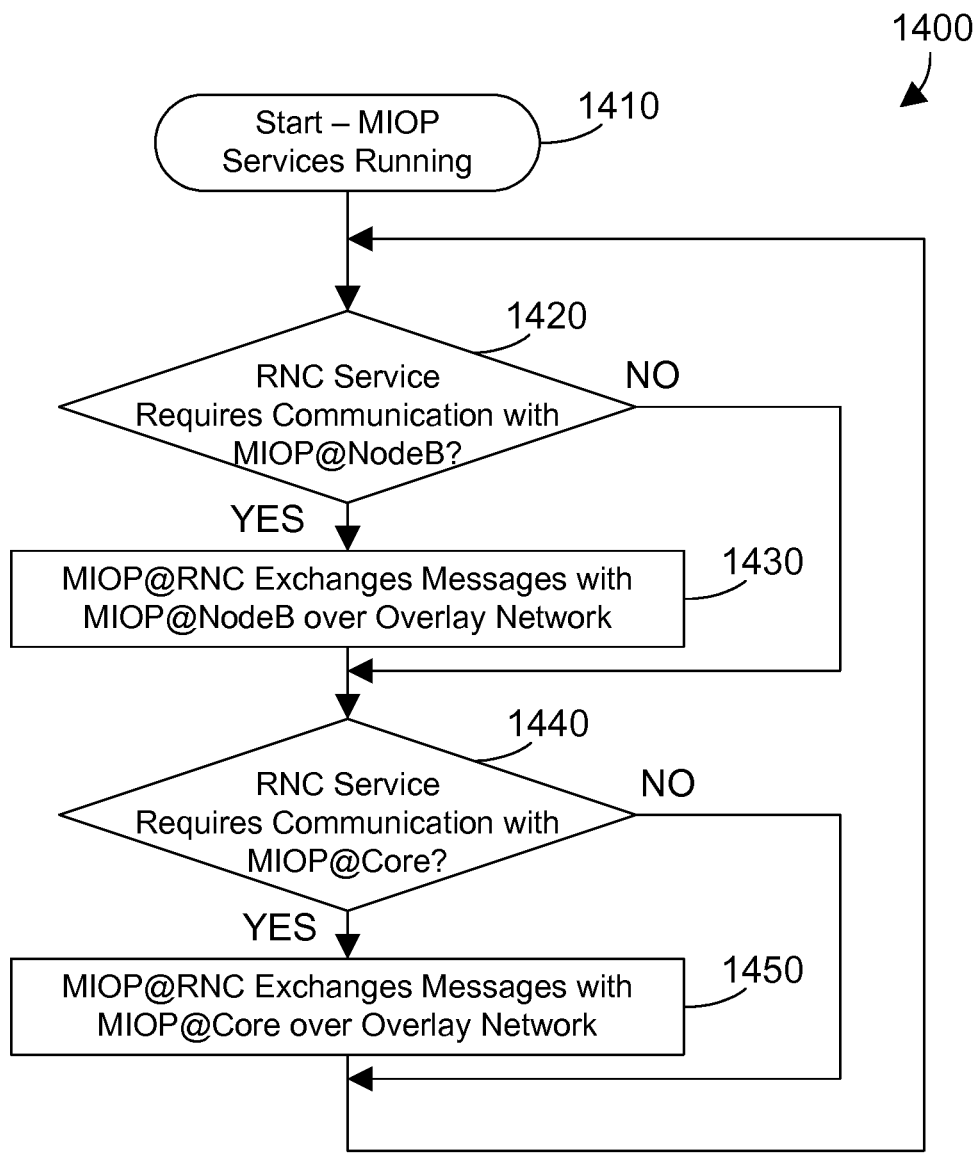

FIG. 14 shows a method 1400 that shows communications by MIOP@ RNC when MIOP services are running (step 1410). When the RNC service mechanism requires communication with MIOP@ NodeB (step 1420=YES), MIOP@ RNC exchanges messages with MIOP@ NodeB over the overlay network (step 1430). When the RNC service mechanism requires communication with MIOP@ Core (step 1440=YES), MIOP@ RNC exchanges messages with MIOP@ Core over the overlay network (step 1450).

Figure 15:
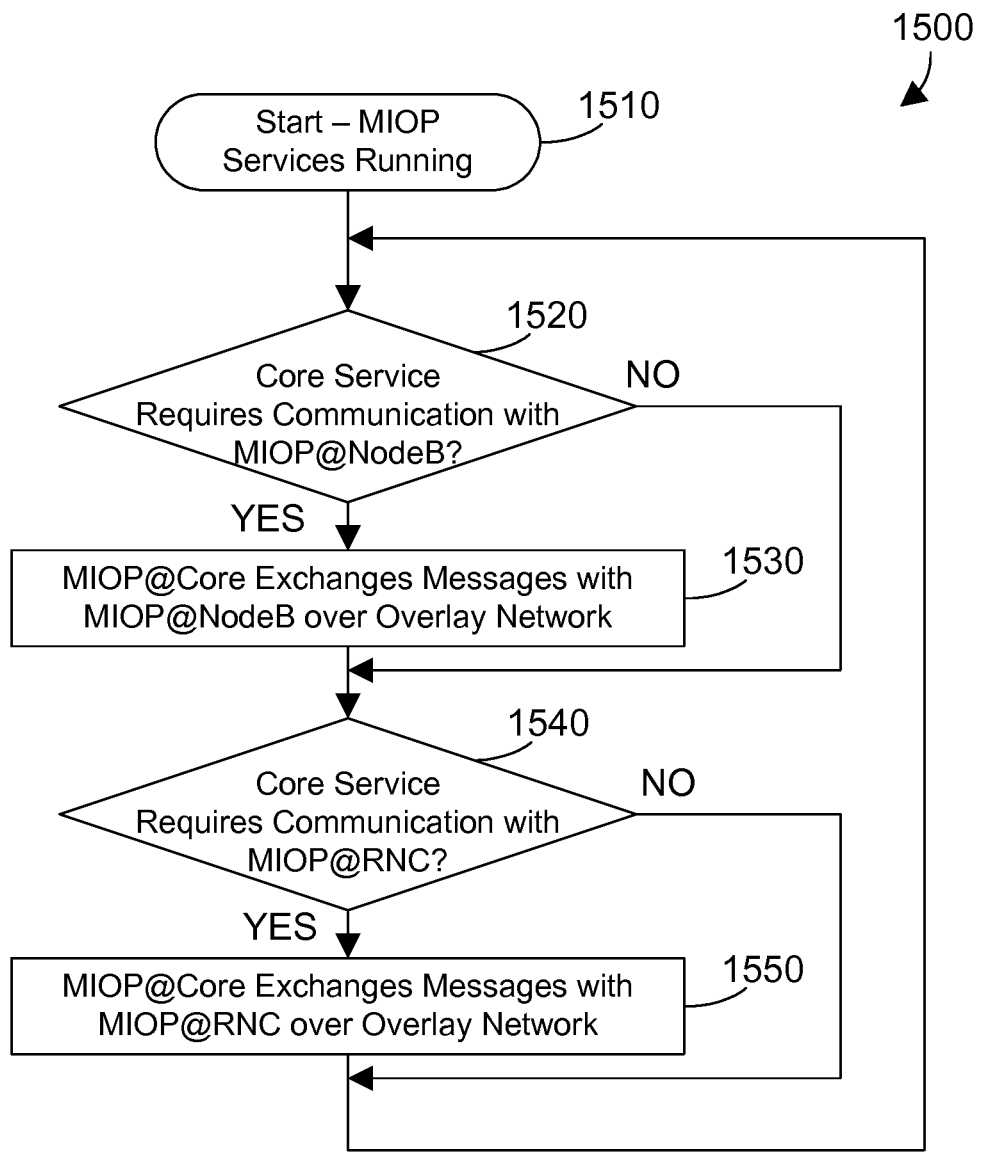

FIG. 15 shows a method 1500 that shows communications by MIOP@ Core when MIOP services are running (step 1510). When the core service mechanism requires communication with MIOP@ NodeB (step 1520=YES), MIOP@ Core exchanges messages with MIOP@ NodeB over the overlay network (step 1530) relayed via MIOP@ RNC. When the core service mechanism requires communication with MIOP@ RNC (step 1540=YES), MIOP@ Core exchanges messages with MIOP@ RNC over the overlay network (step 1550).

Figure 16:
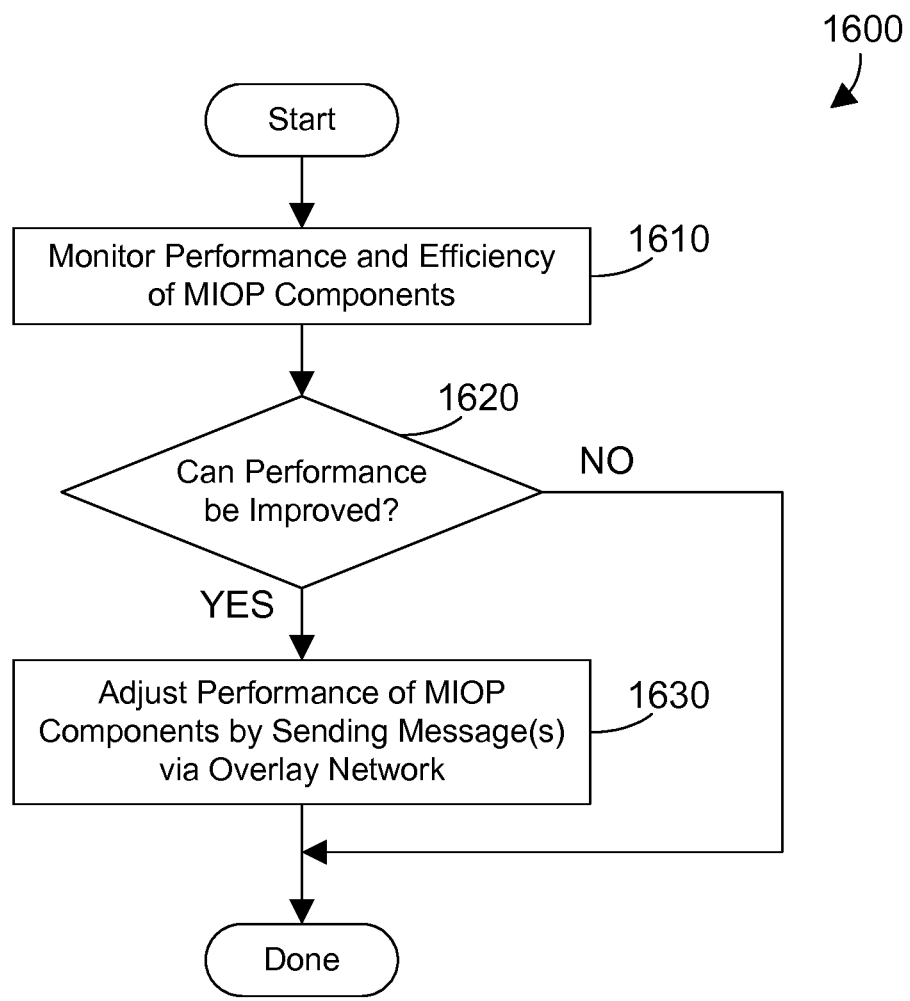
FIG. 16 is a flow diagram of a method for managing and adjusting the MIOP components.

FIG. 16 shows a method 1600 that is preferably performed by MIOP@ NMS 240 in FIGS. 2 and 7. The performance and efficiency of the MIOP components that perform MIOP services are monitored (step 1610). The MIOP components that perform MIOP services may include MIOP@ NodeB 210, MIOP@ RNC 220, and MIOP@ Core 230, assuming all of these components are present in the mobile data network 200. When performance may be improved (step 1620=YES), the performance of the MIOP components is adjusted (if implemented and applicable) by sending one or more network messages via the overlay network (step 1630). Note also a human operator could also manually reconfigure the MIOP components to be more efficient.

Figure 17:
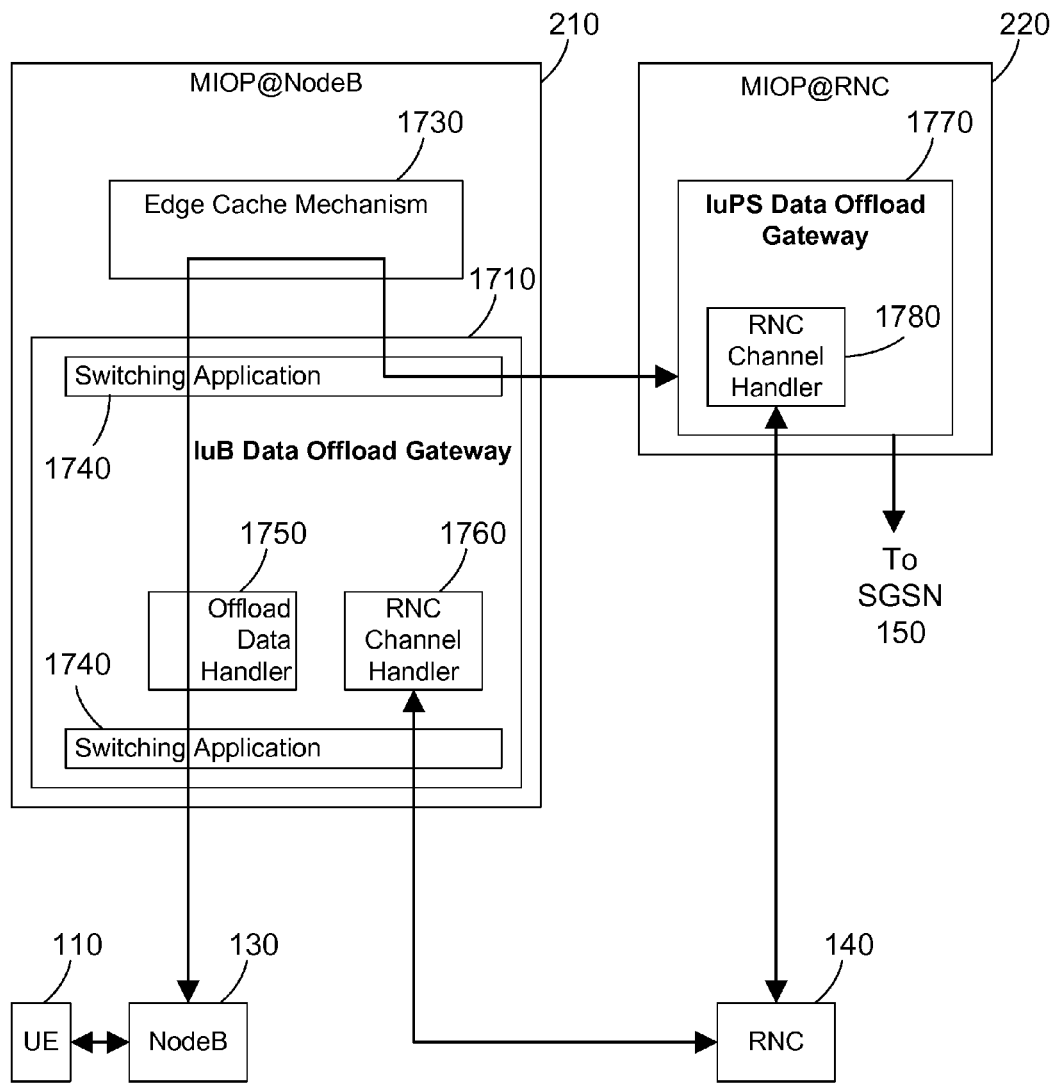
FIG. 17 is a block diagram of one specific implementation for MIOP@ NodeB and MIOP@ RNC.

Referring to FIG. 17, implementations for MIOP@ NodeB 210 and MIOP@ RNC 220 are shown by way of example. Other implementations are possible within the scope of the disclosure and claims herein. User equipment 110 is connected to NodeB 130. Note the antenna 120 shown in FIG. 2 is not shown in FIG. 17, but is understood to be present to enable the communication between user equipment 110 and NodeB 130. MIOP@ NodeB 210 includes an edge cache mechanism 1730, which is one suitable example of edge service mechanism 430 in FIG. 4. MIOP@ NodeB 210 includes an interface referred to herein as IuB Data Offload Gateway (IuB DOGW) 1710. This gateway 1710 implements the breakout mechanism 410 according to one or more specified breakout preconditions 420 shown in FIG. 4. IuB DOGW 1710 includes a switching application 1740, an offload data handler 1750, and an RNC channel handler 1760. The switching application 1740 is responsible for monitoring data packets received from NodeB 130, forwards according to it configuration the broken out data packets to the offload data handler, relays the non-broken out data packets and control system flows to the RNC 140 via the original connections in the RAN. While switching application 1740 is shown as two separate boxes in FIG. 17, this is done to visually indicate the switching application 1740 performs switching on two different interfaces, the network interface and overlay network interface, but the switching application 1740 is preferably a single entity.

When a breakout decision is made and MIOP@ RNC 220 sends a message to MIOP@ NodeB 210 authorizing breakout (see step 1040 in FIG. 10), when MIOP@ NodeB decides to breakout specified user data, the specified user data received by the switching application 1740 from NodeB 130 is broken out, which means the switching application 1740 routes the specified user data to the offload data handler 1750 so the broken out data is routed to the data path defined for breakout data. The offload data handler 1750 may send the data to the edge cache mechanism 1730 for processing, which can route the data directly to MIOP@ RNC 220 via the overlay network, as shown by the path with arrows going from NodeB 130 to MIOP@ RNC 220.

User data that is not broken out and signaling traffic is routed directly back by the switching application 1740 to RNC. In this manner, non-broken out data and signaling traffic passes through the IuB DOGW 1710 to RNC 140, while broken out data is routed by the IuB DOGW 1710 to a different destination. Note that edge cache mechanism 1730 may send messages to MIOP@ RNC 220 as shown in FIG. 17, but the broken out messages themselves are not sent to MIOP@ RNC 220.

MIOP@ RNC 220 includes an interface referred to herein as IuPS data offload gateway (IuPS DOGW) 1770. IuPS DOGW 1770 forwards all signaling and non-broken out data traffic from RNC 140 to SGSN 150 via the GTP tunnel. IuPS DOGW 1770 includes the breakout mechanism 510, breakout criteria 520 and subscriber registration mechanism 530 shown in FIG. 5 and discussed above with reference to FIG. 5. IuPS DOGW 1770 may exchange messages with IuB DOGW 1710 via the overlay network to perform any needed service in MIOP@ NodeB 210 or MIOP@ RNC 220. For the specific implementation shown in FIG. 17, while the IuPS DOGW 1770 in MIOP@ RNC 220 does not include an offload data handler, the IuPS DOGW 1770 could include an offload data handler and switching application similar to those shown in MIOP@ NodeB 210 when MIOP@ RNC 220 also needs to perform breakout of data.

The IuPS DOGW 1770 includes an RNC channel handler 1780. The RNC channel handlers 1760 in MIOP@ NodeB 210 and 1780 in MIOP@ RNC 220 monitor data traffic to and from RNC 140 related to a broken out subscriber session and provide a keep-alive channel maintenance mechanism.

Figure 18:
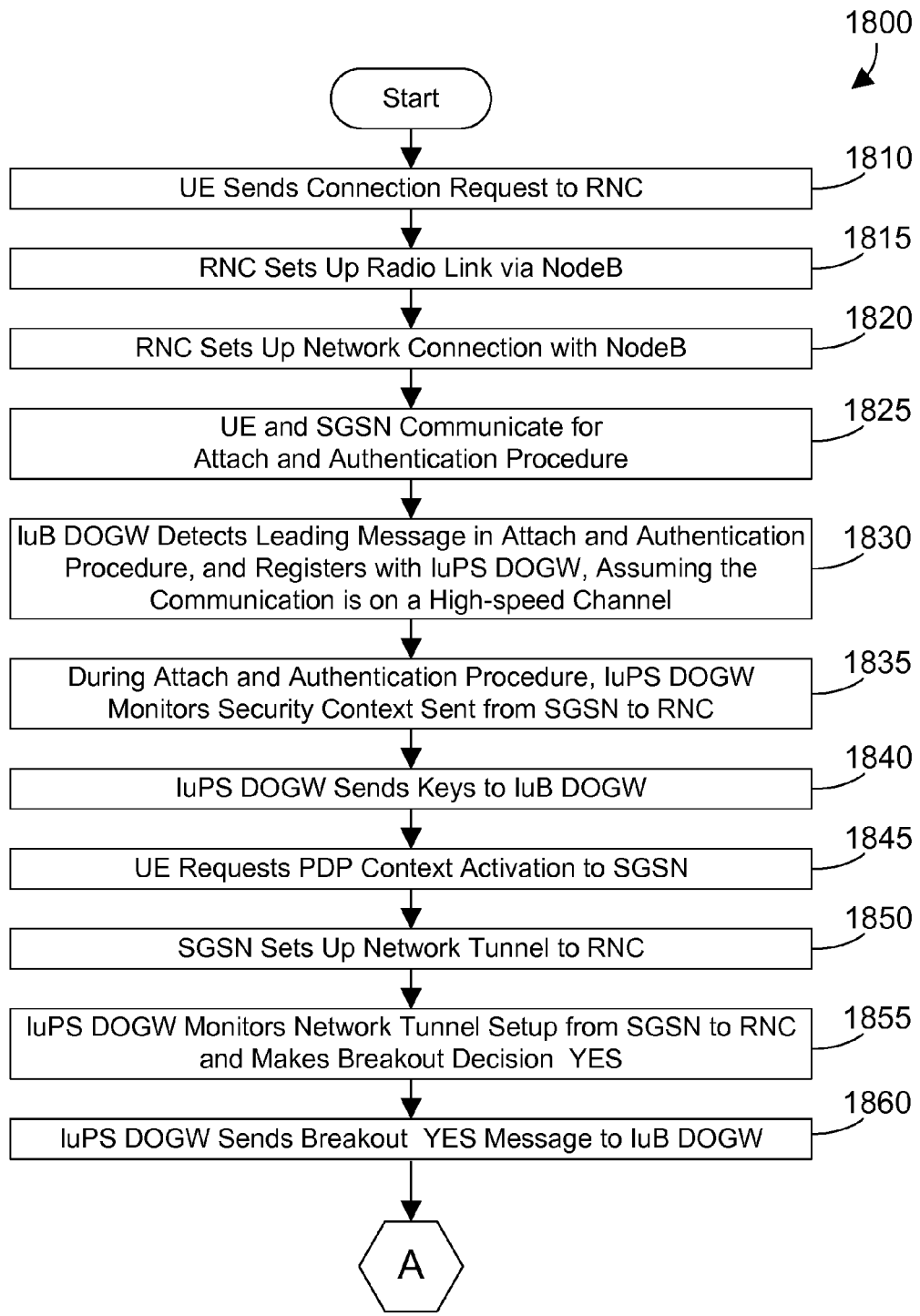
FIGS. 18 and 19 show a flow diagram of a first method for the specific implementation shown in FIG. 17.
Figure 19:
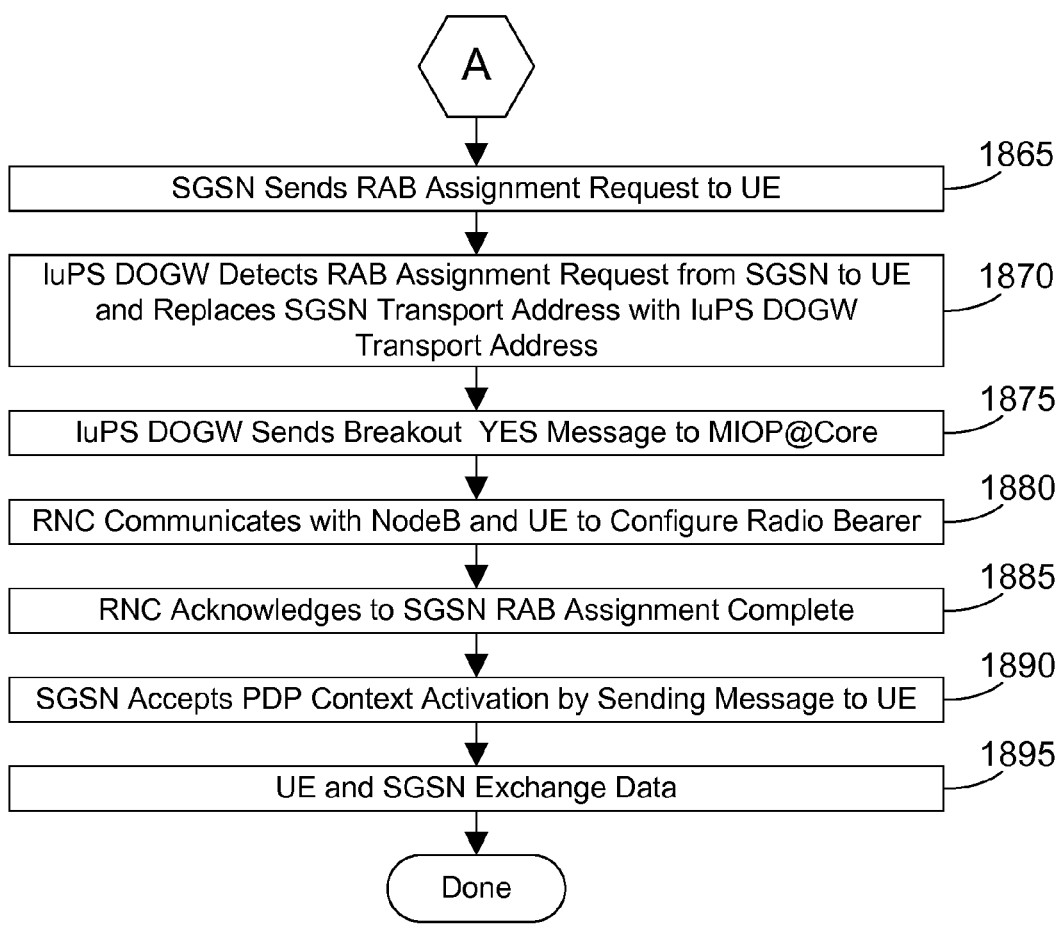

Specific methods are shown in FIGS. 18-21 that illustrate how the specific implementation in FIG. 17 could be used. FIGS. 18 and 19 show a method 1800 for setting up breakout of data. The UE sends a connection request to the RNC (step 1810). The RNC sets up a radio link via NodeB (step 1815). The RNC then sets up a network connection with NodeB (step 1820). The UE and SGSN then communicate for the attach and authentication procedure (step 1825). IuB DOGW detects the leading message in the attach and authentication procedure, and registers the subscriber session with IuPS DOGW when preconditions are fulfilled (e.g. UE is capable to carry high speed traffic) (step 1830). During the attach and authentication procedure, IuPS DOGW monitors the security context sent from SGSN to RNC (step 1835). IuPS DOGW then sends keys to IuB DOGW (step 1840). These keys are needed to decipher (decrypt) the upcoming signaling and uplink user data and to cipher (encrypt) the downlink user data. UE then requests PDP context activation to SGSN (step 1845). In response, SGSN sets up a network tunnel to RNC (step 1850). IuPS DOGW monitors network tunnel setup from SGSN to RNC and makes a decision breakout=YES (step 1855). IuPS DOGW sends a message to IuB DOGW indicating breakout=YES (step 1860). Continuing on FIG. 19, SGSN sends an RAB assignment request to UE (step 1865). IuPS DOGW detects the RAB assignment request from SGSN to UE and replaces the SGSN transport address with IuPS DOGW transport address (step 1870). IuPS DOGW sends a message to MIOP@ Core indicating breakout=YES (step 1875). RNC communicates with NodeB and UE to (re) configure signaling and data radio bearer (step 1880). RNC acknowledges to SGSN when RAB assignment is complete (step 1885). SGSN accepts PDP context activation by sending a message to UE (step 1890). UE and SGSN may then exchange data for the PDP context (step 1895).

Figure 20:
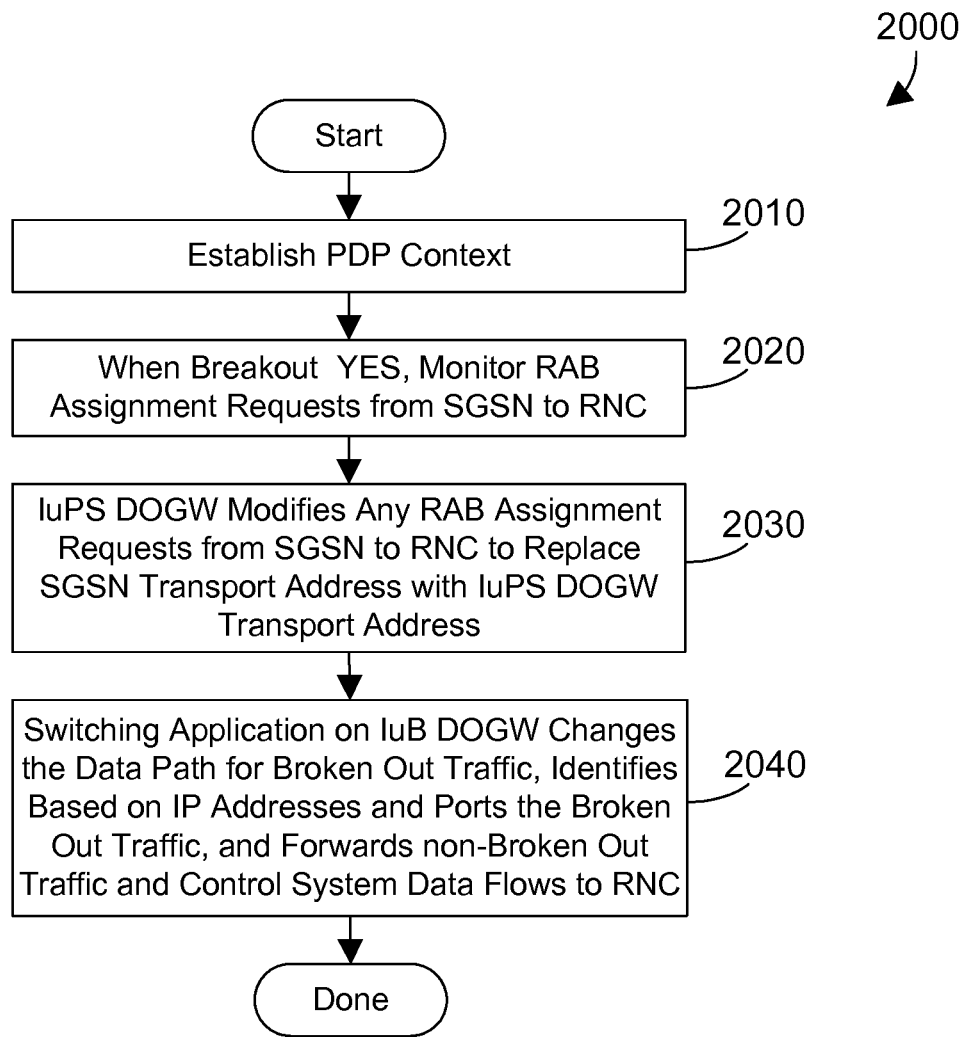
FIG. 20 is a flow diagram of a second method for the specific implementation shown in FIG. 17.

Referring to FIG. 20, a method 2000 begins by establishing a PDP context (step 2010). Method 1800 in FIGS. 18 and 19 include the detailed steps for establishing a PDP context. When breakout=YES, RAB assignment requests from SGSN to RNC are monitored by IuPS DOGW (step 2020). IuPS DOGW modifies any RAB assignment requests from SGSN to RNC to replace the SGSN transport address in the RAB assignment request with the IuPS DOGW transport address (step 2030) in case of matching breakout criteria during PDP context activation procedure. The switching application on IuB DOGW is configured upon the RAN transport layer setup to identify based on IP addresses and ports the broken out traffic and forwards this traffic to the Offload data handler 1765, and forwards non-broken out traffic and control system data flows to the RNC (step 2040).

Figure 21:
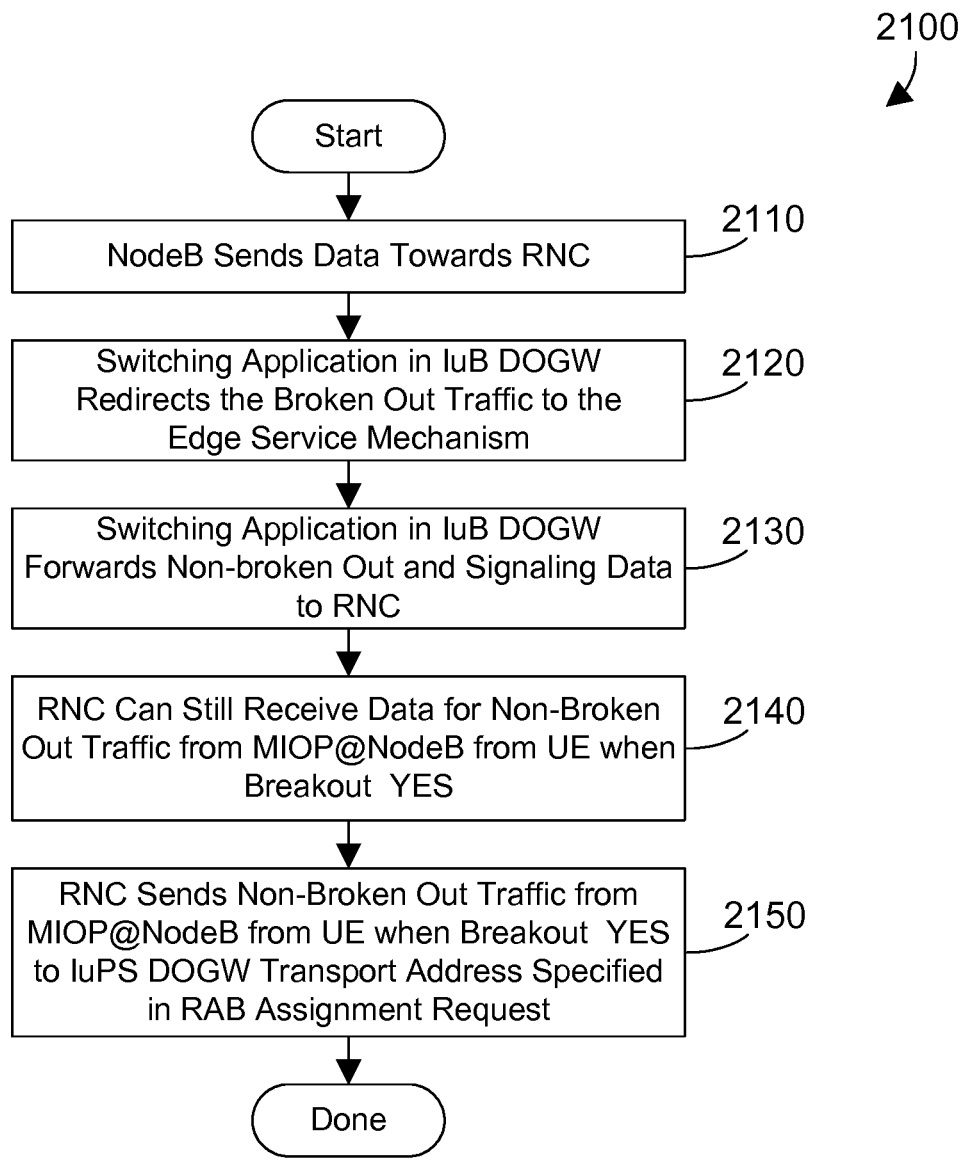
FIG. 21 is a flow diagram of a third method for the specific implementation shown in FIG. 17.

Referring to FIG. 21, a method 2100 begins when NodeB sends data towards RNC (step 2110). The switching application in IuB DOGW redirects the broken out traffic to the edge service mechanism (step 2120), such as edge cache mechanism 1730 in FIG. 17. The switching application also forwards non-broken out data and signaling data to the RNC (step 2130) via the original RAN connections. The RNC can still receive data for non-broken out traffic from MIOP@ NodeB when breakout=YES (step 2140). The RNC then sends non-broken out traffic from MIOP@ NodeB from UE when breakout=YES to IuPS DOGW transport address specified in RAB assignment request (step 2150).

Figure 22:
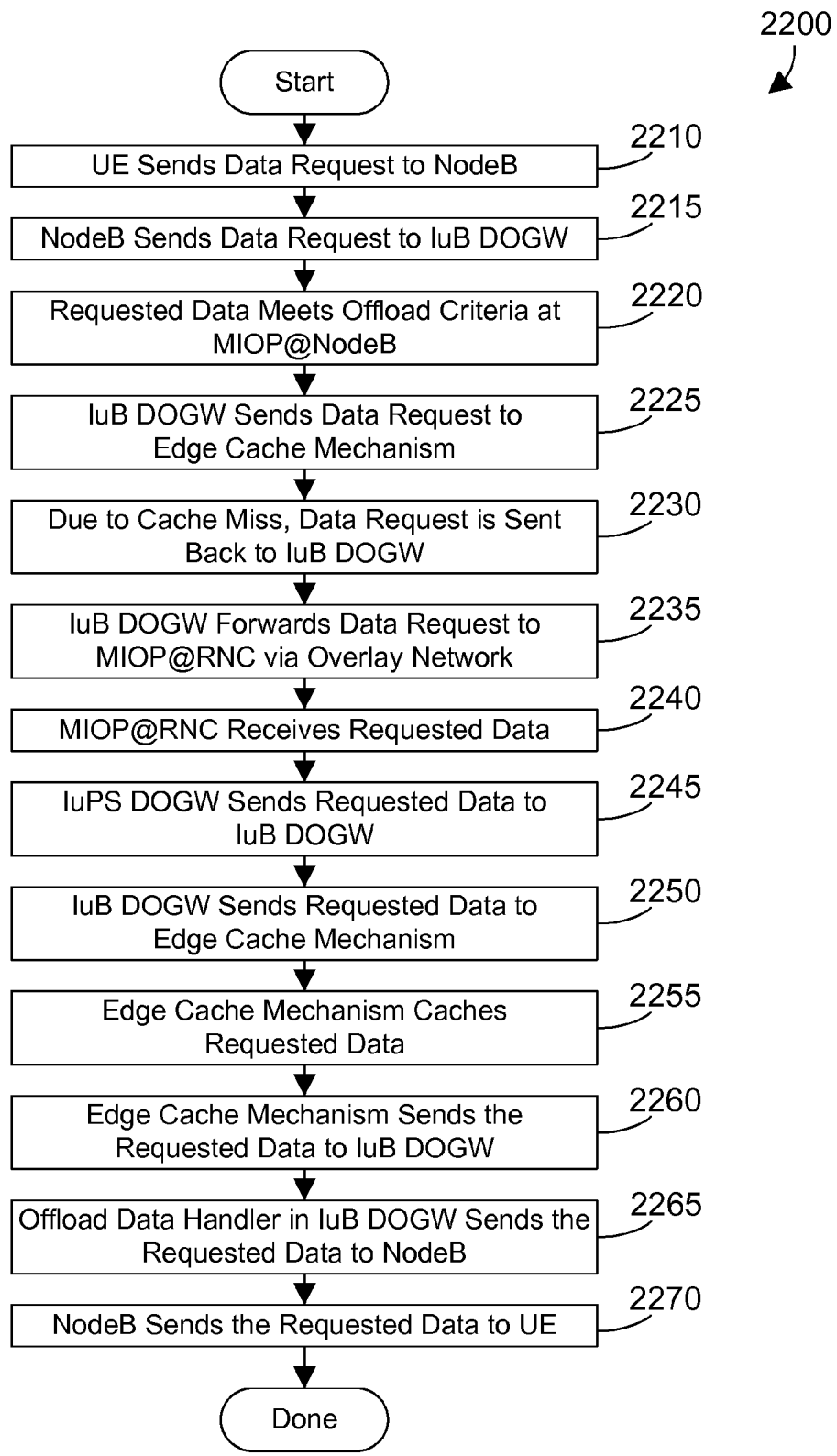
FIG. 22 is a flow diagram of a method for the specific implementation shown in FIG. 17 to process a data request that results in a cache miss at MIOP@ NodeB.

A simple example is now provided for the specific implementation in FIG. 17 to show how data can be cached and delivered by MIOP@ NodeB 210. Referring to FIG. 22, method 2200 represents steps performed in the implementation in FIG. 17 for a cache miss. UE sends a data request to NodeB (step 2210). NodeB sends the data request to IuB DOGW (step 2215). We assume the requested data meets the offload criteria at MIOP@ NodeB (step 2220), which means MIOP@ NodeB has been authorized to perform breakout and has determined this requested data should be broken out. IuB DOGW sends the data request to the edge cache mechanism (step 2225). We assume the data is not present in the edge cache mechanism, so due to the cache miss, the edge cache mechanism sends the data request back to IuB DOGW (step 2230). IuB DOGW then forwards the data request to MIOP@ RNC via the overlay network (step 2235). In the worst case the content is not cached on MIOP@ RNC or MIOP@ Core, MIOP@ RNC routes the data request to via the overlay network to the MIOP@ Core, which passes the data request up the line to the internet, which delivers the requested data to MIOP@ Core, which delivers the requested data via the overlay network to MIOP@ RNC (step 2240). IuPS DOGW then sends the requested data to IuB DOGW (step 2245). IuB DOGW then sends the requested data to the edge cache mechanism (step 2250). The edge cache mechanism caches the requested data (step 2255). The edge cache mechanism sends the requested data to IuB DOGW (step 2260). The offload data handler in IuB DOGW sends the requested data to NodeB (step 2265). NodeB then sends the requested data to UE (step 2270). At this point, method 2200 is done.

Figure 23:
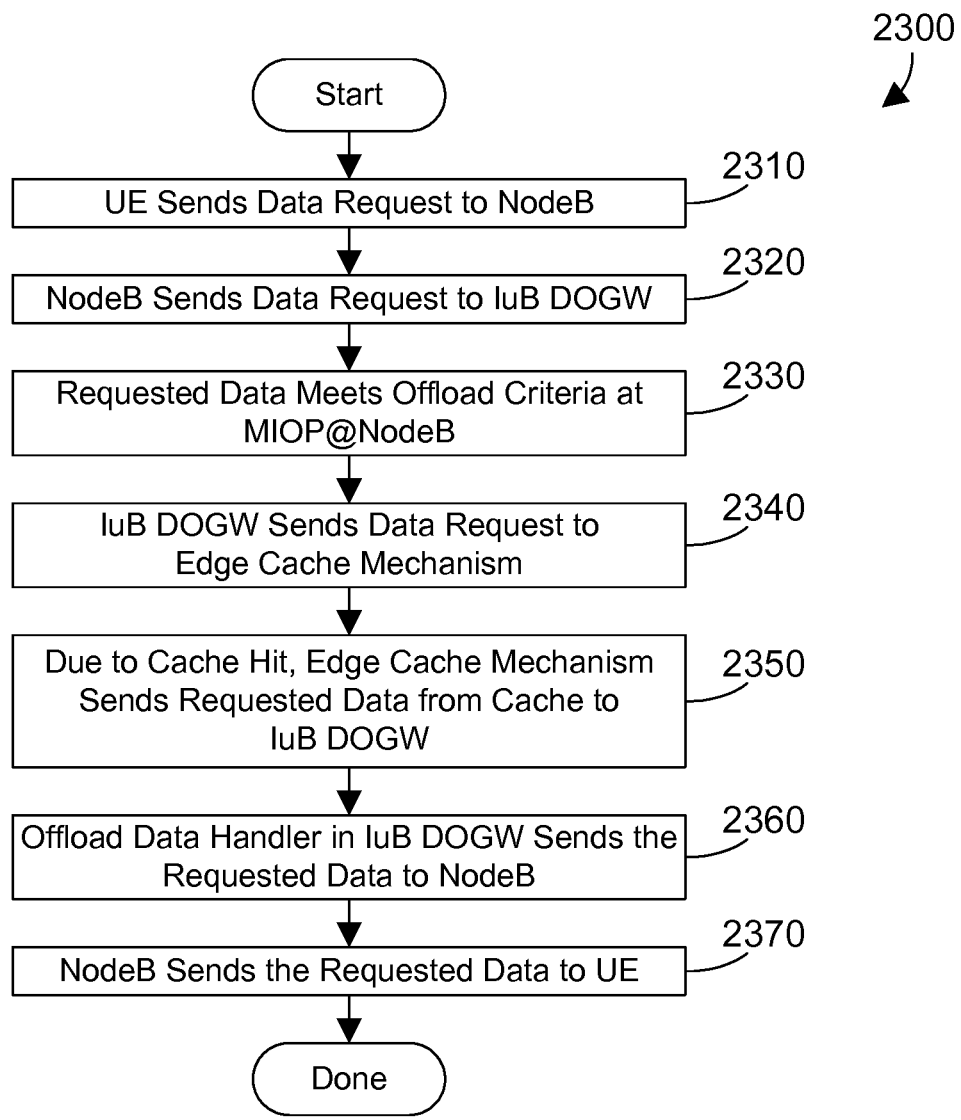
FIG. 23 is a flow diagram of a method for the specific implementation shown in FIG. 17 to process a data request that results in a cache hit at MIOP@ NodeB.

Method 2300 in FIG. 23 shows the steps performed for a cache hit in the specific implementation in FIG. 17. The UE sends the data request to NodeB (step 2310). NodeB sends the data request to IuB DOGW (step 2320). The requested data meets the offload criteria at MIOP@ NodeB (step 2330). IuB DOGW sends the data request to the edge cache mechanism (step 2340). Due to a cache hit, the edge cache mechanism sends the requested data from the cache to IuB DOGW (step 2350). The offload data handler in IuB DOGW sends the requested data to NodeB (step 2360). Node B then sends the requested data to UE (step 2370). Method 2300 shows a great advantage in caching data at MIOP@ NodeB. With data cached at MIOP@ NodeB, the data may be delivered to the user equipment without any backhaul on the core network. The result is reduced network congestion in the core network while improving quality of service to the subscriber.

The methods shown in FIGS. 18-23 provide detailed steps for the specific implementation in FIG. 17. Other implementations may have detailed steps that are different than those shown in FIGS. 18-23. These are shown by way of example, and are not limiting of the disclosure and claims herein.

The architecture of the MIOP system allows services to be layered or nested. For example, the MIOP system could determine to do breakout of high-speed channels at MIOP@ NodeB, and to do breakout of low-speed channels at MIOP@ RNC. In another example, MIOP@ NodeB may have a cache, MIOP@ RNC may also have a cache, and MIOP@ Core may also have a cache. If there is a cache miss at MIOP@ NodeB, the cache in MIOP@ RNC could be checked, followed by checking the cache in MIOP@ Core. Thus, decisions can be dynamically made according to varying conditions of what data to cache and where.

To support the MIOP services that are possible with the mobile data network 200 shown in FIG. 2, the preferred configuration of MIOP@ NodeB 210 is a combination of hardware and software. The preferred configuration of MIOP@ RNC 220 is also a combination of hardware and software. The preferred configuration of MIOP@ Core 230 is software only, and can be run on any suitable hardware in the core network. The preferred configuration of MIOP@ NMS 240 is software only, and can also be run on any suitable hardware in the core network.

In the most preferred implementation, the various functions of MIOP@ NodeB 210, MIOP@ RNC 220, MIOP@ Core 230, and MIOP@ NMS 240 are performed in a manner that is nearly transparent to existing equipment in the mobile data network. Thus, the components in prior art mobile data network 100 that are also shown in the mobile data network 200 in FIG. 2 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

Referring to FIG. 24, one suitable hardware architecture for MIOP@ NodeB 2410 is shown. MIOP@ NodeB 2410 is one specific implementation for MIOP@ NodeB 210 shown in FIGS. 2, 4 and 17. MIOP@ NodeB 2410 is one suitable example of a breakout component that may be incorporated into an existing mobile data network. The specific architecture was developed based on a balance between needed function and cost. The hardware components shown in FIG. 24 may be common off-the-shelf components. They are interconnected and programmed in a way to provided needed function while keeping the cost low by using off-the-shelf components. The hardware components shown in FIG. 24 include a system controller 2412, a service processor 2420, a security subsystem 2430, a telco breakout subsystem 2450, and a fail-to-wire (FTW) module 2460. In one suitable implementation for MIOP@ NodeB 2410 shown in FIG. 24, the system controller 2412 is an x86 system. The service processor 2420 is an IBM Integrated Management Module version 2 (IMMv2). The security subsystem 2430 includes an ATMEL processor and a non-volatile memory such as a battery-backed RAM for holding keys. The telco breakout system 2450 performs the breakout functions for MIOP@ NodeB 2410. In this specific implementation, the x86 and IMMv2 are both on a motherboard that includes a Peripheral Component Interconnect Express (PCIe) slot. A riser card plugged into the PCIe slot on the motherboard includes the security subsystem 2430, along with two PCIe slots for the telco breakout system 2450. The telco breakout system 2450 may include a telco card and a breakout card that performs breakout as described in detail above with respect to FIG. 17.

One suitable x86 processor that could serve as system controller 2412 is the Intel Xeon E3-1220 processor. One suitable service processor 2420 is an IBM Renassas SH7757, but other known service processors could be used. One suitable processor for the security subsystem 2430 is an ATMEL processor UC3L064, and one suitable non-volatile memory for the security subsystem 2430 is a DS3645 battery-backed RAM from Maxim. One suitable processor for the telco breakout subsystem 2450 is the Cavium Octeon II CN63XX.

Various functions of the MIOP@ NodeB 2410 shown in FIG. 24 are divided amongst the different components. Referring to FIG. 25, the system controller 2412 implements an appliance mechanism 2510, a platform services mechanism 2520, and an edge application serving mechanism 2530. The appliance mechanism 2510 provides an interface to MIOP@ NodeB that hides the underlying hardware and software architecture by providing an interface that allows configuring and using MIOP@ NodeB without knowing the details of the underlying hardware and software. The platform services mechanism 2520 provides messaging support between the components in MIOP@ NodeB, allows managing the configuration of the hardware and software in MIOP@ NodeB, and monitors the health of the components in MIOP@ NodeB. The edge application serving mechanism 2530 allows software applications to run within MIOP@ NodeB that perform one or more mobile network services at the edge of the mobile data network in response to broken-out data received from user equipment or sent to user equipment. In the most preferred implementation, the data broken out and operated on by MIOP@ NodeB is Internet Protocol (IP) data requests received from the user equipment and IP data sent to the user equipment. The edge application service mechanism 2530 may serve both applications provided by the provider of the mobile data network, and may also serve third party applications as well. The edge application serving mechanism 2530 provides a plurality of mobile network services to user equipment at the edge of the mobile data network in a way that is mostly transparent to existing equipment in the mobile data network.

Referring to FIG. 26, the service processor 2420 includes a thermal monitor/control mechanism 2610, a hardware monitor 2620, a fail-to-wire control mechanism 2630, a key mechanism 2640, a system controller monitor/reset mechanism 2650, a display/indicator mechanism 2660, and a policy decision point (PDP) 2670. The thermal monitor/control mechanism 2610 monitors temperatures and activates controls to address thermal conditions. For example, the thermal monitor 2610 monitors temperature within the MIOP@ NodeB enclosure, and activates one or more fans within the enclosure when the temperature exceeds some threshold. In addition, the thermal monitor/control mechanism 2610 may also monitor temperature in the basestation external to the MIOP@ NodeB enclosure, and may control environmental systems that heat and cool the basestation itself external to the MIOP@ NodeB enclosure. The hardware monitor 2620 monitors hardware for errors. Examples of hardware that could be monitored with hardware monitor 2620 include CPUs, memory, power supplies, etc. The hardware monitor 2620 could monitor any of the hardware within MIOP@ NodeB 2410.

The fail-to-wire control mechanism 2630 is used to switch a fail-to-wire switch to a first operational state when MIOP@ NodeB is fully functional that causes data between the upstream computer system and the downstream computer system to be processed by MIOP@ NodeB 2410, and to a second failed state that causes data to be passed directly between the upstream computer system and the downstream computer system without being processed by MIOP@ NodeB 2410. The key mechanism 2640 provides an interface for accessing the security subsystem 2430. The system controller monitor/reset mechanism 2650 monitors the state of the system controller 2412, and resets the system controller 2412 when needed. The display/indicator mechanism 2660 activates a display and indicators on the front panel of the MIOP@ NodeB to provide a visual indication of the status of MIOP@ NodeB.

Referring to FIG. 27, the security subsystem 2430 includes a key storage 2702 that is a non-volatile storage for keys, such as a battery-backed RAM. The security subsystem 2430 further includes a key mechanism 2710 and a tamper detection mechanism 2720. Key mechanism 2710 stores keys to the non-volatile key storage 2702 and retrieves keys from the non-volatile key storage 2702. Any suitable keys could be stored in the key storage 2702. The security subsystem 2430 controls access to the keys stored in key storage 2702 using key mechanism 2710. The tamper detection mechanism 2720 detects physical tampering of MIOP@ NodeB, and performs functions to protect sensitive information within MIOP@ NodeB when physical tampering is detected. The enclosure for MIOP@ NodeB includes tamper switches that are triggered if an unauthorized person tries to open the box. In response, the tamper detection mechanism may take any suitable action, including actions to protect sensitive information, such as not allowing MIOP@ NodeB to boot the next time, erasing keys in key storage 2702, and actions to sound an alarm that the tampering has occurred.

Referring to FIG. 28, the telco breakout system 2450 includes a telco card 2802, a breakout mechanism 2810, and an overlay network mechanism 2820. Telco card 2802 is any suitable card for handling network communications in the radio access network. Breakout mechanism 2810 is one specific implementation for breakout mechanism 410 shown in FIG. 4. Breakout mechanism 2810 performs the breakout functions as described in detail above. The breakout mechanism 2810 interrupts the connection between the NodeB and the next upstream component in the radio access network, such as the RNC, as shown in FIG. 2. Non-broken out data from the upstream component is simply passed through MIOP@ NodeB to the NodeB. Non-broken out data from the NodeB is simply passed through MIOP@ NodeB to the upstream component. Note the path for non-broken out data is the traditional path for data in the mobile data network before the MIOP components were added. Broken-out data is intercepted by MIOP@ NodeB, and may be appropriate processed at MIOP@ NodeB, or may be routed to an upstream component via a different data path, such as to MIOP@ RNC via the overlay network. The telco breakout system 2450 includes an overlay network mechanism 2820 that allows MIOP@ NodeB 2410 to communicate via the overlay network. For example, MIOP@ NodeB 2410 could use overlay network mechanism 2820 to communicate with MIOP@ RNC 220 or to communicate with other MIOP@ NodeBs.

The edge application mechanism 2530 may provide many different mobile network services. Examples of some of these services are shown in FIG. 29. This specific implementation for edge application mechanism 2530 includes an edge caching mechanism 2910, a push-based service mechanism 2920, a third party edge application serving mechanism 2930, an analytics mechanism 2940, a filtering mechanism 2950, a revenue-producing service mechanism 2960, and a charging mechanism 2970. The edge caching mechanism 2910 is one suitable implementation of edge cache mechanism 1730 shown in FIG. 17, and includes the functions described above with respect to FIG. 17. The push-based service mechanism 2920 provides support for any suitable push-based service, whether currently known or developed in the future.

Examples of known push-based services include without limitation incoming text messages, incoming e-mail, instant messaging, peer-to-peer file transfers, etc.

The third party edge application serving mechanism 2930 allows running third party applications that provide mobile network services at the edge of the mobile data network. The capability provided by the third party edge application serving mechanism 2930 opens up new ways to generate revenue in the mobile data network. The operator of the mobile data network may generate revenue both from third parties that offer edge applications and from subscribers who purchase or use edge applications. Third party applications for user equipment has become a very profitable business. By also providing third party applications that can run at the edge of the mobile data network, the experience of the user can be enhanced. For example, face recognition software is very compute-intensive. If the user were to download an application to the user equipment to perform face recognition in digital photographs, the performance of the user equipment could suffer. Instead, the user could subscribe to or purchase a third party application that runs at the edge of the mobile data network (executed by the third party edge application serving mechanism 2930) that performs face recognition. This would allow a subscriber to upload a photo and have the hardware resources in MIOP@ NodeB perform the face recognition instead of performing the face recognition on the user equipment. We see from this simple example it is possible to perform a large number of different functions at the edge of the mobile data network that were previously performed in the user equipment or upstream in the mobile data network. By providing applications at the edge of the mobile data network, the quality of service for subscribers increases.

The analytics mechanism 2940 performs analysis of broken-out data. The results of the analysis may be used for any suitable purpose or in any suitable way. For example, the analytics mechanism 2940 could analyze IP traffic on MIOP@ NodeB, and use the results of the analysis to more intelligently cache IP data by edge caching mechanism 2910. In addition, the analytics mechanism 2940 makes other revenue-producing services possible. For example, the analytics mechanism 2940 could track IP traffic and provide advertisements targeted to user equipment in a particular geographic area served by the basestation. Because data is being broken out at MIOP@ NodeB, the analytics mechanism 2940 may perform any suitable analysis on the broken out data for any suitable purpose.

The filtering mechanism 2950 allows filtering content delivered to the user equipment by MIOP@ NodeB. For example, the filtering mechanism 2950 could block access to adult websites by minors. This could be done, for example, via an application on the user equipment or via a third party edge application that would inform MIOP@ NodeB of access restrictions, which the filtering mechanism 2950 could enforce. The filtering mechanism 2950 could also filter data delivered to the user equipment based on preferences specified by the user. For example, if the subscriber is an economist and wants news feeds regarding economic issues, and does not want to read news stories relating to elections or politics, the subscriber could specify to exclude all stories that include the word "election" or "politics" in the headline. Of course, many other types of filtering could be performed by the filtering mechanism 2950. The filtering mechanism 2950 preferably performs any suitable data filtering function or functions, whether currently known or developed in the future.

The revenue-producing service mechanism 2960 provides new opportunities for the provider of the mobile data network to generate revenue based on the various functions MIOP@ NodeB provides. An example was given above where the analytics mechanism 2940 can perform analysis of data broken out by MIOP@ NodeB, and this analysis could be provided by the revenue-producing service mechanism 2960 to interested parties for a price, thereby providing a new way to generate revenue in the mobile data network. Revenue-producing service mechanism 2960 broadly encompasses any way to generate revenue in the mobile data network based on the specific services provided by any of the MIOP components.

The charging mechanism 2970 provides a way for MIOP@ NodeB to inform the upstream components in the mobile data network when the subscriber accesses data that should incur a charge. Because data may be provided to the subscriber directly by MIOP@ NodeB without that data flowing through the normal channels in the mobile data network, the charging mechanism 2970 provides a way for MIOP@ NodeB to charge the subscriber for services provided by MIOP@ NodeB of which the core network is not aware. The charging mechanism 2970 tracks the activity of the user that should incur a charge, then informs a charging application in the core network that is responsible for charging the subscriber of the charges that should be billed.

The hardware architecture of MIOP@ NodeB shown in FIGS. 24-29 allows MIOP@ NodeB to function in a way that is mostly transparent to existing equipment in the mobile data network. For example, if an IP request from user equipment may be satisfied from data held in a cache by edge caching mechanism 2910, the data may be delivered directly to the user equipment by MIOP@ NodeB without traversing the entire mobile data network to reach the Internet to retrieve the needed data. This can greatly improve the quality of service for subscribers by performing so many useful functions at the edge of the mobile data network. The core network will have no idea that MIOP@ NodeB handled the data request, which means the backhaul on the mobile data network is significantly reduced. The MIOP components disclosed herein thus provide a way to significantly improve performance in a mobile data network by adding the MIOP components to an existing mobile data network without affecting most of the functions that already existed in the mobile data network.

The mobile data network 200 disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

MIOP@ NodeB is preferably an appliance. The difference between a traditional hardware/software solution and an appliance is the appliance interface hides the underlying hardware and software configuration from the users of the appliance, whether the user is a man or a machine. Appliances for different applications are known in the art. For example, a network switch is one example of a known appliance. A network switch typically provides a web-based interface for configuring the switch with the appropriate configuration parameters. From the web-based interface, it is impossible to tell the internal hardware and software configuration of a network switch. The only commands available in the web-based interface for the network switch are those commands needed to configure and otherwise control the function of the network switch. Other functions that might be supported in the hardware are hidden by the appliance interface. This allows an interface that is independent from the hardware and software implementation within the appliance. In similar fashion, MIOP @ NodeB is preferably an appliance with a defined interface that makes certain functions needed to configured and operate MIOP@ NodeB available while hiding the details of the underlying hardware and software. This allows the hardware and software configuration of MIOP@ NodeB to change over time without having to change the appliance interface. The appliance aspects of MIOP@ NodeB are implemented within the appliance mechanism 2510 in FIG. 25.

Figure 30:
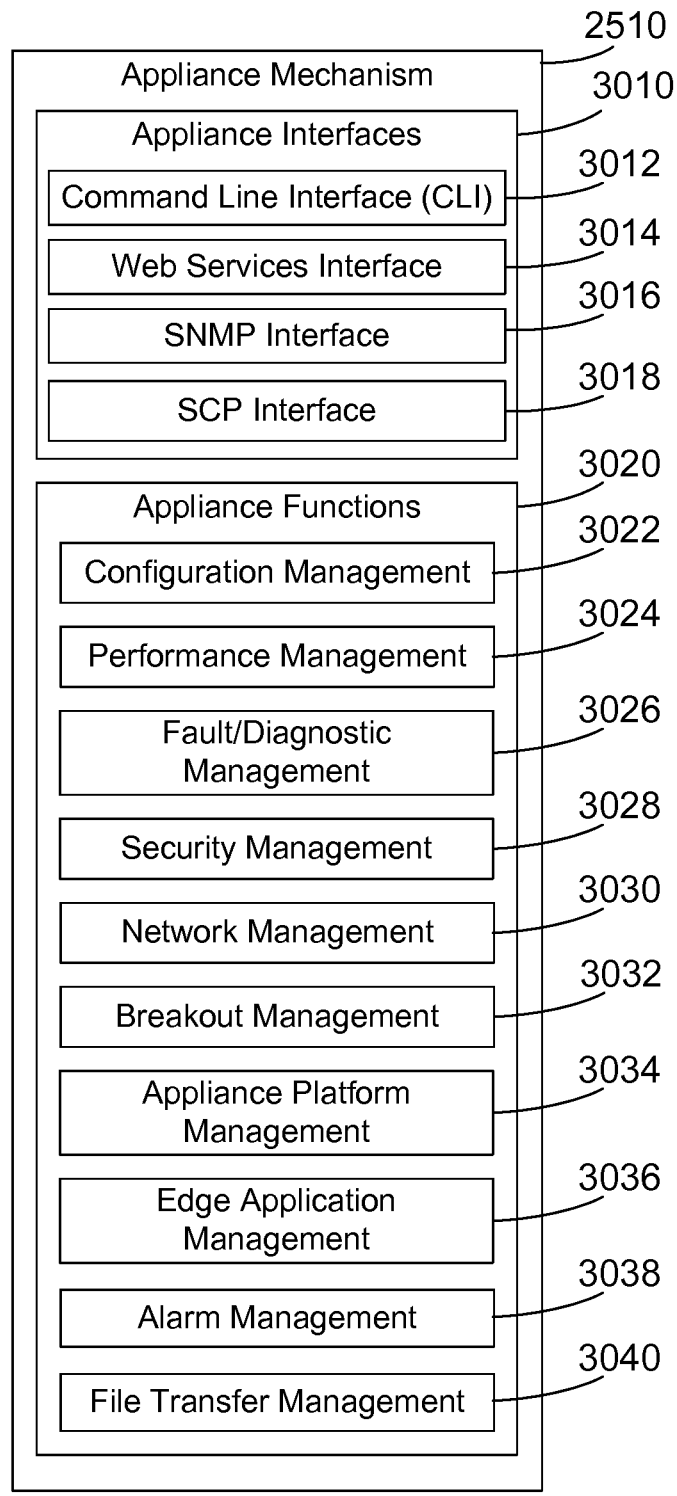
FIG. 30 is a block diagram of the appliance mechanism 2510 shown in FIG. 25 that provides interfaces for communicating with MIOP@ NodeB.

One suitable implementation of the appliance mechanism 2510 is shown in FIG. 30. In this implementation, appliance mechanism 2510 includes multiple appliance interfaces and multiple appliance functions. While multiple appliance interfaces are shown in FIG. 30, the disclosure and claims herein also extend to an appliance with a single interface as well. Appliance interfaces 3010 include a command line interface (CLI) 3012, a web services interface 3014, a simple network management protocol (SNMP) interface 3016, and a secure copy (SCP) interface 3018. The appliance functions 3020 include configuration management 3022, performance management 3024, fault/diagnostic management 3026, security management 3028, network management 3030, breakout management 3032, appliance platform management 3034, edge application management 3036, alarm management 3038, and file transfer management 3040. Additional details regarding the appliance interfaces 3010 and appliance functions 3020 are provided below.

The command line interface 3012 is a primary external interface to the MIOP@ NodeB appliance. In the specific implementation shown in FIG. 30, the command line interface 3012 provides most of the appliance functions 3020-3040, which are described in more detail below. Those commands not provided in command line interface 3012 are provided by the SNMP interface 3016 or the SCP interface 3018, as described in detail below with reference to FIG. 42.

The web services interface 3014 is another primary external interface to the MIOP@ NodeB appliance. In the specific implementation shown in FIG. 30, the web services interface 3014 provides all the same functions as the command line interface 3012.

The SNMP interface 3016 is an interface to the MIOP@ NodeB appliance that is used by an external entity such as MIOP@ NMS or MIOP@ RNC to receive alarms from MIOP@ NodeB. For example, if a fan failed on the MIOP@ NodeB appliance, a "fan failed" SNMP trap could be raised by MIOP@ NodeB. A monitor running on MIOP@ NMS could catch this trap, and any suitable action could be taken in response, including alerting a system administrator of the mobile data network, who could take corrective action, such as dispatching a repair crew to the basestation that includes the MIOP@ NodeB appliance to repair the defective fan or replace the MIOP@ NodeB appliance. Once the repair is made, the MIOP@ NMS would clear the SNMP trap, which would communicate to the MIOP@ NodeB that the repair was made. In one specific implementation, the SNMP interface includes only the functions for alarm management 3038. The SNMP interface can also be used as a way to request and send information between two network entities, such as MIOP@ NodeB and MIOP@ RNC, or between MIOP@ NodeB and MIOP@ NMS. However, the SCP interface 3018 provides a more preferred interface for transferring data between two network entities.

The SCP interface 3018 is an interface based on the Secure Shell (SSH) protocol, such as that typically used in Linux and Unix systems. SCP interface 3018 thus provides a secure way to transfer information between two network entities. The SCP interface 3018 could be used, for example, by MIOP@ NMS to transfer configuration information or software updates to MIOP@ NodeB. The SCP interface 3018 could likewise be used to transfer audit logs, diagnostic information, performance data, or backups of the appliance configuration from MIOP@ NodeB to MIOP@ NMS. Implementing SCP is easy given the SSH already provided on MIOP@ NodeB that provides a secure shell for the command line interface 3012 to run in. In one specific implementation, the SCP interface 3018 includes only the functions for file transfer management 3040.

Figure 31:
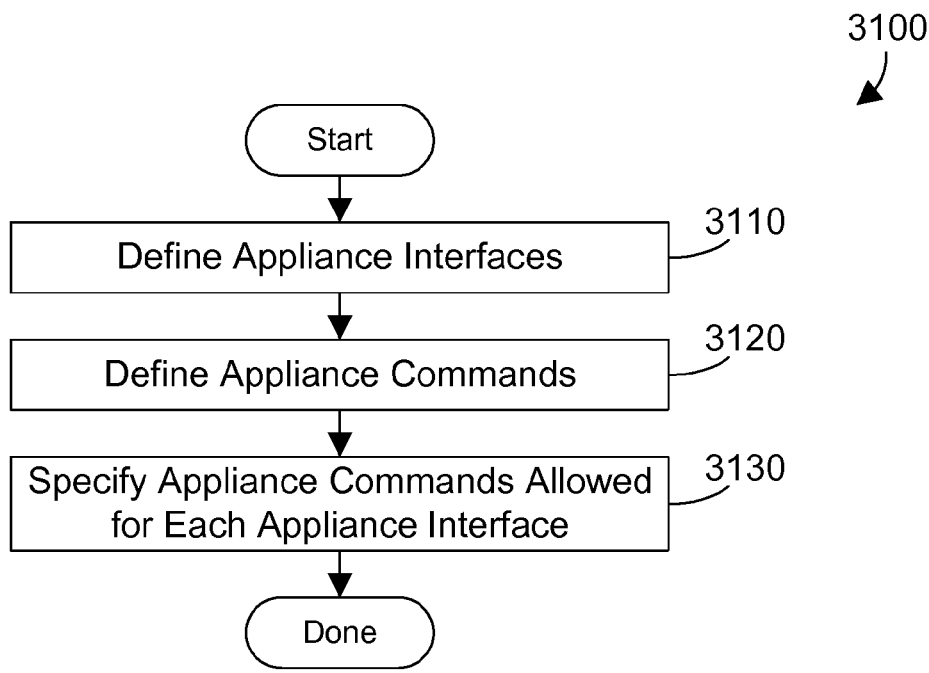
FIG. 31 is a flow diagram of a method for the appliance mechanism.

FIG. 31 shows a method 3100 for defining the appliance interfaces and functions for the MIOP@ NodeB appliance. The appliance interfaces are defined (step 3110). The appliance commands are defined (step 3120). The appliance commands allowed for each appliance interface are then specified (step 3130). For example, the table in FIG. 42 shows for each set of appliance functions shown in FIG. 30, which of the interfaces implement which commands. While the table in FIG. 42 shows different interfaces for different commands, it is equally possible to have multiple interfaces that implement the same command. Note the MIOP@ NodeB can include any suitable number of interfaces and any suitable number of commands defined on each of those interfaces.

Figure 32:
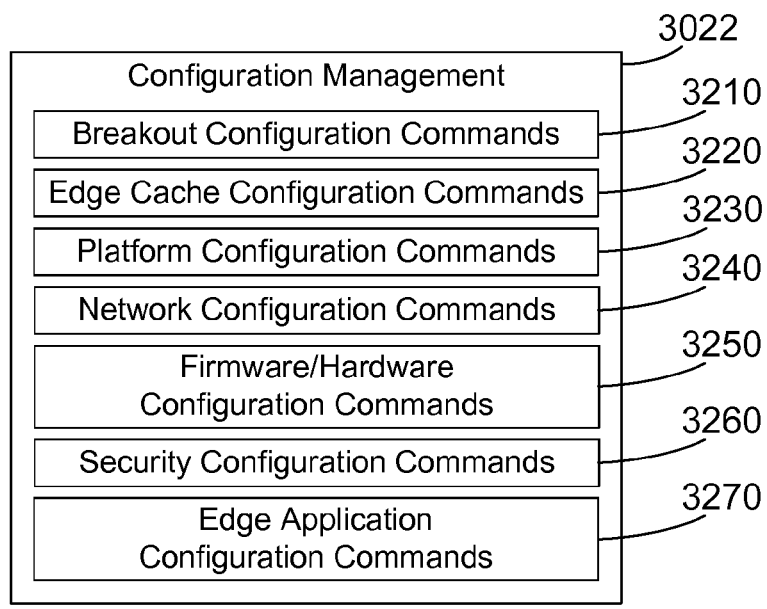
FIG. 32 is a block diagram of one specific implementation for the configuration management 3022 shown in FIG. 30.

The various appliance functions 3020 shown in FIG. 30 may be implemented using different commands. Examples of some suitable commands are shown in FIGS. 32-41. Referring to FIG. 32, configuration management functions 3022 may include breakout configuration commands 3210, edge cache configuration commands 3220, platform configuration commands 3230, network configuration commands 3240, firmware/hardware configuration commands 3250, security configuration commands 3260, and edge application configuration commands 3270. The breakout configuration commands 3210 include commands to configure the breakout mechanism in MIOP@ NodeB. The edge cache configuration commands 3220 include commands to configure caching of IP data within MIOP@ NodeB. Platform configuration commands 3230 include commands to configure MIOP@ NodeB. Network configuration commands 3240 include commands to configure network connections in MIOP@ NodeB. Firmware/hardware configuration commands 3250 include commands to configure the firmware or hardware within MIOP@ NodeB. Security configuration commands 3260 include commands to configure security settings in MIOP@ NodeB. Edge application configuration commands 3270 allow configuring applications that run on MIOP@ NodeB to provide services with respect to IP data exchanged with user equipment. These may include native applications and third party applications.

Figure 33:
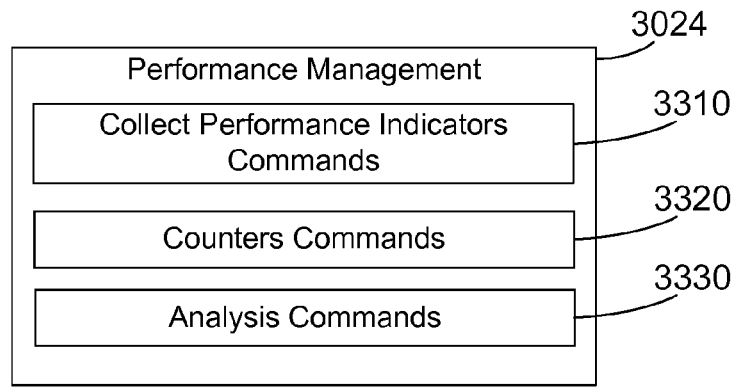
FIG. 33 is a block diagram of one specific implementation for the performance management 3024 shown in FIG. 30.

Referring to FIG. 33, performance management functions 3024 may include collect performance indicators commands 3310, counters commands 3320, and analysis commands 3330. The collect performance indicators commands 3310 include commands that allow collecting key performance indicators (KPIs) from MIOP@ NodeB. The counters commands 3320 include commands that set or clear counters that measure performance in MIOP@ NodeB. The analysis commands 3330 include commands that perform analysis of performance parameters within MIOP@ NodeB. For example, analysis commands 3330 could perform summations of key performance indicators for a given time period.

Figure 34:
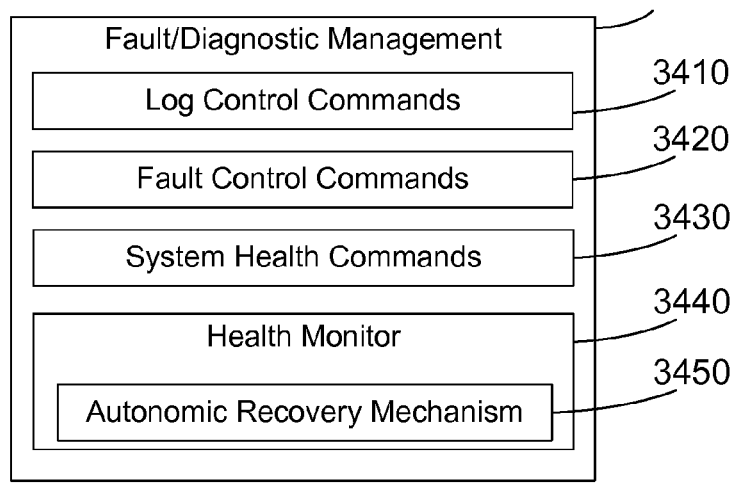
FIG. 34 is a block diagram of one specific implementation for the fault/diagnostic management 3026 shown in FIG. 30.

Referring to FIG. 34, fault/diagnostic management functions 3026 may include log control commands 3410, fault control commands 3420, and system health commands 3430. Log control commands 3410 include commands that collect logs, prune existing logs, purge existing logs, and set logging parameters. Fault control commands 3420 include commands that configure fault targets and view faults that have not been resolved. System health commands 3430 include commands that allowing viewing system health and taking actions in response to faults, such as restarting breakout, shutdown of MIOP@ NodeB, etc.

Figure 35:
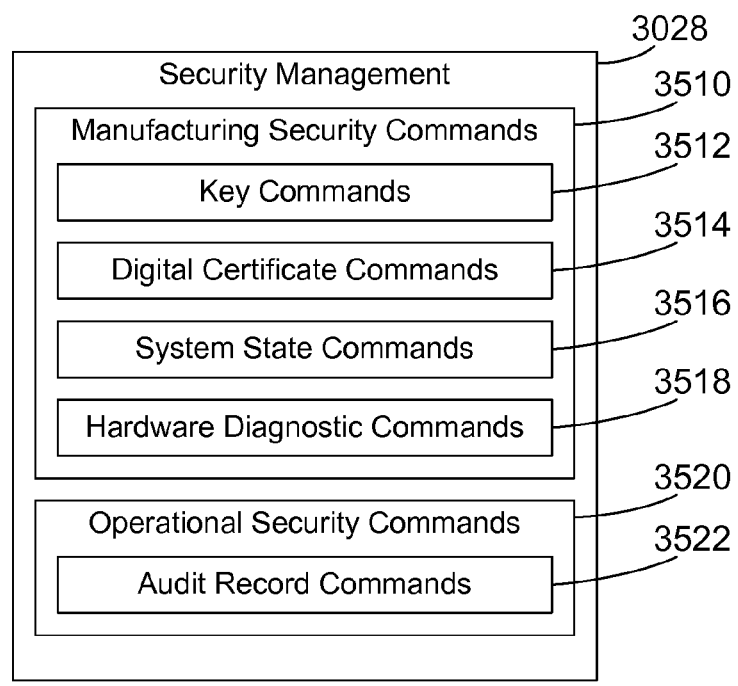
FIG. 35 is a block diagram of one specific implementation for the security management 3028 shown in FIG. 30.

Referring to FIG. 35, security management functions 3029 include two different classes of security commands, manufacturing security commands 3510 and operational security commands 3520. The manufacturing security commands 3510 include key commands 3512, digital certificate commands 3514, system state commands 3516, and hardware diagnostic commands 3518. The manufacturing security commands 3510 are used during manufacture of MIOP@ NodeB to perform security functions. The key commands 3512 include commands to load security/encryption keys. The digital certificate commands 3514 include commands to communicate with a trusted server to sign digital certificates. The system state commands 3516 include commands to read and modify the state of MIOP@ NodeB. System state commands 3516 could be used, for example, to modify the state of MIOP@ NodeB from a manufacturing state to an operational state. The hardware diagnostic commands 3518 include commands that run hardware exercisers to verify the MIOP@ NodeB is functional. The operational security commands 3520 include audit record commands 3522, which include commands that allow reviewing and auditing records that track the security functions performed by MIOP @ NodeB.

Figure 36:
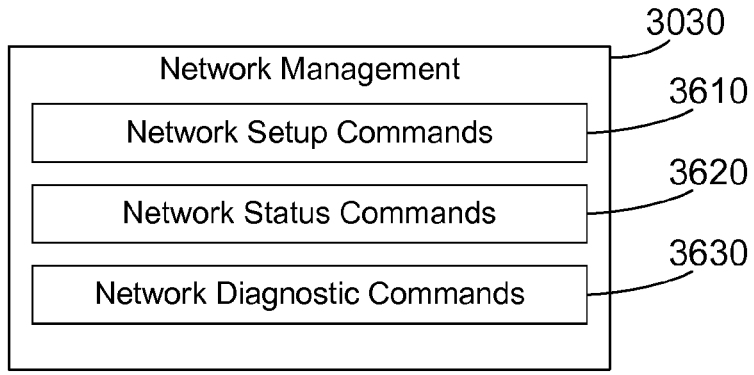
FIG. 36 is a block diagram of one specific implementation for the network management 3030 shown in FIG. 30.

Referring to FIG. 36, the network management commands 3030 include network setup commands 3610, network status commands 3620, and network diagnostic commands 3630. Network setup commands 3610 include commands that setup network connections in MIOP@ NodeB. Network status commands 3620 include commands that allow showing network status, statistics, neighboring MIOP@ NodeB systems, and current network configuration. Network diagnostic commands 3630 include commands for network diagnostics and tests, such as pinging an interface to see if it responds. Note the configuration management functions 3022 shown in FIG. 32 include network configuration commands, which can be used to configure network connections in MIOP@ NodeB both during manufacturing as well as when the MIOP@ NodeB is made operational in a mobile data network.

Figure 37:
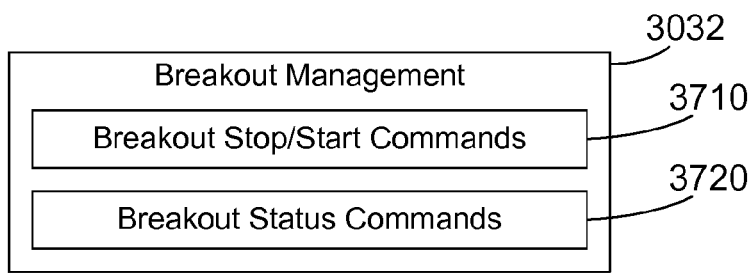
FIG. 37 is a block diagram of one specific implementation for the breakout management 3032 shown in FIG. 30.

Referring to FIG. 37, the breakout management functions 3032 may include breakout stop/start commands 3710 and breakout status commands 3720. The breakout stop/start commands 3710 include commands to stop and start breakout in MIOP@ NodeB. The breakout status commands 3720 include commands to determine the state of breakout on MIOP@ NodeB.

Figure 38:
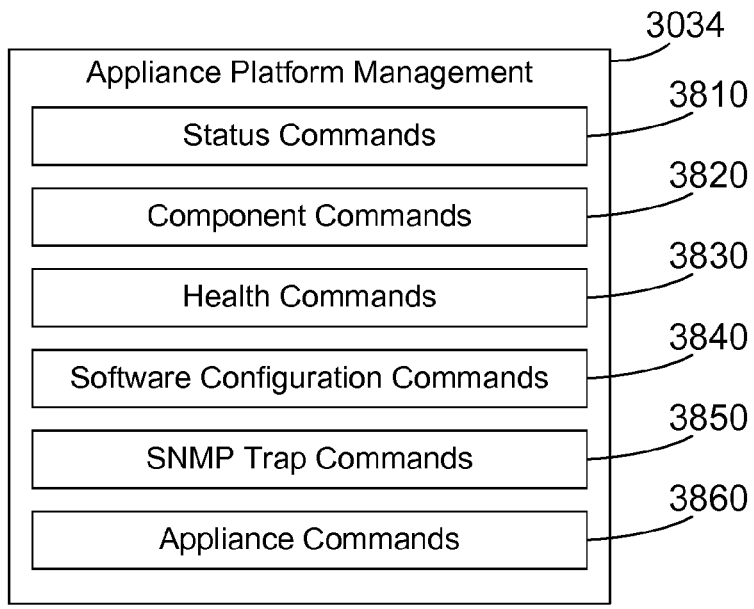
FIG. 38 is a block diagram of one specific implementation for the appliance platform management 3034 shown in FIG. 30.

Referring to FIG. 38, the appliance platform management functions 3034 may include status commands 3810, component commands 3820, health commands 3830, software configuration commands 3840, SNMP trap commands 3840, and appliance commands 3860. The status commands 3810 may include commands that show the health status and overload status of MIOP@ NodeB. The component commands 3820 include commands that list components within MIOP@ NodeB and their versions. The health commands 3830 include commands that monitor the health of MIOP@ NodeB, such as commands that respond to health and overload issues. The software configuration commands 3840 include commands to upgrade or rollback software running on MIOP@ NodeB. The SNMP trap commands 3850 include commands to set SNMP trap destinations and define SNMP trap actions. The appliance commands 3860 include commands to reboot MIOP@ NodeB, put MIOP@ NodeB to sleep for some period of time, and reset MIOP@ NodeB to its manufacturing defaults.

Figure 39:
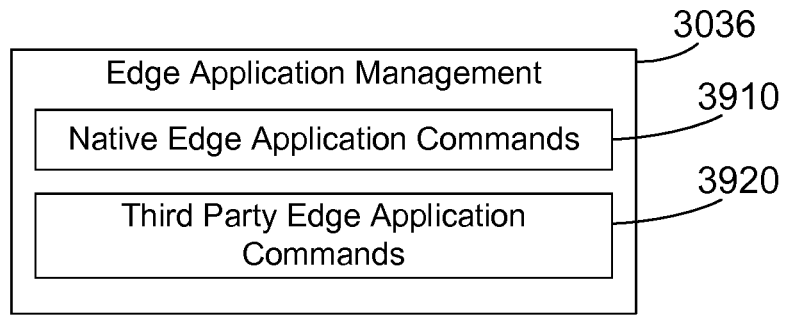
FIG. 39 is a block diagram of one specific implementation for the edge application management 3036 shown in FIG. 30.

Referring to FIG. 39, the edge application management functions 3036 include native edge application commands 3910 and third party edge application commands 3920. The native edge application commands 3910 include commands to configure and manage native edge applications in MIOP@ NodeB. The third party edge application commands 3920 include commands to install, configure and manage third party applications in MIOP@ NodeB.

Figure 40:
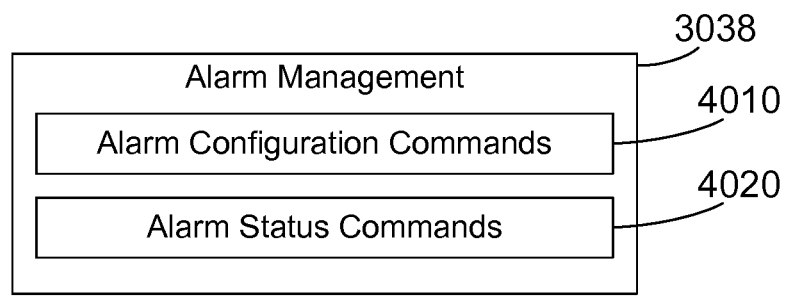
FIG. 40 is a block diagram of one specific implementation for the alarm management 3038 shown in FIG. 30.

Referring to FIG. 40, the alarm management functions 3038 include alarm configuration commands 4010 and alarm status commands 4020. The alarm configuration commands 4010 include commands to configure alarms in MIOP@ NodeB. The alarm status commands 4020 include commands to determine the status of alarms in MIOP@ NodeB or to clear previously raised alarms on MIOP@ NodeB. In one particular implementation, the alarm management functions 3038 are available via the SNMP interface 3016. In this configuration, SNMP is used by MIOP@ NodeB to raise alarms that are being monitored. For example, if a fan failed on the MIOP @ NodeB appliance, a "fan failed" SNMP trap could be raised by the MIOP@ NodeB. This trap would be caught by a monitor running on MIOP@ NMS, and an alert would be given to a system administrator monitoring the mobile data network. The system administrator could then take corrective action, such as dispatching a repair crew to the basestation to repair the failed fan. Once the failure is fixed, the system administrator can clear the alarm by sending a clear SNMP trap to MIOP@ NodeB.

Figure 41:
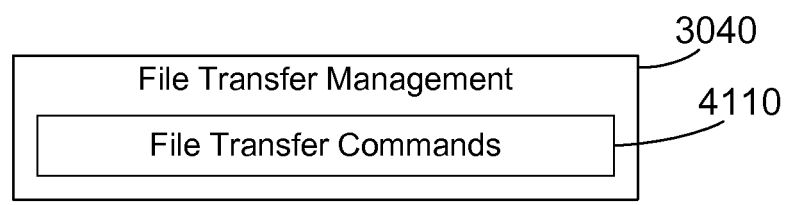
FIG. 41 is a block diagram of one specific implementation for the file transfer management 3040 shown in FIG. 30.

Referring to FIG. 41, the file transfer management functions 3040 include file transfer commands 4110 that allow transferring files to and from MIOP@ NodeB. In one particular implementation, the file transfer commands 4110 are available via the SCP interface 3018. The file transfer commands 4110 include commands in a Secure Shell (SSH), which is a network protocol used to remote shell access to the MIOP@ NodeB appliance. SSH is very commonly used for secure shell access on Linux and Unix systems. Secure Copy (SCP) runs in SSH and allows securely copying files between systems. The SCP interface 3018 thus provides file transfer commands 4110 that allow transferring files to and from MIOP@ NodeB. For example, configuration files or software updates could be transferred to MIOP@ NodeB, while audit logs, diagnostic information, performance data, and backups of the appliance configuration could be transferred from the MIOP@ NodeB.

FIG. 42 shows how commands may be defined for interfaces in one specific example. The command line interface implements all configuration management commands except for file transfer commands, which are implemented in the SCP interface. The command line interface implements all performance management commands except for file transfer commands, which are implemented in the SCP interface. The command line interface implements all fault/diagnostic management commands except for alarm traps, which are implemented in the SNMP interface, and file transfer commands, which are implemented in the SCP interface. The command line interface implements all security management commands except for file transfer commands, which are implemented in the SCP interface. The command line interface implements all network management commands and all breakout management commands. The command line interface implements all appliance platform management commands except for file transfer commands, which are implemented in the SCP interface. The command line interface implements all edge application management commands except for file transfer commands, which are implemented in the SCP interface. The SNMP interface implements all alarm management commands. The SCP interface implements all file transfer management commands. Of course, FIG. 42 is one suitable example of specifying which appliance commands are implemented in different interfaces. The disclosure and claims herein expressly extend to defining any suitable number of commands on any suitable number of interfaces, including commands implemented in multiple interfaces.

Figure 43:
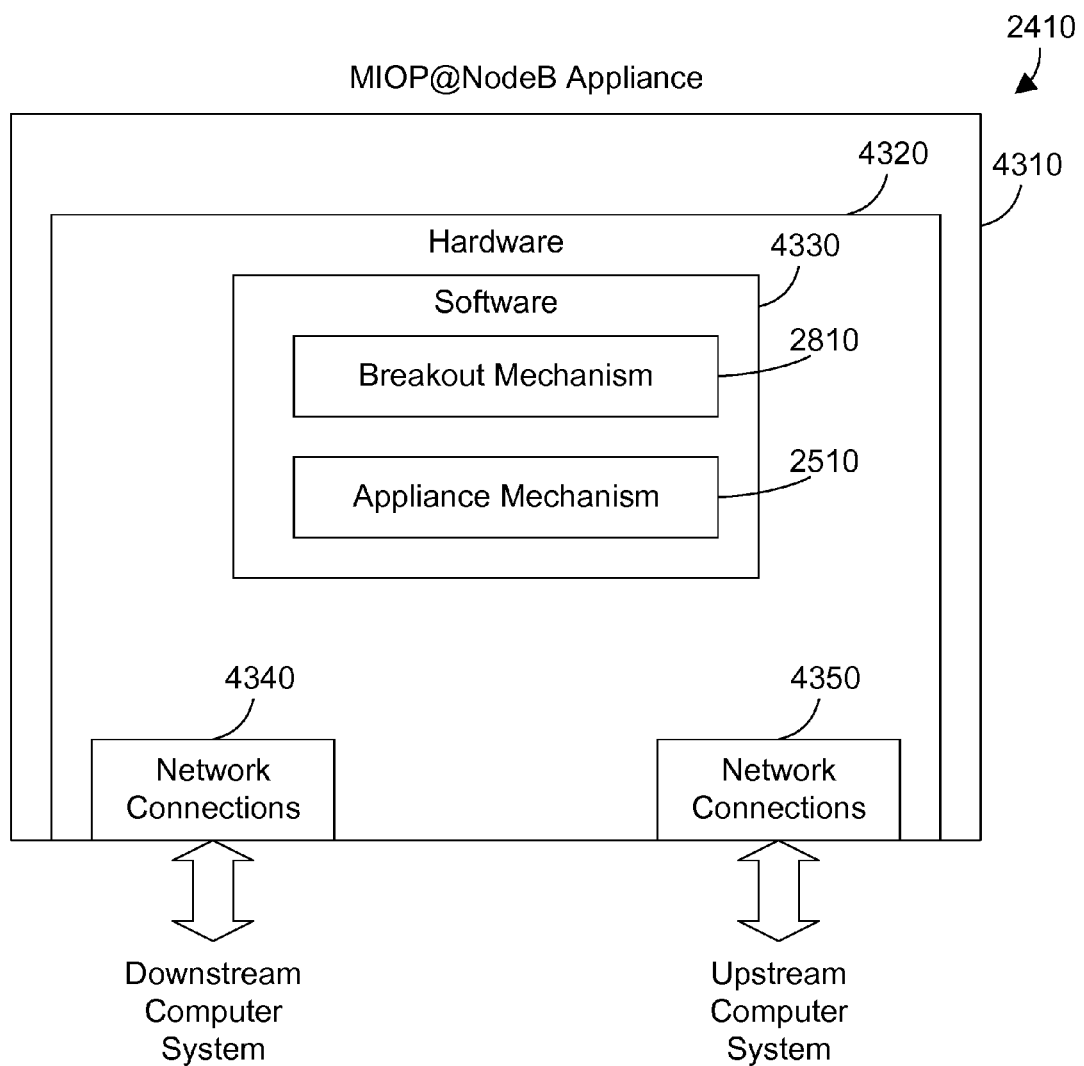
FIG. 43 is a block diagram of the MIOP@ NodeB appliance.

A block diagram view of the MIOP@ NodeB appliance 2410 is shown in FIG. 43. MIOP@ NodeB appliance 2410 includes an enclosure 4310, hardware 4320 and software 4330. The hardware 4320 includes network connections 4340 to a downstream computer system, such as a NodeB in a basestation. Hardware 4320 also includes network connections 4350 to an upstream computer system, such as an RNC. The software 4330 includes the breakout mechanism 2810 shown in FIG. 28, and the appliance mechanism 2510 shown in FIG. 25. This simple block diagram in FIG. 43 shows the encapsulation of hardware and software within an enclosure into an appliance view, where the appliance defines one or more interfaces with commands that are allowed to be performed on the MIOP@ NodeB appliance. Creating a MIOP@ NodeB appliance 2410 as shown in FIG. 43 and discussed in detail herein allows changing the implementation of hardware and software within the appliance while maintaining the consistent appliance interface. This allows the design and functionality of the MIOP@ NodeB appliance to evolve over time while maintaining the same interfaces and commands. As a result, the MIOP@ NodeB hardware and software can be changed dramatically without affecting how external components interact with MIOP@ NodeB. Of course, changes in design and improvements in performance may give rise to new commands that could be defined in the MIOP@ NodeB appliance. Note, however, that defining new commands in MIOP@ NodeB would not affect the compatibility of MIOP@ NodeB with other components in the mobile data network that do not need the new commands. As a result, the MIOP@ NodeB appliance is backwards compatible with all earlier versions of MIOP@ NodeB.

A Trusted Platform Module (TPM) is a cryptographic device designed by the Trusted Computing Group (TCG) (a standards group) and implemented by various vendors to enable trusted computing. A TPM module employs a set of registers called Platform Configuration Registers (PCRs). A TPM equipped system boots from a trusted BIOS, takes a series of measurements of the hardware and software of the running machine, and stores them in the PCRs. The TPM can cryptographically sign these PCRs and send them to a remote party which can then verify that the system has been booted up and measured in secure manner. In the breakout system described below, two subsystems use a single TPM allowing the single TPM to secure both subsystems. Hash values are computed and written to the PCRs as described below. A TPM has a limited number of PCRs so combining hash values into a single value can be advantageous to reduce the number of PCRs needed. Multiple hash values can be combined into a single value and the single value stored in a single PCR. For example, using the industry standard integrity measurement architecture (IMA) components a Linux kernel patch can generate a number of measurements depending on a policy and then collapse the measurements down to a single value to be stored in a single PCR to conserve PCRs.

The breakout system utilizes internet protocol security (IPSsec) which is a protocol suite for securing internet protocol (IP) communications. The breakout system has an IPSec connection to the network management system to verify the TPM signed values to insure the system has booted in a secure manner as described further below. After the IPSec connection is established, the overlay network described above is created within the secure tunnel session.

Figure 44:
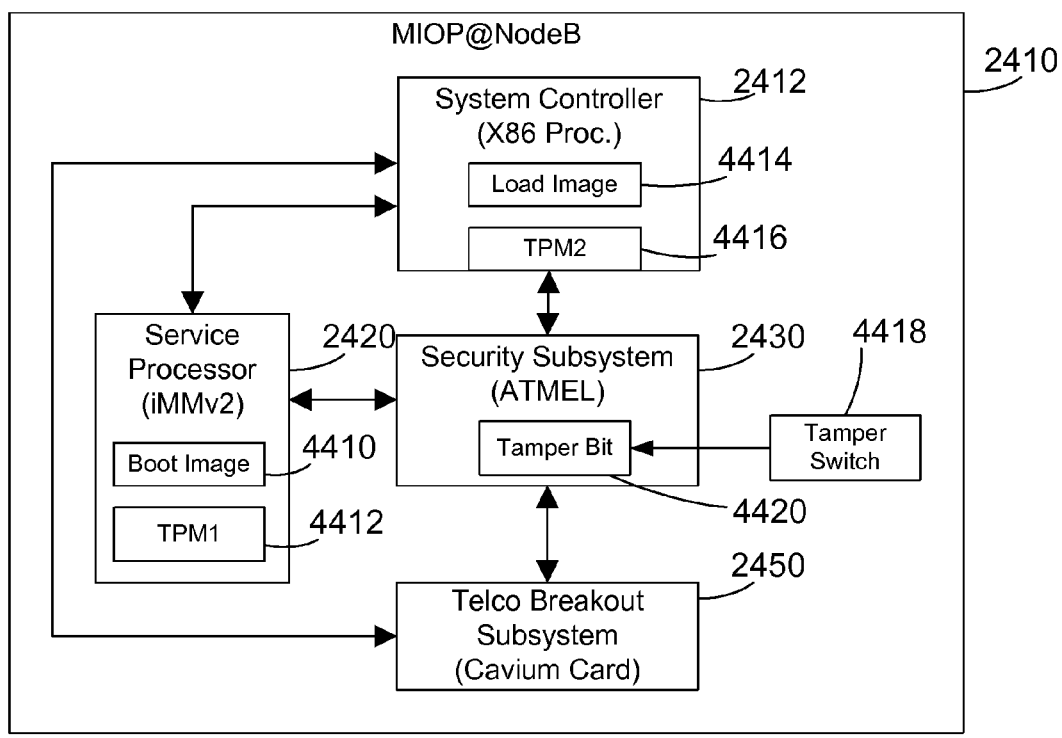
FIG. 44 is a block diagram that illustrates the boot architecture for the subsystems in the breakout appliance at the edge of a mobile data network.

FIGS. 44-50 illustrate an example of secure boot on the breakout system. FIG. 44 is a block diagram that illustrates the boot architecture for the subsystems in the breakout appliance at the edge of a mobile data network. FIG. 44 illustrates the primary subsystems of the MIOP@ NodeB breakout appliance or breakout system 2410 shown in FIG. 24. The primary subsystems include the service processor 2420 introduced above that includes a boot image 4410 stored in a local flash ram, and a first TPM 4412. The service processor 2420 is the first subsystem to boot. The second subsystem is the system controller 2412. The system controller 2412 has local memory that holds a load image 4414 to boot the remainder of the system. The service processor has a second TPM 4416. The third subsystem is the telco breakout subsystem 2450 as described above. The telco breakout subsystem 2450 also uses the second TPM 4416 for secure boot as described below. The security subsystem 2430 receives an input from at least one tamper switch 4418 and a corresponding tamper bit 4420 is set to indicate a tamper event such as the tamper switch 4418 detecting the breakout system chassis has opened. The tamper switch 4418 in connection with the security subsystem 2430 is thus an example of the tamper detection mechanism 2720 introduced above.

Figure 45:
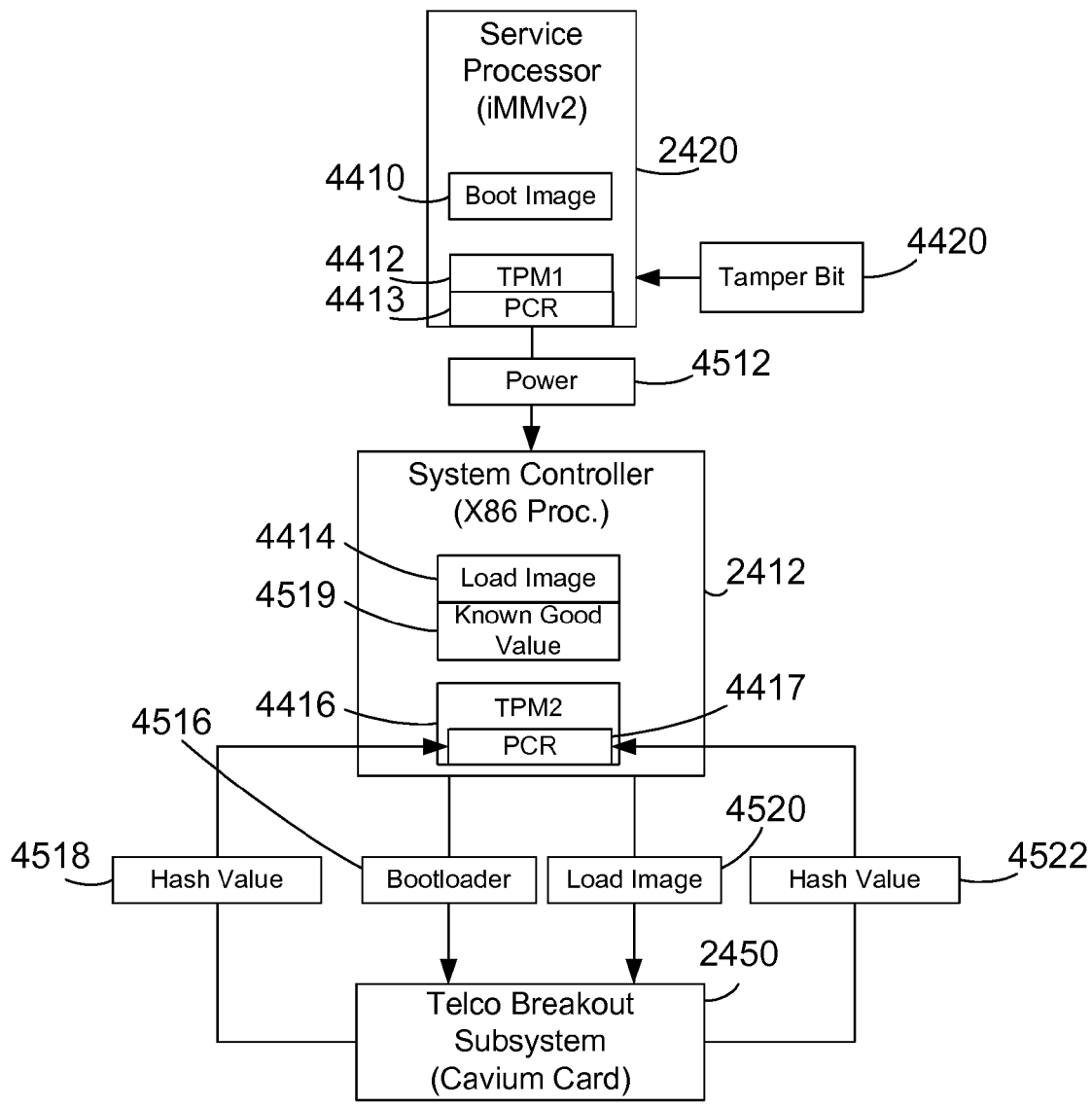
FIG. 45 is a block diagram that illustrates the secure boot of the subsystems of the breakout system.

FIG. 45 is a block diagram that illustrates secure boot of the subsystems of the breakout system. Upon initial power-up of the breakout system, the service processor 2420 commences booting from the boot image 4410 stored in a local memory such as a flash memory (not shown). The service processor 2420 will not continue to boot if a tamper bit 4420 is set indicating the tamper switch 4418 (FIG. 44) has been activated. The service processor 2420 utilizes the first TPM 4412 to insure the service processor boots securely with the correct code as described further below. The first TPM 4412 has platform configuration registers (PCRs) 4413. When the service processor 2420 has booted properly with the first TPM 4412, the service processor then activates power 4512 to the system controller 2412.

Again referring to FIG. 45, upon power-up, the system controller 2412 boots from a load image 4414 stored locally. The system controller 2412 utilizes a second TPM 4416 on the same board as the system controller 2412 to securely boot the system controller 2412 as described further in a method below. The system controller 2412 then sends bootloader code 4516 to the telco breakout subsystem 2450. The telco breakout system 2450 begins executing the bootloader 4516. The bootloader takes a hash of itself in memory and sends the hash value 4518 back to the system controller to store as PCR values in the PCRs 4417 of the second TPM 4416. The system controller 2412 also checks the hash value 4518 against a known good value 4519 for the hash value stored with the load image 4414. If the hash value 4518 matches the known good value 4519, the system controller will send the rest of the load image 4520 with an operating system to the telco breakout subsystem 2450. The bootloader 4516 will then take a hash of the operating system in the telco breakout system. The OS will then take the hash value 4522 from the operating system and send it to the system controller 2412 to be used as a PCR value. Both sets of PCR values (4518 and 4522) are placed in the second TPM 4416 in the system controller 2412.

At this point the system controller has a number of checkpoints from the system startup process and the PCR values are validated during the network admission process to establish an IPSec connection back to MIOP@ RNC. These PCR values of the first and second TPM are digitally signed by the TPM and sent over an encapsulated internet security (IPSec) session upstream in the mobile network such as to the network management system (240 FIG. 2). The network management system compares the digitally signed values to the known good values stored in the network management system. If the values check out on the network management system the boot is secure and the system is allowed to continue. The second TPM holds PCR values from both the system controller 2412 and the telco breakout subsystem 2450. Thus verifying the PCR values of the second TPM provides secure boot validation for both of these subsystems.

Figure 46:
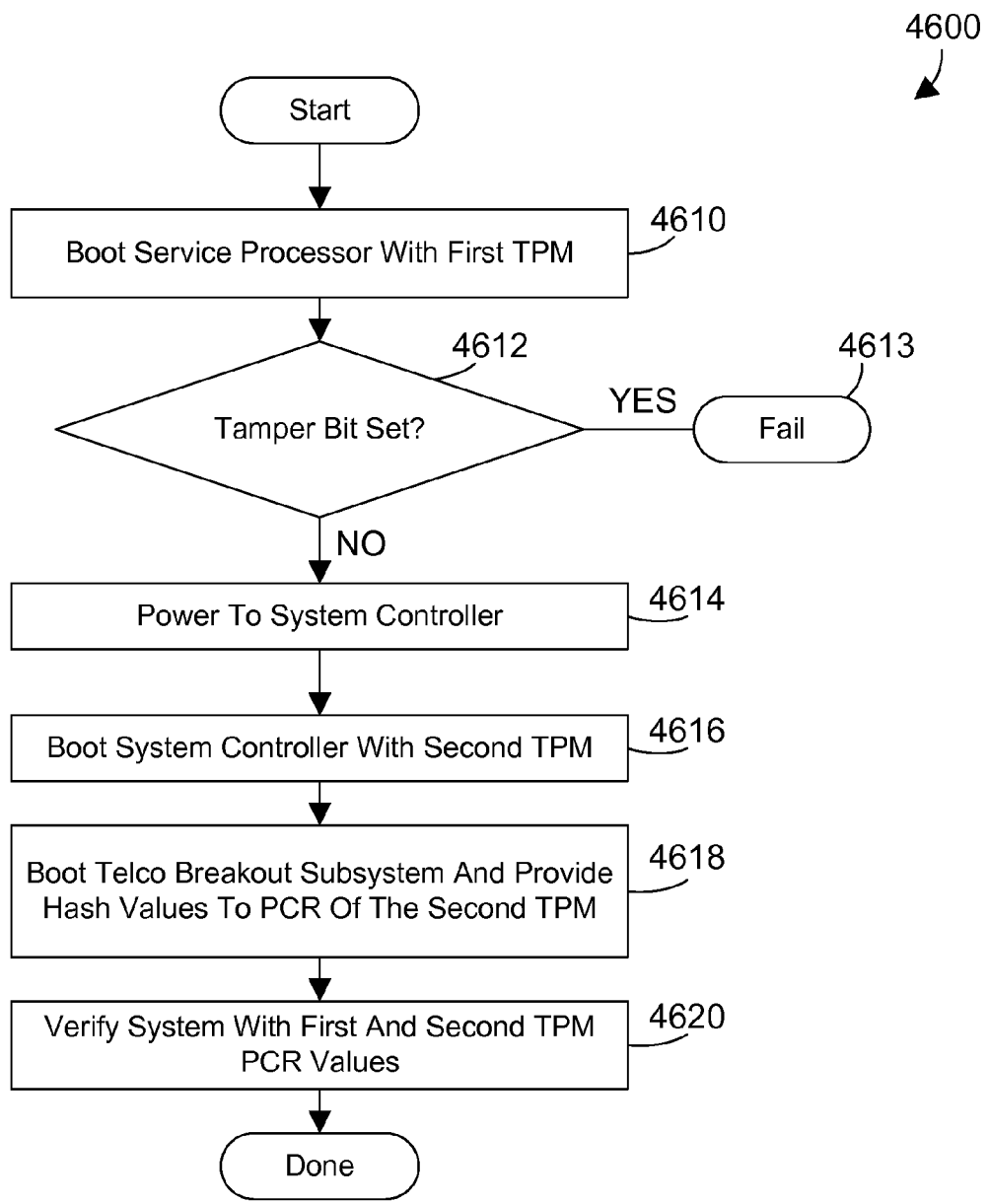
FIG. 46 is a flow diagram of a method for secure boot of multiple subsystems in a breakout appliance.

FIG. 46 is a flow diagram of a method 4600 for secure booting of a breakout system with multiple subsystems at the edge of a mobile data network. The steps of the method 4600 are preferably performed by the various subsystems of the breakout system including the service processor, system controller and the telco breakout subsystem. First boot the service processor utilizing a first TPM to boot in a secure manner (step 4610). Then check the tamper bit (step 4612). If the tamper bit is set (step 4612=yes) then the system is compromised and the boot process goes to a fail state (step 4613). If the tamper bit is not set (step 4612=no) then apply power to the system controller (step 4614). When power is applied to the system controller, boot the system controller utilizing the second TPM to insure security of the boot (step 4616). Next boot the telco breakout subsystem and provide hash values to the second TPM (step 4618) to ensure a secure boot of the telco breakout subsystem. Verify the system security by verifying the PCR values in the first and second TPMs (step 4620). The method is then done.

Figure 47:
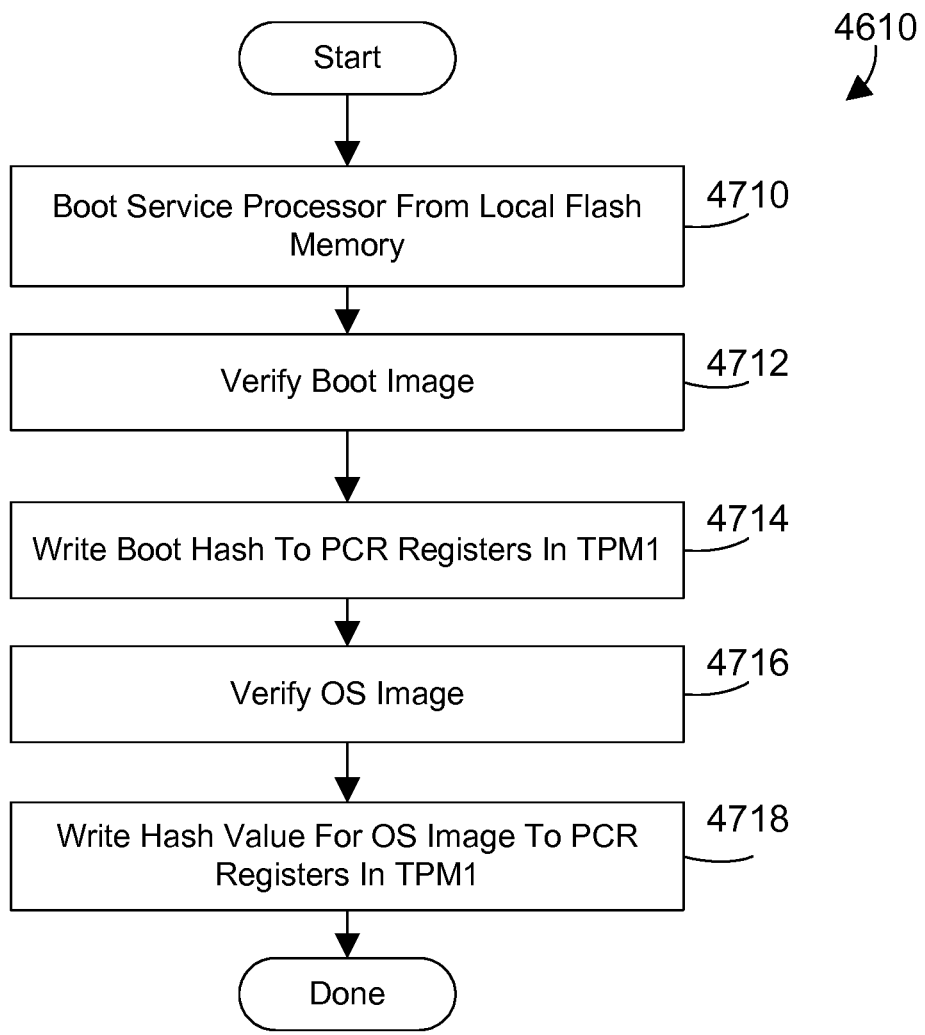
FIG. 47 is a flow diagram of a method for the specific implementation of step 4610 shown in FIG. 46.

FIG. 47 is a flow diagram of a method 4610 for secure booting of a breakout system with multiple subsystems at the edge of a mobile data network. Method 4610 is one possible implementation of step 4610 in method 4600 in FIG. 46. First, boot the service processor from local flash memory (step 4710). Next, verify the boot image by taking a hash of the boot image and check the digital signature of the image (step 4712). Write the boot hash value to PCR registers in the first TPM (step 4714). Verify the operating system (OS) image by taking a hash of the OS in memory (step 4716). Write a hash value for the operating system image in memory to PCR registers in the first TPM (step 4718). The method is then done.

Figure 48:
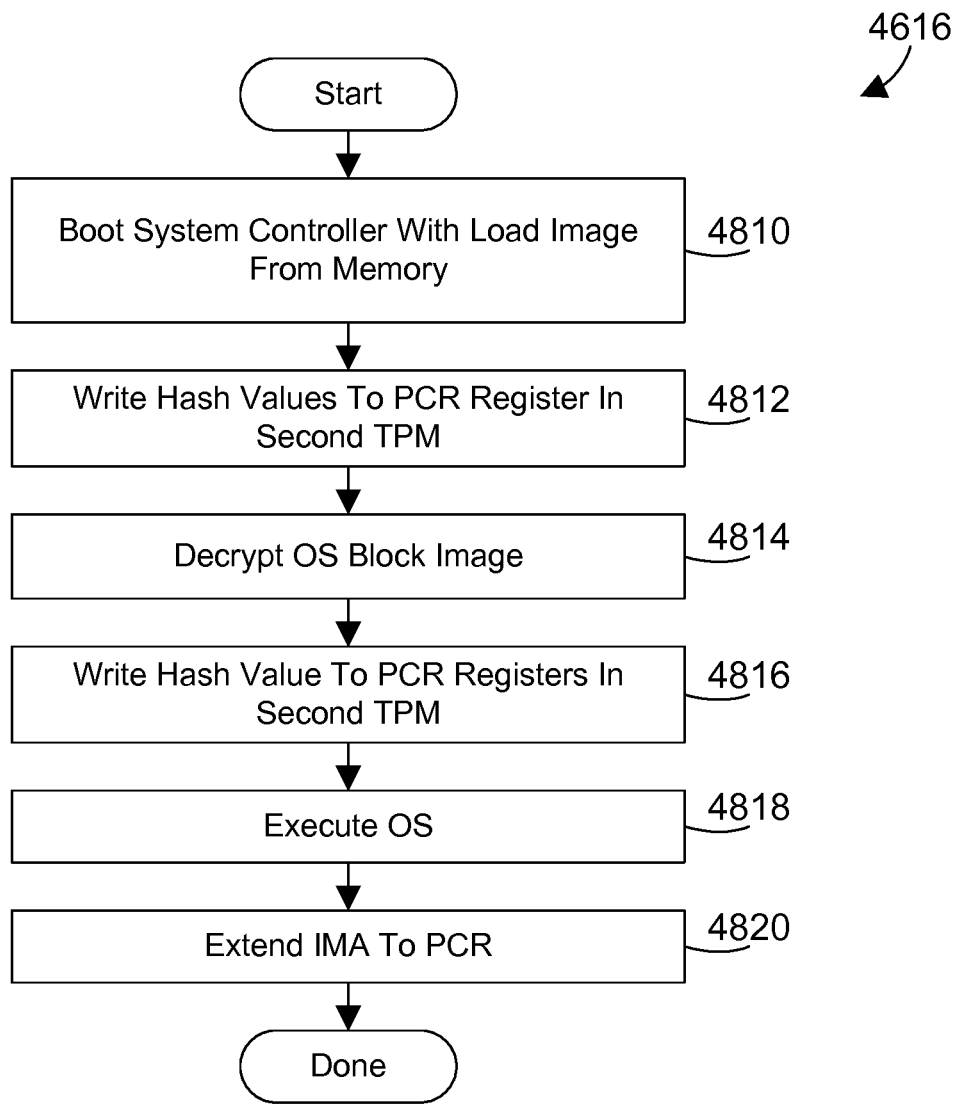
FIG. 48 is a flow diagram of a method for the specific implementation of step 4616 shown in FIG. 46.

FIG. 48 is a flow diagram of a method 4616 for secure booting of a breakout system with multiple subsystems at the edge of a mobile data network. Method 4616 is one possible implementation of step 4616 in method 4600 in FIG. 46. First, boot the system controller with a load image from memory (step 4810). Verify the boot image and write the hash value to PCR registers in the second TPM (step 4812). Decrypt the OS block image (step 4814). Write a hash value for the OS block image to PCR registers in the second TPM (step 4816). Execute the OS (step 4818). Optionally, extend the trusted boot process past the operating system using an integrity measurement architecture (IMA) module in the OS kernel and provide the resulting hash codes to the PCR registers in the second TPM (step 4820). The method is then done.

Figure 49:
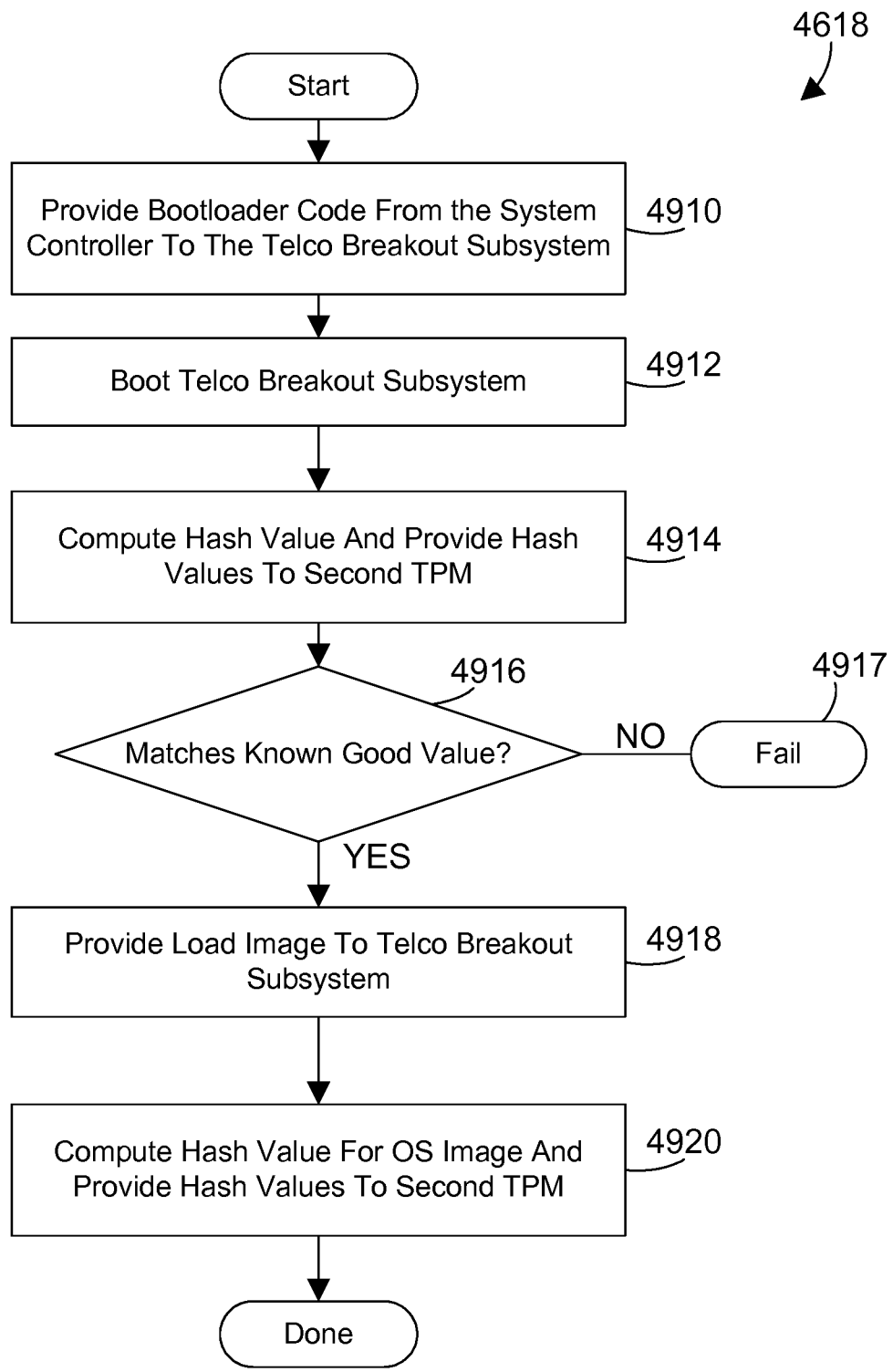
FIG. 49 is a flow diagram of a method for the specific implementation of step 4618 shown in FIG. 46.

FIG. 49 is a flow diagram of a method 4618 for secure booting of a breakout system with multiple subsystems at the edge of a mobile data network. Method 4618 is one possible implementation of step 4618 in method 4600 in FIG. 46. First, provide bootloader code from the system controller to the telco breakout subsystem (step 4910). Boot the telco breakout subsystem (step 4912). Compute hash values for the boot code in the memory of the telco breakout subsystem and provide the hash values to the system controller to place in the PCR registers in the second TPM (step 4914). The system controller compares the hash values to a known good value and if they do not match a known good value (step 4916=no) then there is an error and the boot fails (step 4917). If the PCR values match the known good value (step 4916=yes) then provide a load image from the system controller to the telco breakout subsystem (step 4918). Compute hash values for the OS image in the memory of the telco breakout subsystem and provide the hash values to the system controller to place in the PCR registers in the second TPM (step 4920). The method is then done.

Figure 50:
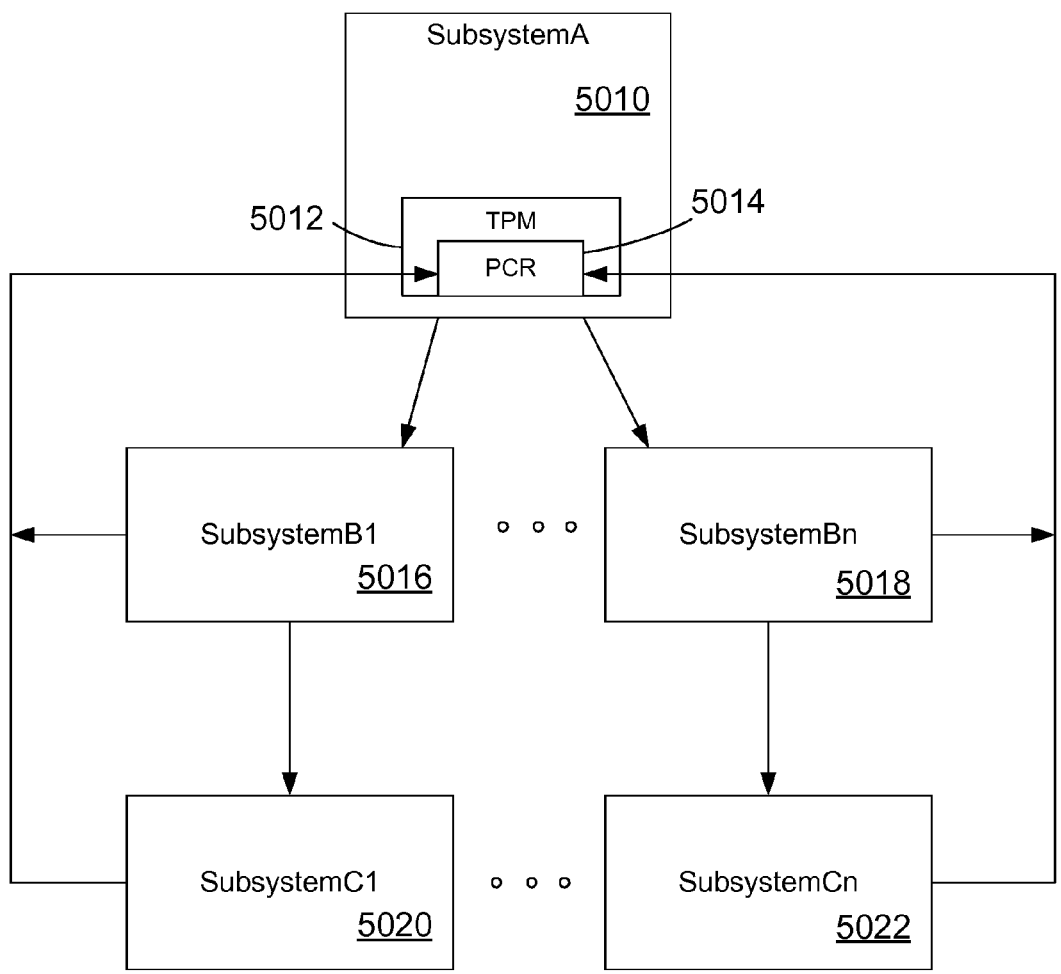
FIG. 50 is a block diagram that illustrates a generalized architecture for multiple subsystems.

FIG. 50 is a block diagram that illustrates generalized architecture for multiple subsystems. As introduced above, a single TPM module can be used to securely boot multiple subsystems of a system. The system can thus leverage a single TPM to securely boot multiple subsystems. FIG. 50 further illustrates that there can be multiple subsystem on multiple levels that use the single TPM module. In FIG. 50, a top-level subsystemA 5010 includes a TPM 5012 which has PCRs 5014. The subsystemA may boot and provide hash values to the PCRs 5014 as described above. Additional subsystems on one or more sub-levels can then boot and provide hash values to the PCRs 5014. In the example shown in FIG. 50, subsystemB1 5016 through subsystemBn 5108 boot and send hash values to the PCRs 5014 in the manner described above. SubsystemBn represents that there may be more than one subsystem at this level. There can also be multiple sub-levels as shown. SubsystemC1 through subsystemCn may also boot and provide hash values in the same manner to the PCRs 5014 in the TPM 50121. One or more of the subsystems 5016-5022 shown in FIG. 50 may include their own TPM rather than use the TPM 5012 in subsystem 5010. These subsystems may also include one or more virtual TPMs as described below.

FIGS. 51-55 illustrate examples of validating a system having multiple subsystems with one or more trusted platform modules and one or more virtual platform modules. Software validation is provided for a breakout system having multiple subsystems at the edge of a mobile data network. Software validation of the system may be done at anytime to insure the integrity of the system. For example, software validation may be done periodically or after some specific event such as installing new software. Similar to the previous example for boot validation, software validation of the system is accomplished using one or more TPM modules. Hash values for the software in the various subsystems are placed in Platform Configuration Registers (PCRs) of the TPM. The collection of hash values are referred to as a quote. The TPM cryptographically signs quotes in the PCRs. The breakout system produces an XML file with the quotes related to the subsystems and sends them to a network management system for verification. The XML file may be sent to the network management system as described above for the boot validation. The network management system validates the software configured on the breakout system using a public key to access the quotes and then compares the quotes to known good values stored in an inventory record associated with the specific breakout system being validated. This process is described further below. Where the endpoint configuration is found to be valid, the network management system generates a system validated message. If the endpoint configuration is not valid, a validation failed message is generated.

The system validated message, or the validation failed message can be processed in a variety of ways. Typically such messages are sent to a policy decision point (PDP). The PDP uses a set of polices to determine what action to take based on the indicated failure. In the illustrated example, the MIOP@ NodeB 2410 includes a PDP 2670 as a module in the service processor 2420 (FIG. 26). This PDP can determine how to proceed based on messages from the process to validate the system described below with reference to FIG. 55. For example, if there is a validation failure message that reports a failure corresponding to a level of quotes for a subsystem such as the quotes for a virtual machine, the PDP 2670 may determine that the software of the subsystem be reloaded and re-validated prior to establishing a network connection. A remote PDP may also be utilized, particularly in the situation where the software has been validated. A remote PDP is typically located in a radius server which provides centralized authentication and authorization for computers to connect to a network service. In the example described herein, it is assumed that the system validated message, and the validation failed message are sent to either a local or remote PDP. Based on the system validated message, a network connection such as an IPsec connection can be established as described above to allow the now validated breakout system to function in the mobile data network.

Figure 51:
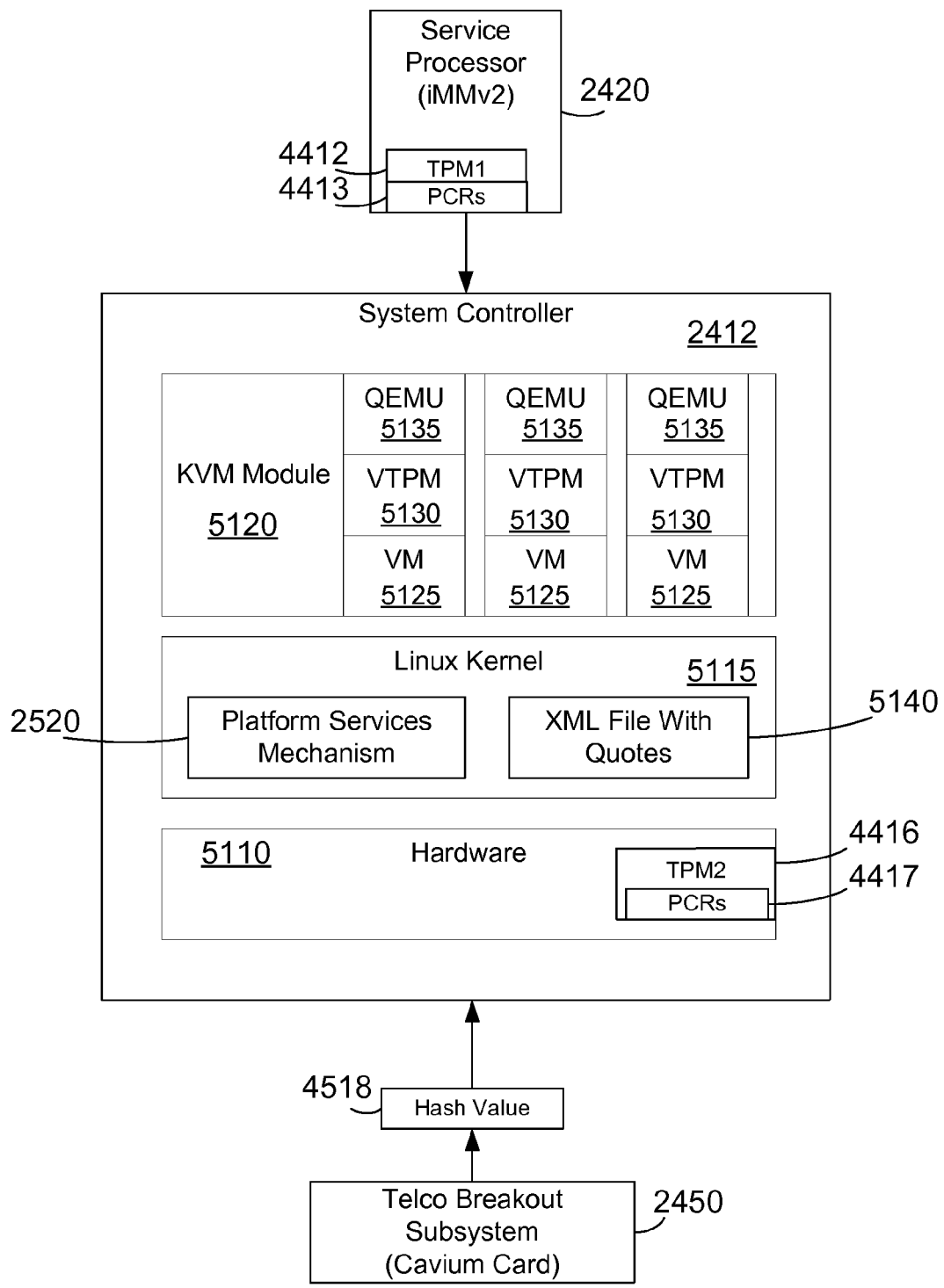
FIG. 51 is a block diagram that illustrates the architecture for an exemplary subsystem in the breakout appliance at the edge of a mobile data network.

FIG. 51 illustrates a block diagram of a high level view of validating a system having multiple subsystems with one or more trusted platform modules and one or more virtual platform modules. In the described example, three subsystems participate together to validate the system software but any number of subsystems could be used. In this example, the subsystems are the service processor 2420, the system controller 2412 and the telco breakout system 2450 that were introduced in FIG. 24. As described above, more than one TPM can be used in a system. In this example the service processor 2420 includes a first TPM (TPM1) 4412 with PCRs 4413, and the system controller 2412 includes a second TPM (TPM2) 4416 with PCRs 4417 as part of the subsystem hardware 5110. In addition, a subsystem may also include one or more virtual TPMs as described further below.

Again referring to FIG. 51, the system controller 2412 is a subsystem with software and hardware. In this example, the hardware 5110 is an x86 type processor system with a TPM 4416 as described above. Executing on the hardware 5110 is a Linux Kernel 5115 operating system that includes the platform services mechanism 2520 as described above. The Linux Kernel 5115 supports a Kernel-based virtual machine (KVM) module 5120 that allows the system controller to support multiple virtual machines (VM) 5125. In this example, each virtual machine 5125 includes a virtual TPM (VTPM) 5130. A virtual TPM 5130 extends TPM-based security to a VM operating on the sub-system. The virtual machines may further include a machine emulator 5135 to interface with application programs (not shown). In this example, the machine emulator is QEMU 5135, which is a generic, open source machine emulator that is publicly available.

Again referring to FIG. 51, the platform services mechanism 2520 collects the PCR values from the various subsystems and TPMs to validate the system. In the illustrated example, the platform services mechanism 2520 collects PCR values from the PCRs 4413 of TPM1 4412 and the PCRs 4417 of TPM2 4416. PCR values are also collected from any VTPMs 5130. The platform services mechanism then creates an XML file with quotes 5140, where the quotes are a collection of the PCR values or hashes collected from the PCRs. The platform services mechanism 2520 sends the XML file with the quotes 5140 to a network management system, such as the MIOP@ NMS 240 in FIG. 1 for validation.

FIG. 52 is an example of information stored in an XML file 5140 to communicate validation quotes to the management system of the mobile data network. The example XML file 5140 is shown in a simplified format without all the formatting of a typical XML file for simplicity. The XML file 5140 includes an endpoint identification (ID) 5210. The endpoint ID 5210 is a reference number that corresponds to a particular endpoint system or appliance. In the example described herein, the endpoint ID 5210 would be a reference number for the specific breakout system that assembled the XML file 5140. The XML file 5140 further includes a public key 5215 and corresponding PCR values 5220 for the service processor, public key 5225 and PCR values 5230 for the system controller, and a public key 5235 and PCR values 5240 for any virtual machines in the system. If the system includes multiple virtual machines, the XML file 5140 would include a corresponding key 5235 and PCR values 5240 for each virtual machine. While the illustrated example is shown as an XML file, other suitable file formats could also be used to send the validation quotes to the management system.

FIG. 53 is a block diagram that illustrates an inventory record 5310 with verification data for validation of the system software associated with the inventory record. In the described example, the network management system manages inventory management data that includes information regarding the hardware and software inventory for each endpoint system including the breakout systems residing in the base stations of the mobile data network. In this example, each record of the inventory management data includes an endpoint identifier (ID) 5315, which in this case is the ID of the breakout system which corresponds to the record. Each row of the record corresponds to a subsystem, either a physical or virtual subsystem. In this example, the rows for subsystems include the service processor 5316, the system controller 5317, the telco breakout system 5318 and virtual machines represented by VM1 5319 and VMn 5320. Each subsystem 5325 in the record 5310 includes hardware inventory data 5330, software inventory data 5335, a public key 5340, and one or more associated PCR values 5345 (shown here as PCR1, PCR2 and PCRn). The hardware inventory data 5330 includes information such as the serial number and revision of the subsystem hardware or other hardware inventory information. The software inventory data 5335 include information such as the software installed and revision levels of the software. The public key 5340 is a public encryption key for the PCR values 5345 or quote associated with this subsystem. The PCR values 5345 are known good values that are compared to the PCR values in the XML file 5140 to validate the software of the system.

Figure 54:
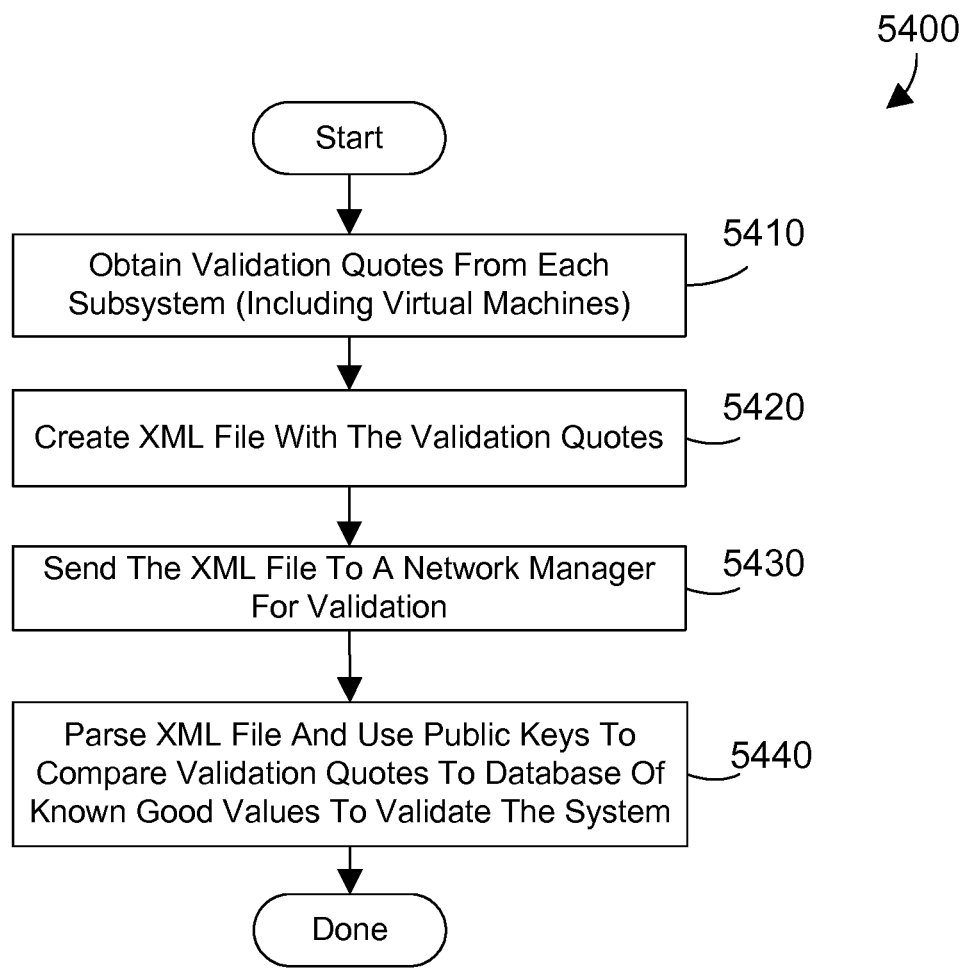
FIG. 54 is a flow diagram of a method for the validating a breakout appliance.

FIG. 54 is a flow diagram of a method 5400 for validating a breakout appliance at the edge of a mobile data network. The steps of the method 5400 are preferably performed by the various subsystems of the breakout system 210 and the network management system 240 (FIG. 2). First obtain validation quotes from each subsystem, including virtual machines where applicable (step 5410). Create an XML file with the quotes (step 5420). Send the XML file with the quotes to a network management system for validation (step 5430). At the network management system, parse the XML file and use public keys to compare the quotes to known good values to validate the system or appliance (step 5440). The method is then done.

Figure 55:
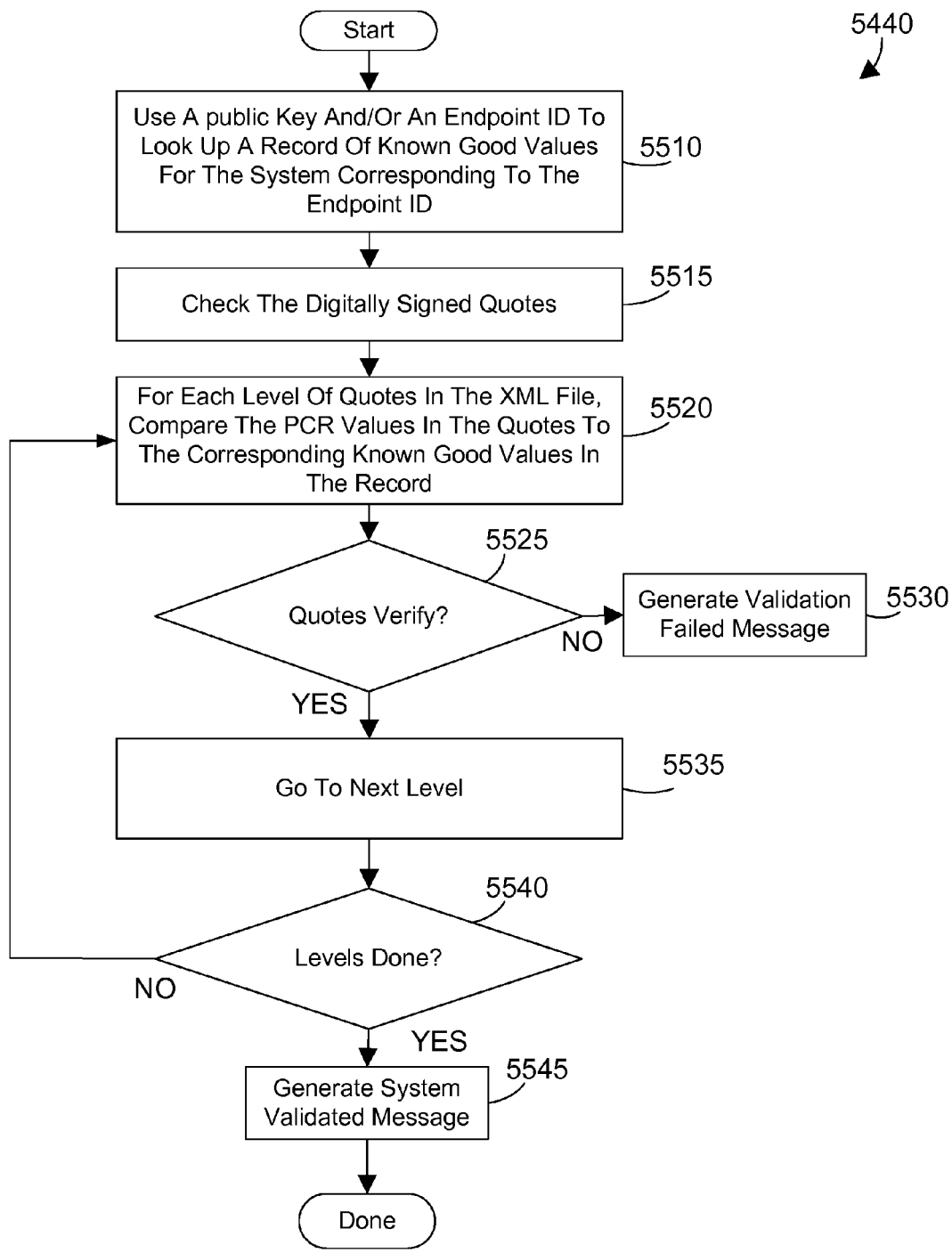
FIG. 55 is a flow diagram of a method for the specific implementation of step 5440 shown in FIG. 54.

FIG. 55 is a flow diagram of method 5540 for parsing an XML file at the network management system to validate the breakout system at the edge of a mobile data network. Method 5440 is one possible implementation of step 5440 in method 5400 in FIG. 54. First, use a public key and/or an endpoint ID to look up a record of known good values for the system corresponding to the endpoint ID (step 5510). Use the public key to check the digitally signed quotes (step 5515). For each level of quotes in the XML file, compare the PCR values in the quotes to the corresponding known good values in the record (step 5520). If the quotes do not verify (step 5525=no) then generate a validation failed message to be sent to a policy decision point (step 5530). If the validation failed message corresponds to a level of quotes for a subsystem, the policy decision point (PDP) may require that the software of the subsystem be reloaded on the endpoint system and the software re-validated as described above. If the quotes do verify (step 5525=yes) then go to the next level in the record (step 5535). If the levels are not done (step 5540=no), then go to step 5520. If the levels are done (step 5540=yes), then generate a system validation message to indicate the system corresponding to the endpoint ID is validated (step 5545). The method is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed to a method and apparatus for software validation of a system or appliance at the edge of a mobile data network having multiple subsystems. The software validation utilizes one or more trusted platform modules (TPM) to secure multiple subsystems including virtual machines in the breakout system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the mobile data network in FIG. 2 and discussed herein is in the context of a 3G mobile data network, the disclosure and claims herein expressly extend to other networks as well, including Long Term Evolution (LTE) networks, flat RAN networks, and code division multiple access (CDMA) networks.

The invention claimed is:

1. A mobile data network comprising:
   a breakout system associated with one of a plurality of basestations, where the plurality of basestations each communicate with a corresponding antenna that transmits and receives radio signals to and from user equipment, wherein the plurality of basestations are part of a radio access network that communicates with a core network in the mobile data network, the breakout system further comprising:
   a service processor with a first trusted platform module (TPM) having PCRs;
   a system controller that provides hash values to the PCRs of the first TPM;
   a platform services mechanism that obtains validation quotes from the service processor and the system controller, where the validation quotes comprise digitally signed hash values from platform configuration registers (PCRs) of the trusted platform module (TPM),
   wherein the platform services mechanism creates an extensible markup language (XML) file with the validation quotes and sends the XML file to a network management system for validation of the system; and
   the network management system parses the XML file and uses public keys to compare the validation quotes to known good values stored in a database by the network management system to validate the system.

2. The mobile data network of claim 1 wherein the network management system uses an endpoint identification (ID) in the XML file to look up a record with known good values for the system, uses a public key to check the digitally signed quotes of the XML file and then validates the system by verifying each level of quotes in the XML file by comparing the PCR values in the validation quotes to the corresponding values in the record.

3. The mobile data network of claim 1 further comprising one or more additional subsystems and one or more additional TPMs associated with at least one of the additional subsystem.

4. The mobile data network of claim 1 wherein the at least one subsystem further comprises at least one virtual machine with a virtual TPM, and wherein the platform services mechanism includes PCR values from the virtual TPM in the XML file.

5. The mobile data network of claim 1 wherein a public key in the XML file is used to look up a record with known good values for the system in place of the endpoint ID.

6. The mobile data network of claim 1 wherein the system is a breakout appliance for a mobile data network.

* * * * *